United States Patent
Forsberg (12)

(10) Patent No.: US 6,182,453 B1
(45) Date of Patent: Feb. 6, 2001

(54) PORTABLE, POTABLE WATER RECOVERY AND DISPENSING APPARATUS

(75) Inventor: Francis C. Forsberg, Boerne, TX (US)

(73) Assignee: Worldwide Water, Inc., Boerne, TX (US)

(*) Notice: Under 35 U.S.C. 154(b), the term of this patent shall be extended for 0 days.

(21) Appl. No.: 09/544,407

(22) Filed: Apr. 6, 2000

Related U.S. Application Data

(63) Continuation-in-part of application No. 09/087,892, filed on May 29, 1998, now Pat. No. 6,058,718, which is a continuation-in-part of application No. 08/802,489, filed on Feb. 20, 1997, now Pat. No. 5,845,504, which is a continuation-in-part of application No. 08/629,305, filed on Apr. 8, 1996, now Pat. No. 5,669,221.

(60) Provisional application No. 60/035,753, filed on Jan. 6, 1997.

(51) Int. Cl.[7] ...................................................... F25B 49/00
(52) U.S. Cl. .................................. 62/125; 62/92; 62/150; 62/272; 62/285
(58) Field of Search .............................. 62/125, 126, 127, 62/93, 271, 272, 285, 288, 289, 291, 390, 188; 210/143, 681, 669, 745, 753, 257.1, 134

(56) References Cited

U.S. PATENT DOCUMENTS

| | | | |
|---|---|---|---|
| 3,035,418 | * 5/1962 | Wright | 62/176 |
| 3,675,442 | * 7/1972 | Swanson | 62/285 |
| 4,204,956 | 5/1980 | Flatow | 210/87 |
| 4,255,937 | * 3/1981 | Ehrlich | 62/264 |
| 5,106,512 | 4/1992 | Reidy | 210/744 |
| 5,149,446 | 9/1992 | Reidy | 210/744 |
| 5,203,989 | * 4/1993 | Reidy | 210/137 |
| 5,227,053 | 7/1993 | Brym | 210/143 |
| 5,259,203 | 11/1993 | Engel et al. | 62/150 |
| 5,301,516 | 4/1994 | Poindexter | 62/126 |
| 5,315,830 | 5/1994 | Doke et al. | 62/3.2 |
| 5,484,538 | * 1/1996 | Woodward | 210/767 |
| 5,517,829 | 5/1996 | Michael | 62/272 |
| 5,553,459 | 9/1996 | Harrison | 62/93 |
| 5,669,221 | * 9/1997 | LeBleu et al. | 62/92 |
| 5,701,749 | 12/1997 | Zakryk | 62/93 |
| 5,704,223 | 1/1998 | MacPherson et al. | 62/3.62 |
| 5,845,504 | 12/1998 | LeBleu | 62/92 |
| 6,029,461 | 2/2000 | Zakryk | 62/93 |

OTHER PUBLICATIONS

"Drinking Water Treatment Units Certified by NSF International", NSF International, Ann Arbor, MI (1995), p. 32–34.

* cited by examiner

Primary Examiner—William Doerrler
Assistant Examiner—Marc Norman
(74) Attorney, Agent, or Firm—Cox & Smith Incorporated

(57) ABSTRACT

A portable, potable-water generator for producing high-purity liquid water by condensation of dew from ambient air. The generator employs an air filter to remove particulates and aerosols from the incoming air. An enclosed heat absorber cools the filtered air to its dew point and collects droplets of condensate into a combined condensate collector and storage reservoir. Before discharge, the collected dew is treated in a bacteriostat loop to destroy adventitious living organisms and to filter out undesirable and dangerous contaminants. A recirculation loop provides the ability to recirculate stored condensate during periods of inactivity. Further, quick disconnect fittings and variable length flexible tubing allows use of the invention to serve remote dispensers and/or appliances and allows use of municipal water treated through the apparatus in low condensate situations. All the subsystems are fail safe-interlocked to disable the generator immediately and prevent delivery of water if any one of them stops functioning within predetermined safe limits.

16 Claims, 26 Drawing Sheets

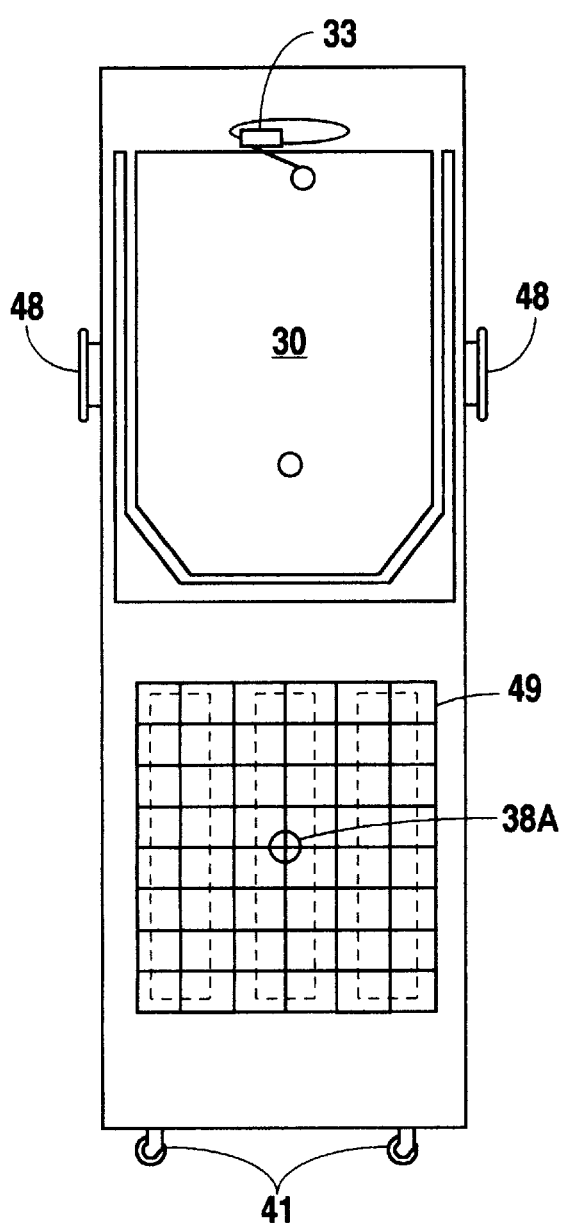
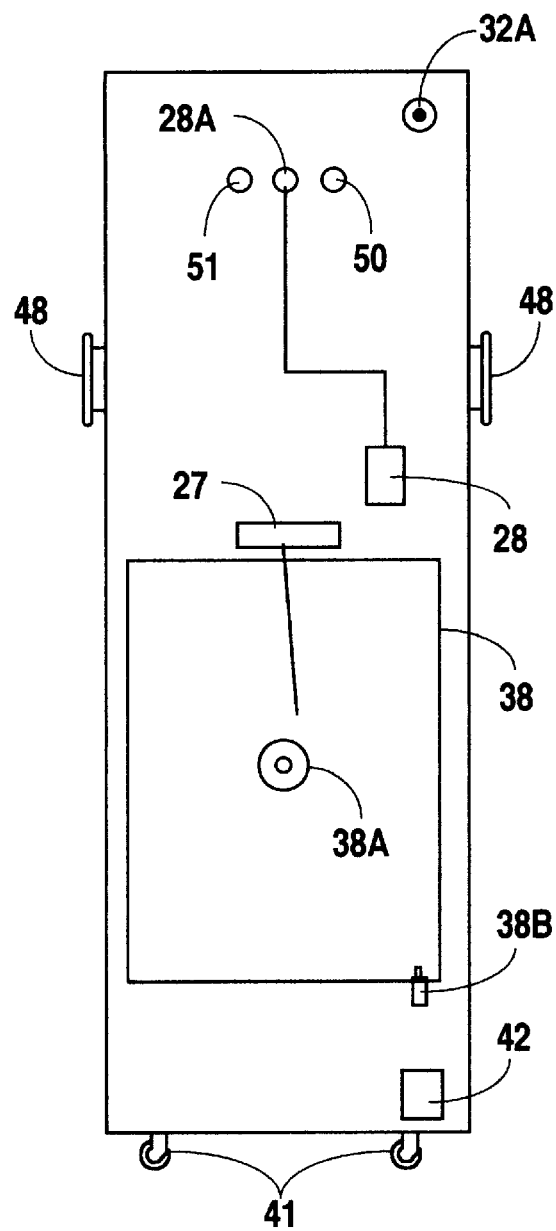
Fig. 3
Fig. 4

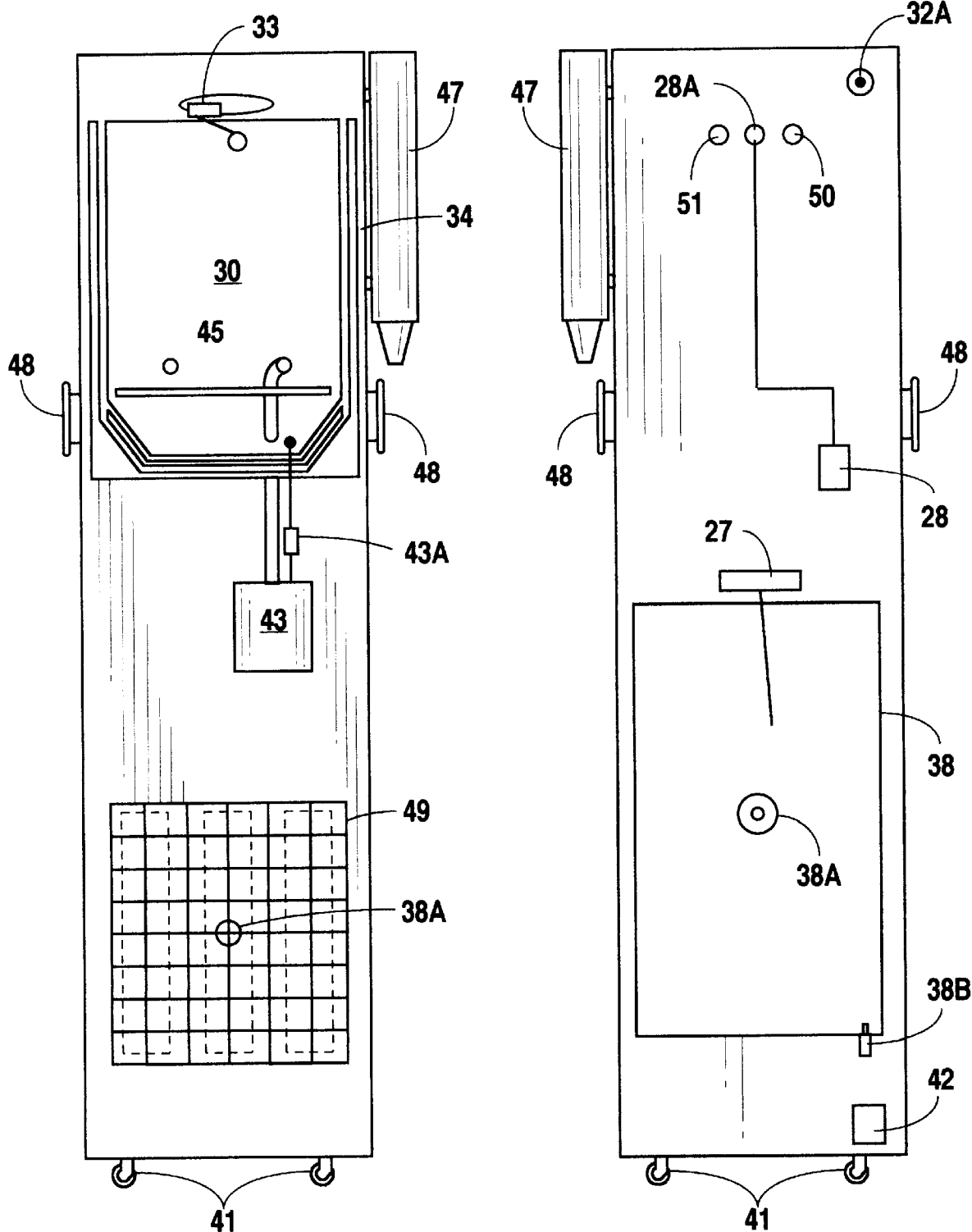

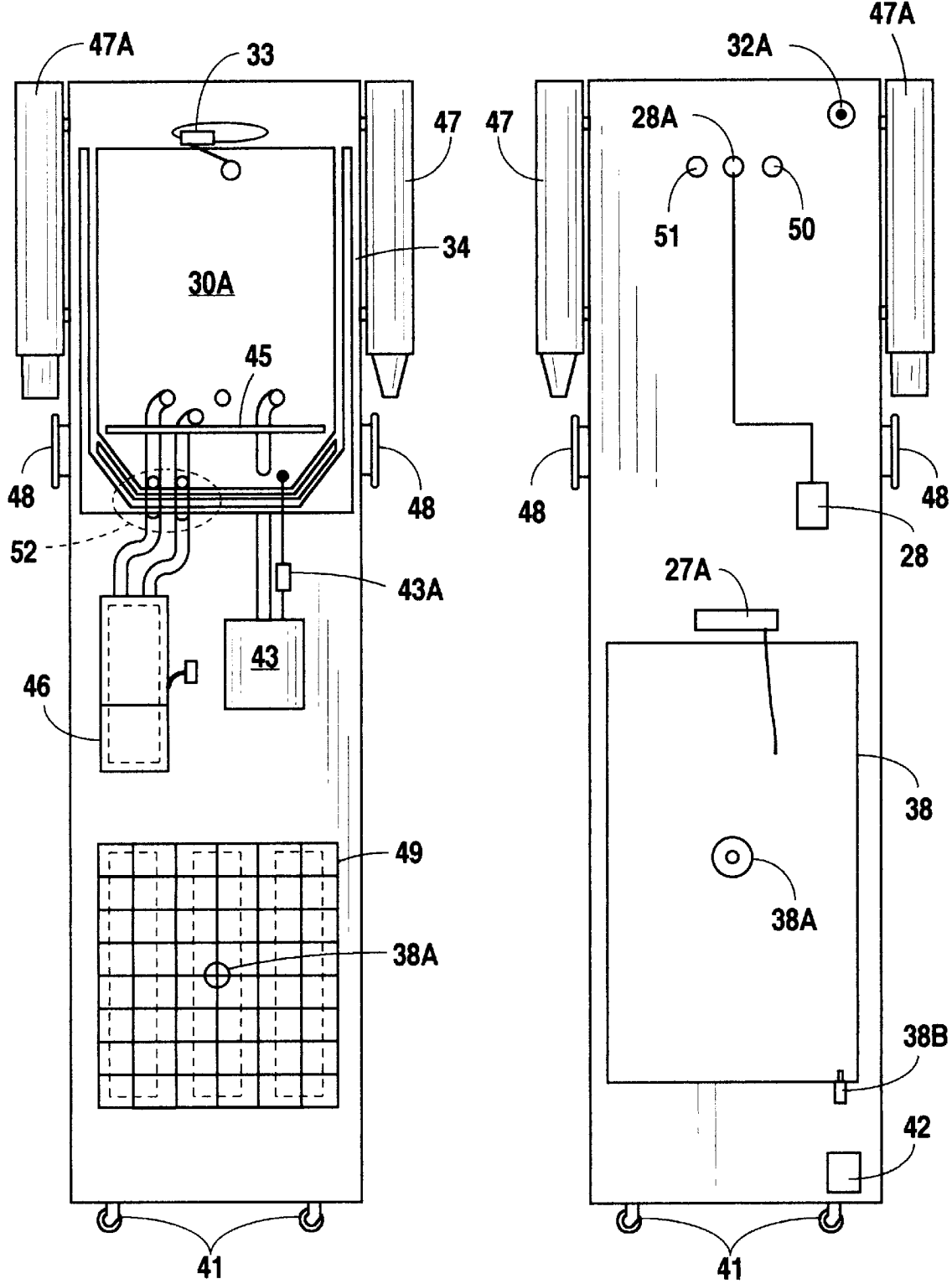

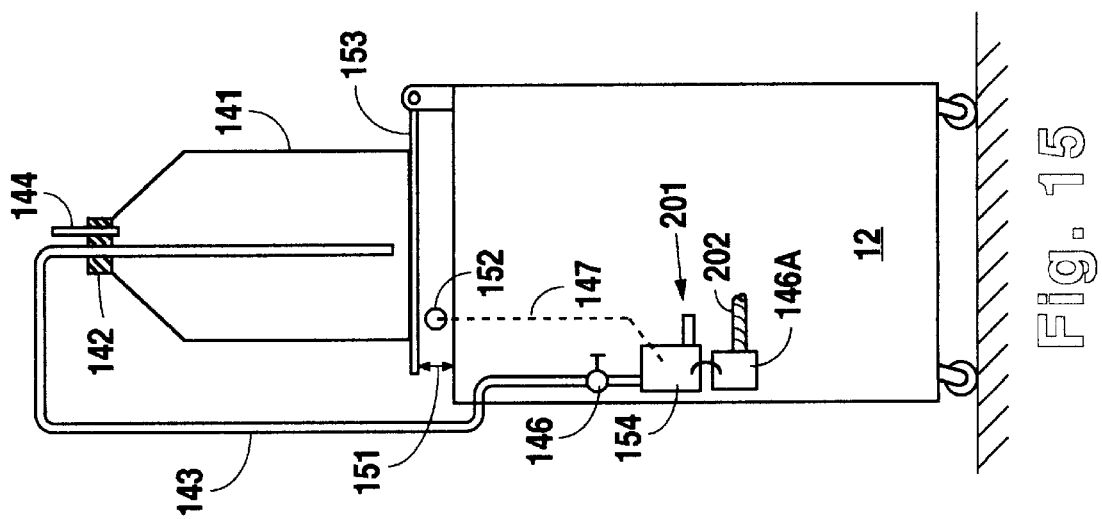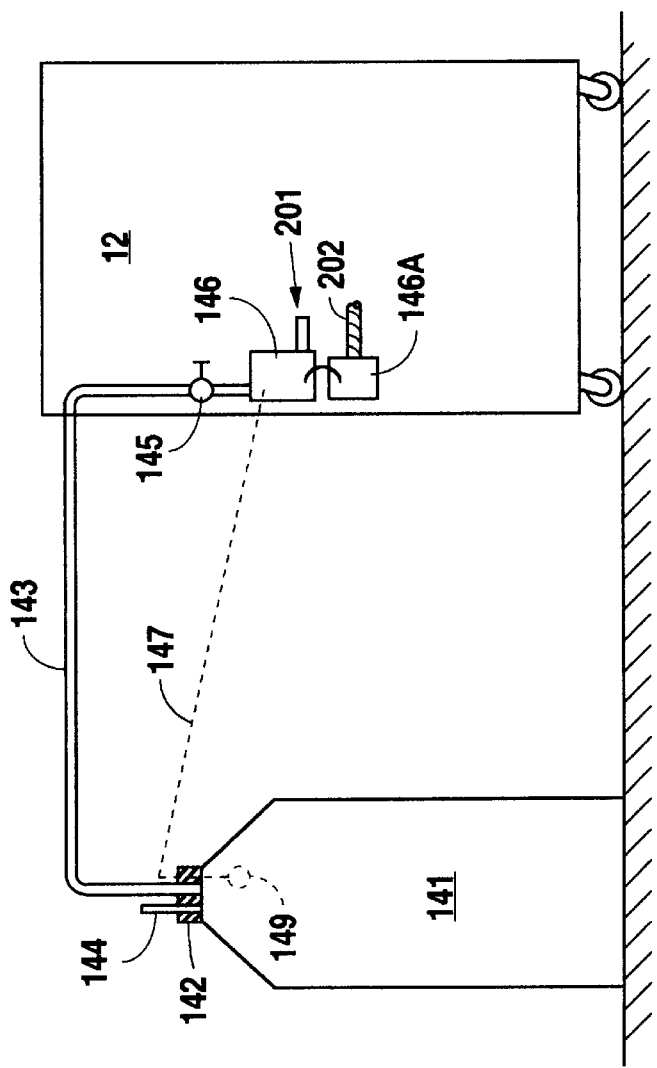

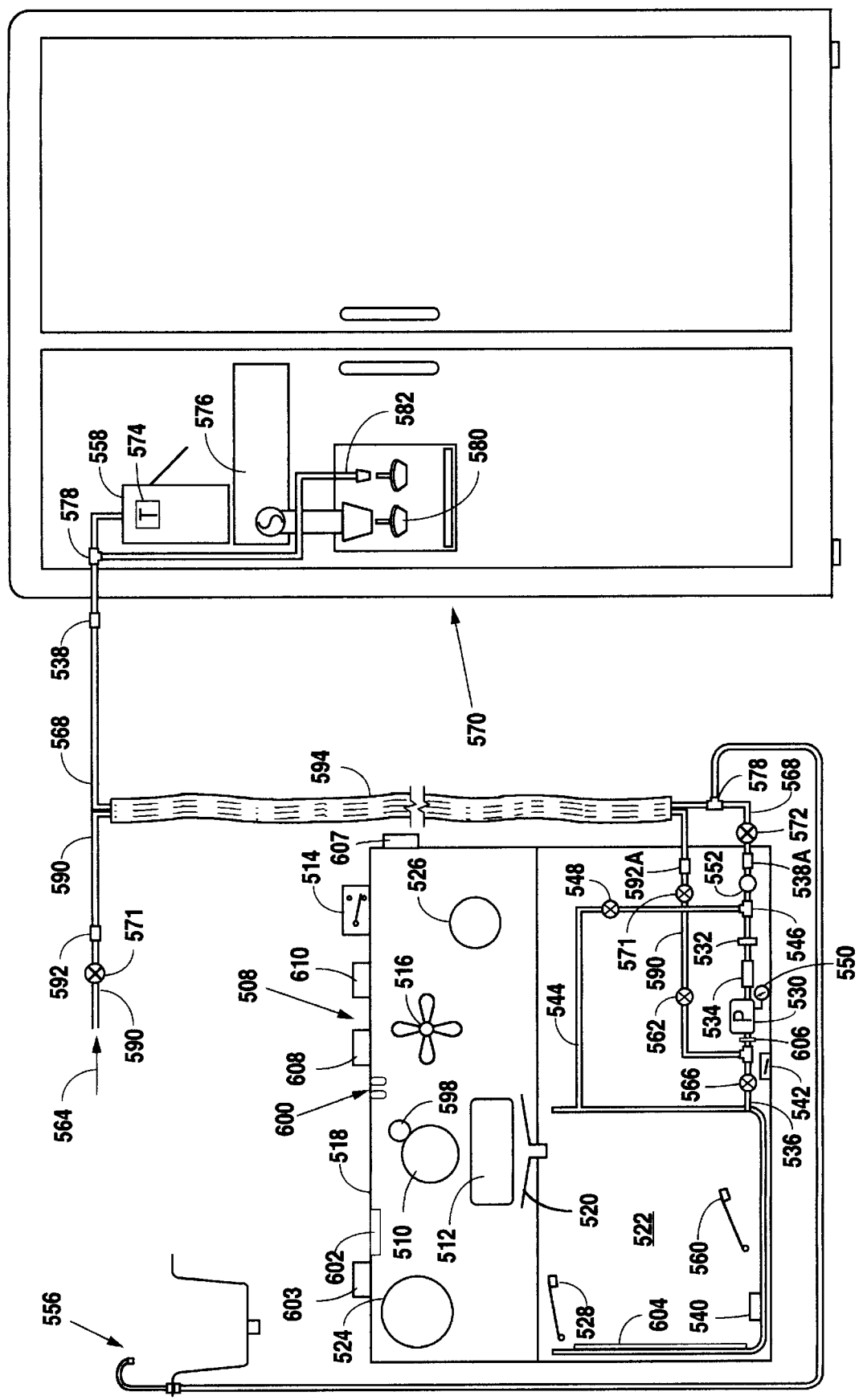

PORTABLE, POTABLE WATER RECOVERY AND DISPENSING APPARATUS

RELATED APPLICATIONS

This application is a continuation-in-part of 09/087,892, filed May 29, 1998, now U.S. Pat. No. 6,058,718 issued on May 9, 2000 which is a continuation-in-part of 08/802,489, filed Feb. 20, 1997 now U.S. Pat. No. 5,845,504 which claimed the priority of U.S. Provisional app. 60/035,753, filed Jan. 6, 1997 and 08/629,305, filed Apr. 8, 1996, now U.S. Pat. No. 5,669,221 issued on Sep. 23, 1997. A related PCT application, WO 97/338272, was filed Apr. 5, 1997 and published Oct. 16, 1997. This application, as well as all the related applications and the issued grant are assigned to Worldwide Water. Inc. of Boerne, Tex. (USA).

TECHNICAL FIELD

This invention relates to a portable, potable water dispenser capable of recovering liquid water for human use from the humidity of environmental air and sanitizing it for human use. The water generator of this invention draws in moisture-laden air from the surroundings and recovers liquid water by cooling the stream of air below its dew point. The unit can be powered from mains, single/3-phase, or portable generators, AC, 110–220 V, 50–60 Hz, DC power 60 V batteries or solar charged batteries. The apparatus includes optional air filters of various types which remove suspended pollen or dust particles so that contaminants and undesirable impurities from the environmental air are not carried into the dew-forming section. The apparatus also includes optional heating cooling devices and ionizing sub-systems. The most important feature of the basic unit and its variants are filtration and sterilization systems which provide purified liquid water free from contaminants and volatile organic compounds (VOC) as defined by NSF Standard 53.

The external envelope of the present apparatus may be a compact, attractive furniture-type wheeled design, one embodiment of which is further adapted to prevent or discourage entry of insects. The water generators of this invention employ ruggedized design and construction and certain embodiments are intended to operate untended for extended periods in harsh, military-type environments such as peacekeeping actions, fires, earthquakes and weather disasters/emergencies. Emergency-use embodiments are prepared with a feed valve manifold connected to an input port; this permits selected or additional inputs of water from any source, such as a swimming pool, in emergency conditions such as a natural disaster. Other embodiments are intended to operate in land-transport vehicles, e.g., off-road, bus, train, seagoing vessels, recreational vehicles, business or home office environments. Further hybrid embodiments lend themselves to incorporation into icemakers, refrigerators, drink coolers, water coolers, etc. Another embodiment includes an automated pressurized valve manifold, equipped with sensors to detect the amount of water being generated, connected to a pressurized municipal water supply to provide for admission of municipal water into the recirculating-purification system; this sub-system would be activated under atmospheric conditions which limit the generation of water from the environmental air. The manifold is pressurized either by the municipal water system or by an internal pump allowing for immediate dispensing of purified water at a drinking fountain or into a refrigerator's ice maker/chiller with or without electricity. Such embodiments include an electronic control, specifically a microprocessor, to sense critical operational parameters of the generator and to activate alternative modes of operation along with related visual and audible mode/status indicators. The control also provides the timing to control recirculation within the apparatus to keep the water pure. When the storage tank is full there is also provision, which is automatically controlled, for actuating an electrically or manually operated diverter valve to pump excess water being generated to an additional system or storage vessel. Still further compact, luggage-type embodiments can be provided for travel or sports use.

A further embodiment employs a combined condensate collector and storage reservoir. An air filter is used to remove suspended pollen or dust particles so that contaminants and undesirable impurities are not carried into the dew-forming section. The apparatus may have municipal water connected by quick disconnect fittings so it may be purified, filtered and dispensed when there is insufficient condensate. Both the condensate and the municipal water is filtered by a water filter certified to meet NSF-53 standards. The water from collected condensate and/or the municipal water is also purified in a bacteriostat which contains appropriate bacteria killing devices such as an ozone generator, an ultraviolet light or an electroytic cell. Further, the apparatus is a size and weight which makes it readily portable and capable of being hung on a wall or placed in the attic, garage or other convenient location favorable for producing condensate. The apparatus has quick disconnect fittings for attaching one or more remote dispensers by flexible tubing. A thermostatically controlled heater guards against freezing. This embodiment also provides an optional recirculation loop and optional computer programmed timer to control the compressor's off/on time interval to maximize condensate collection when the evaporator is freezing due to environmental conditions. Optional digital counters and a digital display contain a humidistat and thermostat, operation indicator lights, and digital counters to indicate system operation or the need for a filter change. Further, the maximum condensate production for any model can only be determined by engineering tables and by testing the model in a controlled environment test chamber. From the results of those tests, a computer program is written and programmed into an optional timer that controls the operation of the compressor for maximizing condensate. The results of the tests also enable the creation of a graph which exhibits expected water production at various temperature/humidity combinations.

Additionally, various embodiments can be fitted with an input port for impure water for priming, for increased output capacity and for operation under conditions when environmental temperature and/ or, humidity do not allow enough water to be generated. Various embodiments also allow for tailoring a generator for specific use to increase efficiency and decrease manufacturing costs.

BACKGROUND OF THE INVENTION

The consensus of most medical experts is that the water supply is the single most critical factor to human health. Over 400,000 people were stricken, 4,000 hospitalized and over 100 people died in Milwaukee in 1993 from Cryptosporidium. a bacterial contaminant in their city-treated drinking water. Natural Resources Defense Council estimates that in the US alone more than 900,000 become ill each year from water-borne disease and as many as 900 will die. There is also an increasing awareness that "bottled water" itself may be no safer than municipally treated water. Some citizens feel protected by household-type water filters. However, of the over 2,000 types/styles/sizes of filters now being sold to the public for additional treating of city water, only a few remove significant amounts of parasites, viruses, bacteria, pesticides and heavy metals. While contaminated water is harmful to adults, infants and young children are at much greater risk from drinking impure water, particularly water with high levels of heavy metals or radioisotopes. Therefore, it is essential that a filter, such as an NSF 53, be used to remove impurities and VOCs. Operation of a water generator in the vicinity of a pesticide plant or during insect spraying, either from the air or truck mounted units, could place VOCs in the generated water. Also, if a generator without an NSF 53 filter is producing water when its host house is sprayed for pest control, the water could be severely contaminated with VOCs.

While the situation is bad in parts of the United States, it is worse in many other developed countries and absolutely frightening in third-world countries. In developing nations, there is often at least intermittent electricity but no source for potable, or human drinking water. For clinics and hospitals in such remote areas, doctors and technicians need purified water for scrubbing and to prepare medicines. In the case of remote villages in developing countries. there is a need for a unit which generates and dispenses purified water, is easily moved, is relatively inexpensive to manufacture and which can operate from a variety of different types of electrical power with a minimum of maintenance.

The most common potable water dispenser for use in the home and office is the 20-liter glass or plastic bottle placed on a gravity-flow dispensing stand. The bottles usually provide processed spring or well water and are generally sold with a representation of compliance with state and local health codes for potable water. One major drawback to "bottled water" is the fact that filled containers are heavy, approx. 25–30 Kg, and awkward to change. Another problem is that algae can build up in the user's stand; this necessitates periodic cleaning to maintain water safety. Relative to dissolved and suspended contaminants and undesired impurities, "bottled water" may be no safer than municipal water.

Today 75% of American homes use chlorine-treated water. A problem that is just beginning to be recognized by the public is the reaction of chlorine with organic materials such as decaying vegetation. These reactions produce by-products known as halogenated organic compounds or trihalomethanes, which are known carcinogens. A recent study concluded that 18% of rectal cancers and 9% of bladder cancers can be attributed to by-products related to water chlorination.

At this time, the USA market for portable, potable water sources requires: (a) generation of high-quality water which is certifiably free of all impurities which are health hazards even to infants and children, (b) no necessity for storing and moving heavy bottles, (c) no requirement for expensive, complex maintenance procedures/ cleaning, (d) low operating cost, (e) no special wiring/ plumbing for installation, (f) attractive, office-furniture styling, (g) a more efficient water generator, (h) a low cost method of increasing the temperature/humidity range of condensate production, (i) a control and display panel indicating system operations, and 0) graphing abilities to indicate expected water production at various temperature/humidity conditions.

BACKGROUND ART

Current US Environmental Protection Agency (EPA) standards for impurities in primary and secondary drinking water are included as p. 32–34 of the publication, "Drinking Water Treatment Units Certified by NSF International", NSF International, Ann Arbor, Mich. (1995). These 1995 drinking water-standards of US Environmental Protection Agency, ANSI/NSF-53, are included by reference. The specific analytical chemistry methods for each impurity covered by NSF-53 are described in EPA publications in U.S. Federal Register. There are several U.S. patents which disclose as the cooling means for a 1U.S. Pat. No. 3,675,442, issued July 1972 to Swanson, Swanson U.S. Pat. No. 4,204,956, issued May 1980 to Flatow, Flatow-956
U.S. Pat. No. 5,149,446, issued January 1991, to J J Reidy, Reidy-446;
U.S. Pat. No. 5,106,512, issued April 1991 to J J Reidy, Reidy-512;
U.S. Pat. No. 5,227,053, issued July 1993 to Brym, Brym-053;
U.S. Pat. No. 5,259,203, issued November 1993 to D R Engel et al, Engle-203;
U.S. Pat. No. 5,301,516, issued April 1994 to F Poindexter, Poindexter-516;
U.S. Pat. No. 5,517,829, issued May 1996 to Michael, Michael-829;
U.S. Pat. No. 5,553,459, issued September 1996 to Harrison, Harrison-459;
U.S. Pat. No. 53,315,830, issued Apr. 7, 1998 to Doke et al. Doke-830;
U.S. Pat. No. 5,701,749, issued Dec. 30, 1997 to Zakryk, Zakryk-749;
U.S. Pat. No. 6,029,461, issued Feb. 29, 2000 to Zakryk, Zakryk-461; and
U.S. Pat. No. 5,704,223, issued Jan. 6, 1998 to MacPherson, MacPherson-223

None of the water generators disclosed in these publications are designed primarily as a dispenser and, none are designed as portable units. Swanson-442, provides a large, heavy apparatus, and specifically teaches that small, portable units are relatively inefficient.

None of these publications disclose the following features or embodiments, many of which are optional depending on the climate or conditions under which the generator is operated:

Integral, external fluid-delivery valves and controls;

Ion generator for discharged air stream;

Insect-resistant port covers/ screens, access doors, edge joints;

Ultrasonic pest deterrent;

Ozone generator for water sterilization treatment;

Handle grips for easy movement by lifting or rolling;

Medical/ food-handling-type tubing and joints for water handling subsystems;

Chemically-inert, thermally-conductive dew-collector surface films;

Working fluids in heat absorbers which comply with 1996-edition DOE, EPA and ASHRAE standards/ regulations (such as refrigerant fluid 406A);

Ruggedized, long-life components and sub-systems;

Safe, convenient dispensing height for hot or cold water;

Electrostatic or conventional air filter with or without whistle alarm for blocked condition;

High Efficiency Particulate Air (HEPA) filter certified to remove pollutants to a size of 0.3 microns;

Night lights for controls and delivery valves for low-light situations;

Air-heating strip and fan (for outside units);

Water filter capable of meeting NSF-53 standards for volatile organic chemicals, VOC;

Recirculation of water during periods of generation or on a predetermined-time-interval basis;

Provision for automatically-introducing municipal water during certain atmospheric conditions;

Provision for changing output vibrational frequency of ultrasonic pest control;

Provision for manual or automatic introduction of water from any source under emergency conditions;

Audible and visual operational status/mode displays;

Quick disconnect provisions for connection to existing appliances such as refrigerators, ice makers, etc.;

Remote location of unit from its dispensers;

Quick disconnect fittings to inlet water line for use of municipal water, after passed through the bacteriostat, when insufficient condensate is present;

Various lengths of flexible water lines having quick disconnect fittings encircled by a sleeve for easy connector of the apparatus to remote dispensers;

A unit with a combined condensate collector and storage reservoir;

A leak detector which shuts off power if a leak is detected;

A unit made portable by its small size and weight;

A unit capable of mounting to a wall;

A unit with a thermostatically controlled heater to prevent freezing in exposed locations;

A means for alternately freezing and thawing the evaporator to produce condensate under normally undesirable conditions, and;

Alternate sterilization methods including ozone generators for purifying and treating discharged air and negatively charging water.

The publications noted above disclose: (a) industrial water-condensation units designed to be permanently-attached to building air ducts or (b) water purifiers, not portable dispensers. Reidy-512 discloses a fixed-position, large-volume, high-rate water generator suitable for supplying drinking water to an entire office building, laundry, etc. The device is described as "having ducts for bringing this supply of ambient air to the device and for releasing the air back outside the device after it has been processed". The attached, permanent "ductwork" is characterized further as "extending through an outside wall of the structure or dwelling". While sensors, indicators, interlocks, alarms for the UV lamps, air filters and water filters are mentioned briefly in Reidy-512, other major components of the apparatus are usually characterized by single-word descriptions such as "air filter element", "evaporator coils", "condenser coils", etc. In both of Reidy's patents, the drain is located on the base of his water generator, a position which makes the drains completely unsuitable for dispensing water unless the machine is placed on legs or mounted in a cabinet. Reidy-512 teaches two passes of water past ultraviolet light tube to kill bacteria whereas the present apparatus provides for automatic, continuing recirculation of the water in the final delivery reservoir through a UV bacteriostat zone. Reidy 512 has a number of additional limitations and shortcomings: the user must set the humidistat and thermostat. Reidy makes no provision for insect proofing of the cabinet. The gravity flow water filter of Reidy-512 is located under the collection pan and is severely limited in both flow rate and minimum pore size by the gravity-feed pressure head. In the present apparatus, water flows through a filter under pressure from a pump; this allows for high rates and small-pore, filter/adsorption media such as a porous-carbon block in the NSF 53 certified filter.

Poindexter-516 has no germicidal light nor a remote collection diverter valve. A drain is shown in FIG. 2 but none in FIG. 1. The drain is shown on the bottom of the apparatus which, if on the floor, is essentially inoperable and, if raised on a stand, makes a top-heavy unit which would require permanent wall anchors.

Engle-203 is essentially two tandem dehumidifiers. A second-stage compressor with its condenser coil immersed in the storage tank produces heated water. One familiar with the art realizes that such heated water would never reach 75 C as does the heated water in the present apparatus.

A further problem of locating the condenser coil in the storage tank is that it prevents removal of the tank for cleaning without opening the refrigerant system. Still further maintenance problems arise from the positioning of drains, i.e., there are no external dispensing valves and the drain valves are poorly located for replacing the valves because of the limited access inherent in their location.

Poindexter-516 claims a stainless-steel air-cooling coil and collection pan which adds significantly to the cost of manufacturing and does not specify the specific type of stainless steel, 314L, which is required for water handling in production facilities. The specification goes into great detail on the types of chemicals usable to clean areas which contact the water. In the present apparatus, the storage containers are completely removable and the condensate is sanitized by passing under the germicidal light several times.

Harrison-459 uses a UV lamp tube to treat the discharge water stream; this indicates that bacteria and or algae may be growing within the unit or its plumbing connections. This unit also must be primed initially with approx. 10 liters of start-up water which can be a source of initial contaminants, such as volatile organic compounds, VOC. which are neither removed nor broken down by either UV radiation or granular carbon charcoal. Whether this technology is compliant with NSF-53 remains a question. In his device, the compressor operates to maintain a cold set-point temperature within the water reservoir, i.e., the compressor operates to cool the fluid remaining in the reservoir even when the device is not actively producing water condensate. In contrast, the present invention saves energy by shutting off when it is not producing water.

Further, the present invention may include a wheeled, furniture-type, user-friendly cabinet complete with carrying handles, disposable cups, related holders, diverter valve and air-filter blockage alert. Also, since the present invention is fitted with a gravity discharge or pressurized line, it is possible to draw water even in the event of a power failure. Harrison's unit, which employs an electric solenoid valve, would not be able to deliver water in the absence of mains power.

Swanson-442 suffers from many of the same deficiencies as Harrison-459; further, it also lacks an air filter or a UV disinfecting system. While Swanson's discharge device is shown on one figure, the location and operating parameters are not specified. Brym-053 provides a UV-activated catalyst water purifier/ dispenser for tap water (well or public supply) which can be installed below the counter or enclosed in a cabinet. This unit merely treats water supplied to it, and in the process, a certain portion of the incoming flow is diverted to waste.

Michael-829 is primarily a device for producing and filtering "drinking" water across "activated charcoal" and a "plastic mesh micropore filter". It is not and is not compliant with NSF-53 re VOC removal. Further, it has no provision for: (a) continuing circulation of water in order to maintain purity, optional heater fan and/ or hot-gas bypass.

All the prior patents cited above use a typical refrigerant deicer system to keep their evaporators from freezing under low condensate flow rates, which can occur with cool ambient air. For example, on sheet 5 of the Reidy-512 patent is an illustration that shows water production stopping at about 10 C. This limitation occurs because: (a) obtaining condensate is inefficient, (b) condensation is not cost effective at such low temperatures and (c) the evaporator tends to freeze over at lower temperatures. This limitation also occurs because of the design of the water generating device using a typical hot-gas bypass deicer which is not computer controlled for temperature/humidity combinations. All of the devices cited are large capacity refrigerant gas dehumidifiers. The refrigerant gas from the compressor cools an evaporator coil and when ambient air is passed by the coil, moisture condenses out and drips to a collector below. When operated over extended periods or in cooler temperatures, the evaporator tends to freeze over due to low flow rate of condensate. In this situation, the compressor is designed to switch over to hot-gas bypass mode. A thermostat and/or humidistat control assists in determining when the compressor switches over. This on/off cycle during cooler temperatures drastically reduces production of water until the compressor eventually stops when temperature of incoming air is too low. However, the present system actually uses the freezing and thawing to produce condensate by one of several compute controlled options for alternately freezing and thawing condensate.

U.S. Pat. No. 5,704,223 issued Jan. 6, 1998 describes and claims a thermoelectric, TE, cooler attached to a medicine-cooler bag containing an insulin vial. Since the drug vial cooler disclosed is a non-circulating, closed, small-volume, sterile-fluid system, there no similarities in structure or function compared to the present invention.

U.S. Pat. No. 5,701,749 issued Dec. 30, 1997 describes and claims a water cooler with a TE cooling junction integrated into the side walls of the holding tank. Because the TE apparatus of the invention is not disclosed in technical terms, it is impossible to compare either its structure or function with the present invention. U.S. Pat. No. 6,029,461 issued Feb. 29, 2000 is a CIP of U.S. Pat. No. 5,701,749. It further describes and claims the water cooler of the '749 patent which further includes a water filter assembly. Again, however, the apparatus is not disclosed in technical terms making it impossible to compare either its structure or function with the present invention.

U.S. Pat. No. 5,315,830 issued May 31, 1994 describes and claims a TE apparatus integrated into an insulated picnic or food-transport container. Because the invention is an air-circulation fan through the wall of the container, it is completely different in structure and function from the present invention.

DISCLOSURE OF THE INVENTION

The present invention is an apparatus to generate drinking water by condensation of moisture from the atmosphere. Alternative embodiments allow tailoring of the system for maximum production and efficiency in varied climates, temperatures and/or settings. Various options for obtaining pure water are utilized as it becomes increasingly more difficult to remove moisture from low humidity or temperature atmospheric conditions. In low humidity conditions, provision is made for automatically purifying municipal water. The system also utilizes the tendency of evaporators to freeze at lower temperatures. By controlling the freezing and thawing, condensate can be produced in temperatures lower that the temperature at which dehumidifiers automatically turn off.

The water generator of the present invention operates within a closed housing and water dispensing subsystems deliver directly to the external dispensing valves. It is not necessary to open the housing every time a small quantity of water is desired. The housing panels and various openings of outdoor embodiments of the present invention are optionally fitted with tight-sealing flanges to prevent insect infestation and environmental contamination of the water; alternatively, such units may be fitted with an optional ultrasonic insect deterrent. Any dispenser that is designed to work in remote, harsh environments must be designed so that the outside envelope is infrequently opened and then only for maintenance. Each opening incident exposes the interior of the housing to infestation by all types of crawling and flying insects such as flies, mosquitoes and to entry of airborne contaminants such as blowing dust. etc.

For embodiments intended for use in a home or office, certain of the insect and dust-sealing features may be omitted and the cabinet implemented with attractive, furniture-type styling. To make the present water generator-dispenser more desirable for office or home use, the unit can be fitted with optional subsystems for producing water at three temperatures, i.e., hot, cold and ambient. Cooling of the water is accomplished by adding a secondary heat absorber source; this absorber may incorporate reverse-cycle cooling or other alternatives such as Peltier-effect or chemical / magnetic cooling effects. Another method of providing cooled water is to add an insulated, horizontal separator-baffle to the reservoir; this baffle separates the upper ambient-temperature water layer from lower, cold water layer. Still another method of chilling water is by incorporating a thermoelectric probe-module as heat absorber 2; the unit is mounted on the outside of the reservoir and cooled by a fan. Water cooling is accomplished by the probe extending into the reservoir and being in good thermal contact with the fluid immediately surrounding it. The probe tip is encompassed within an enclosure of pre-determined size and volume sufficient for anticipated chilled water needs. The enclosure consists of two, spaced-apart, nested cup-like elements fabricated from selected drinking-water compliant materials each of which is provided with hole or aperture arrays to allow low flow rate of water from the reservoir main volume and into the vicinity of the cooling probe. The orifice arrays of the nested enclosure cups are prepared so that no radial pathway from the center-axis of the enclosure exists across both elements. This arrangement allows ambient-temperature water from the main body of the reservoir to infiltrate into the cooled zone surrounding the probe tip. This same zone is provided with a supply tube to the external-delivery valve. Further, if the cups are fabricated from an insulating material, such as a polymer, and the total area of the orifices is optimized, effective thermal separation can be achieved between the zone surrounding the probe and the rest of the reservoir. In this manner, cooled water can be drawn from the interior of the enclosure and the cooling load is reduced because only a small portion of the reservoir volume is being cooled. When cooled water is withdrawn from the enclosure by use of the external delivery valve, a comparable volume is introduced into the enclosure by a flow of ambient-temperature water through the offices. A cold-water-temperature sensor and switch assembly may be provided to control the operation of heat absorber-2 to maintain the predetermined temperature of the cold water zone at approx. 5° C.

To produce hot water, a heated, food-type, stainless steel tank with an insulating jacket is added. The hot water tank is in fluid communication with the heated-fluid delivery control valve and the ambient temperature water in the storage tank. Water at a temperature of up to about 75 C can be delivered from the heated fluid delivery control valve. An alternate method of supplying heated water for delivery from an external valve is to provide an in-line, resistance-heated tube of sufficient length to heat water being delivered from the ambient-temperature zone of the reservoir to the hot-water external valve. Also, an optional electrically or manually controlled diverter valve may be installed to allow pumping into a container outside the housing. The present invention includes provision for automatic recirculation of water in the reservoir through the bacteriostat section even when no water is being removed for external use. Further, the present invention is adapted to be connected to municipal water to provide treated water even in conditions when it is not possible to provide a sufficient quantity of water by condensation. Finally, the present invention is adapted to be able to accept, under emergency conditions, water from a source such as a swimming pool and purify it to emergency drinking-water standards for a temporary period.

An alternate embodiment of the present invention incorporates an attractive closed housing which is considerable smaller than the parent invention. The invention is much lighter incorporating only the essential features necessary for producing and dispensing water. Optional features include, however, automatic use of municipal water, remote dispensers, and a recirculation loop. To enable a smaller housing and lighter device, the condensate collector and storage reservoir are combined. Condensate drips by gravity into a small combined condensate collector and storage reservoir eliminating several now unnecessary parts. Water is pressurized in the apparatus by a single pump which is controlled by a pressure switch. When the pressure switch senses a reduction in pressure, the pump is activated. To achieve water production in lower temperatures, the unit is allowed to freeze and thaw. The freezing and thawing is controlled by a computer program based on tests and/or temperature-humidity engineering tables. The thawing of the gases can be done by hot gas reversal, varying head pressures, timers, and/or heaters. If there is insufficient water production or if it is desired to attach the unit to a home refrigerator ice maker/chiller, a municipal water inlet line may be incorporated by quick disconnect fittings. Accordingly, if there is insufficient condensate, municipal water pressurizes the refrigerator's dispensing system by passing municipal water through the deactivated pump, the NSF 53 filter and the bacteriostat before reaching a dispenser. Further, an optional recirculation loop may be employed enabling recirculation of purified water back into the combined condensate collector and storage reservoir to prevent bacteria build-up. Remote dispensers are connected to the apparatus by flexible tubing having quick disconnect fittings. The distance between the apparatus and its remote sensors may accordingly be varied by simply changing the length of flexible tubing. A sleeve encircles the flexible tubing such that the tubing may neatly and unobtrusively be attached to a wall. To prevent dust and pollen from entering the system, a High Efficiency Particulate Air (HEPA) filter or other electrostatic air filter is used. Further, an air ionizer may be used to further assist in removing particulate matter from the intake air and treating the discharged air.

The water generator/ dispenser of the present invention fills a long-felt need for emerging countries and indeed many places in the world. The design synergism of the present invention is evident from commercial response to the concept. The objects and advantages of the present invention are:

(a) providing a means for obtaining and dispensing potable water from a portable apparatus that is consistent with the decor of an office or home yet requires no permanent external plumbing or air duct, (b) providing an apparatus for heating and chilling potable water collected from the atmosphere, (c) providing an apparatus which can operate indoors or outdoors so as to be available to operate in remote areas, (d) providing an apparatus which can easily be assembled from sealed, ruggedized modules, (e) providing a cabinet apparatus with optional wheels that is portable, i.e., can be rolled about on packed earth, pavement, bare floor or carpeted surfaces.

(f) providing an apparatus which can be operated from DC current supply by attaching solar-electrical generating panels or by variable- frequency, variable AC voltages, single- or 33-phase mains power, 50160 Hz or AC electrical power generated from wind-driven generators, (g) providing an apparatus that has minimal chance of water contamination due to volatile organic compounds, VOCs, insects or rodents, (h) providing an apparatus of simple. modular construction and designed for operation over extended periods without operator attention, (i) producing high-quality, purified water, by preparing the unit with medical-grade tubing and including an inert surface coating on the dew-forming surface, (j) producing liquid-water condensate at air temperatures just above freezing by use of an optional air-heating strip, (k) dispensing potable water at a convenient height for adults or children or persons in wheelchairs, (l) producing contaminant-free potable water while running unattended in open air for extended periods of a month or more above freezing temperatures, (m) producing high-quality, potable water in varied environments such as offices, houses, or jungles.

(n) providing a water generator/dispenser which is easily portable both indoors and outdoors, (o) providing options for dispensing potable water at three different temperatures, ambient, approximately 5 C and approximately 80 C.

(p) producing potable water near or below the cost per liter of bottled water, (q) producing high-quality potable water within latest ASHRAE and US federal standards for cooling and refrigerant apparatus, (r) providing a water generator/dispenser that can be easily transported by two adults using integral carrying handles, (s) providing a water generator/dispenser in which the exhausted air is optionally filtered to remove dust, pollen, and airborne particles, (t) providing a water dispenser from which incoming air is optionally charged with negative ions to facilitate particle separation, and negatively charge the discharged air.

(u) providing a water generator/dispenser which will not produce or deliver condensate if the subsystem for killing microorganisms fails, (v) providing a water generator/dispenser in which the electrostatic filter emits an optional audible whistle alarm when it needs cleaning, (w) providing an optional means without permanent plumbing to connect the apparatus to remote dispensers, (x) providing a means, without permanent plumbing, for connecting municipal water to the apparatus such that municipal water is automatically dispensed after purification if there is insufficient condensate, (y) providing a recirculation loop such that treated water will periodically circulate to prevent bacteria in response to a predetermined command, (z) providing an apparatus which is sized to facilitate mounting and moving, (aa) providing an apparatus with a combined condensate collector and storage reservoir, (bb) providing a means for protecting the apparatus from freezing, (cc) providing a sleeve for encircling exposed flexible tubing, (dd) providing a means for automatically activating and deactivating the pump upon the opening/closing of a dispenser, (ee) providing a means for automatically activating on/off freezing and thawing cycles to produce maximum condensate for various marginal temperature/humidity conditions.

(ff) providing audible and visual operational status/mode displays.

(gg) providing an optional ozone generator for purifying and treating discharged air.

Still further objects and advantages will become apparent from a consideration of the ensuing description and drawings.

BRIEF DESCRIPTION OF THE DRAWINGS

FIG. 1(*b*) is a schematic drawing showing the safety logic and functional interlocks to enable water delivery from the present invention.

FIG. 1(*c*) is a schematic drawing showing the safety logic and functional interlocks to enable water collection by the present invention.

FIG. 1(*d*) is a vertical section view through heat absorber 1 showing the element-profile shape of the cooled heat-exchange surface, particularly the pointed drop guide for rapid draining of liquid dew from the lowest point.

FIG. 1(*e*) is a horizontal section across two adjacent spaced-apart, vertical cooling elements showing the generally horizontal air flow vector between the opposing surfaces and the thickness of minimum and maximum-thickness liquid-dew layers, especially the formation of surface waves due to momentum transfer from the air stream.

FIG. 3 is a diagrammatic rear view of the basic embodiment of the present invention.

FIG. 4 is a cut-away front view, with one vertical panel removed, showing diagrammatically the major components and subsystems of the basic embodiment of the present invention.

FIG. 6 is a cut-away rear view depicting diagrammatically the interior (as viewed from the rear) of a second alternative embodiment of the present invention showing the addition of components to collect and dispense chilled water and ambient-temperature water.

FIG. 7 is a cut-away front-diagrammatic view depicting the front of the second alternative embodiment of the present invention which collects and dispenses potable water, showing the addition of components to produce and dispense chilled and ambient-temperature water.

FIG. 9 is a cut-away rear view showing diagrammatically the interior of the third model of an apparatus that collects and dispenses potable water at ambient, chilled and heated temperatures.

FIG. 10 is a cut-away front view showing diagrammatically the interior of the third model of an apparatus that collects and dispenses ambient, chilled and heated potable water.

FIG. 14 is a schematic view of an alternative embodiment of a cut-down water generator with side-type external reservoir and flow controls.

FIG. 15 is a schematic view of an alternative embodiment of a cut-down water generator with overhead-type external reservoir and flow controls.

FIG. 18b is a schematic view of the potable water flow loop within the hybrid appliance shown in FIG. 18a.

FIG. 22 is a cross sectional view of the embodiment described in Model 4 oriented horizontally to facilitate mounting on a wall shown with a cross section of quick disconnect tubing attaching the embodiment to a refrigerator having built in ice maker and cold water dispenser.

BEST MODES FOR CARRYING OUT THE INVENTION

Figure 1A:
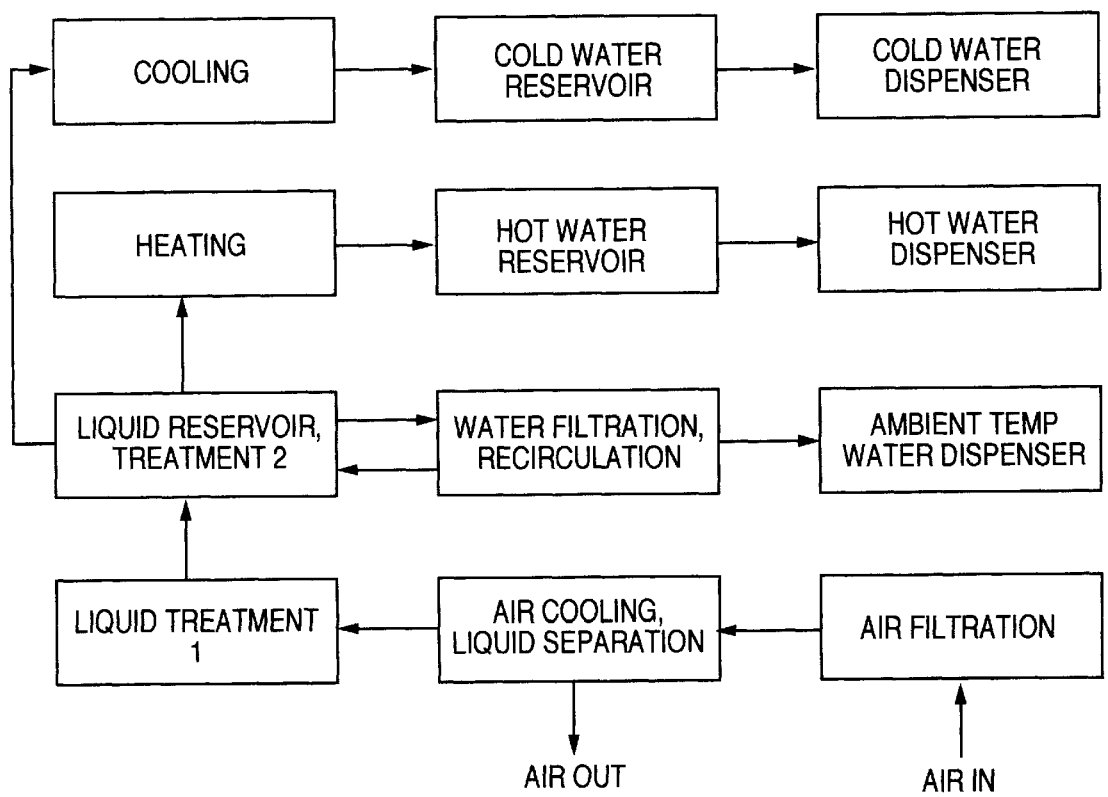
FIG. 1(*a*) is a block diagram showing the individual, functional components, subassemblies, controls, interlocks, alarms and interconnections which comprise the present invention and alternative embodiments which deliver cooled and/or heated water in addition to room-temperature water.
Figure 1B:
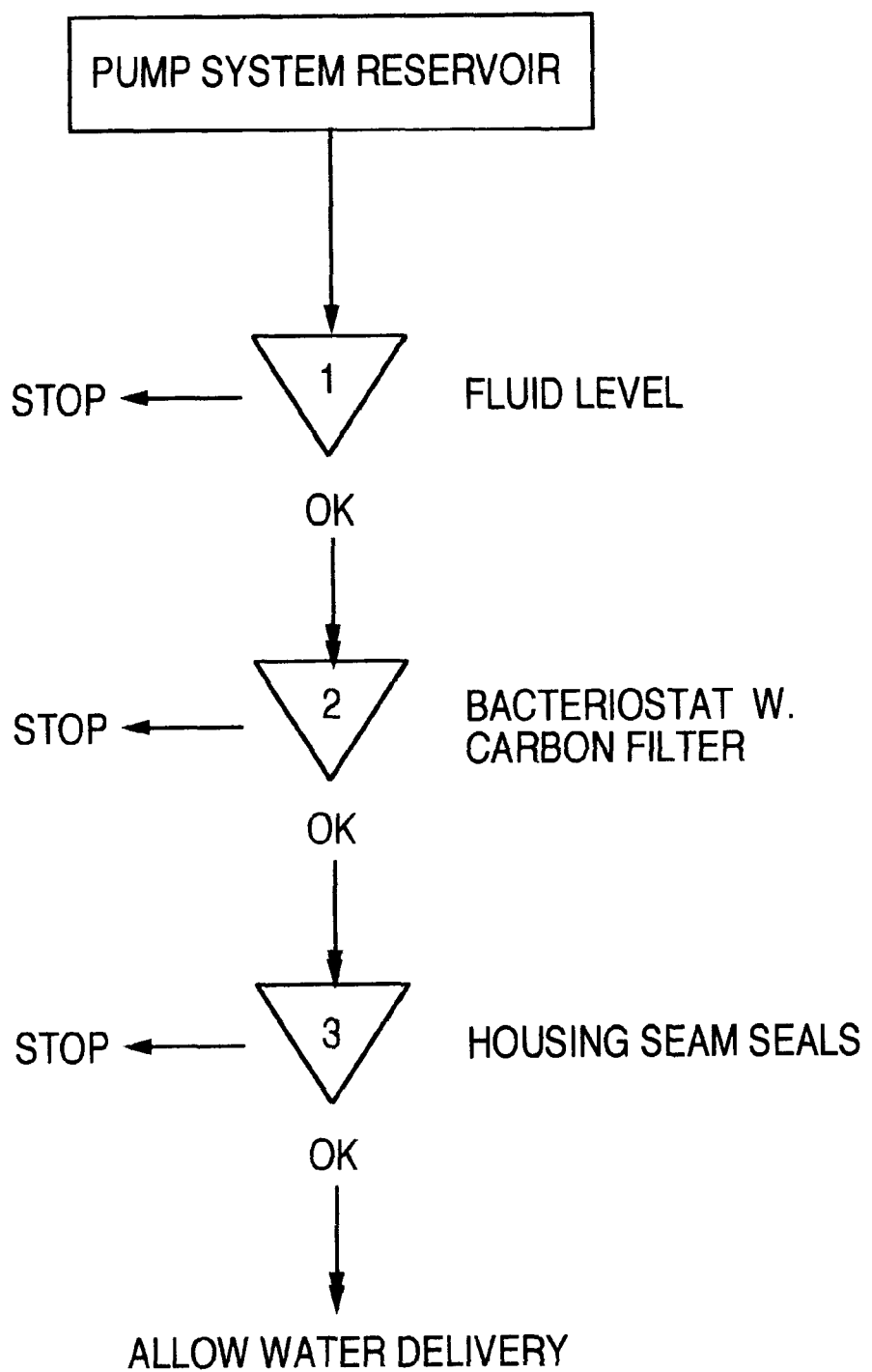
Figure 1C:
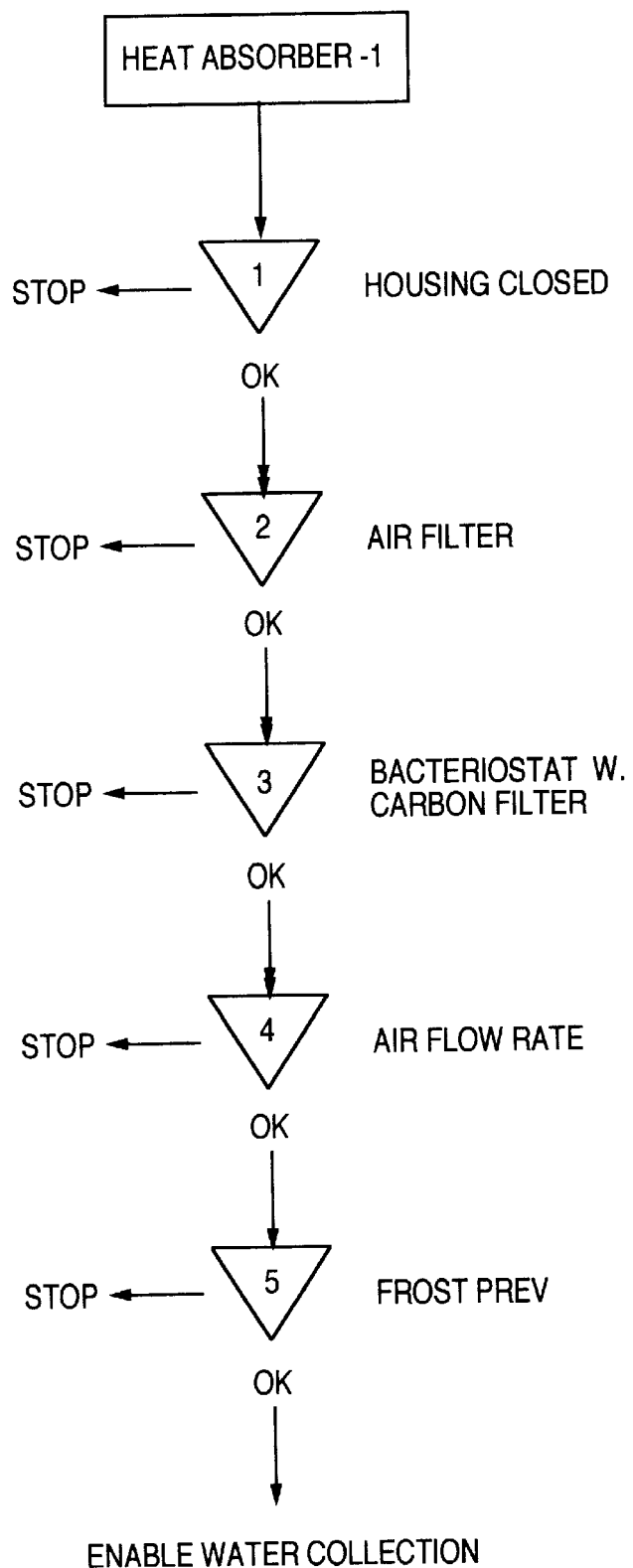
Figure 1D:
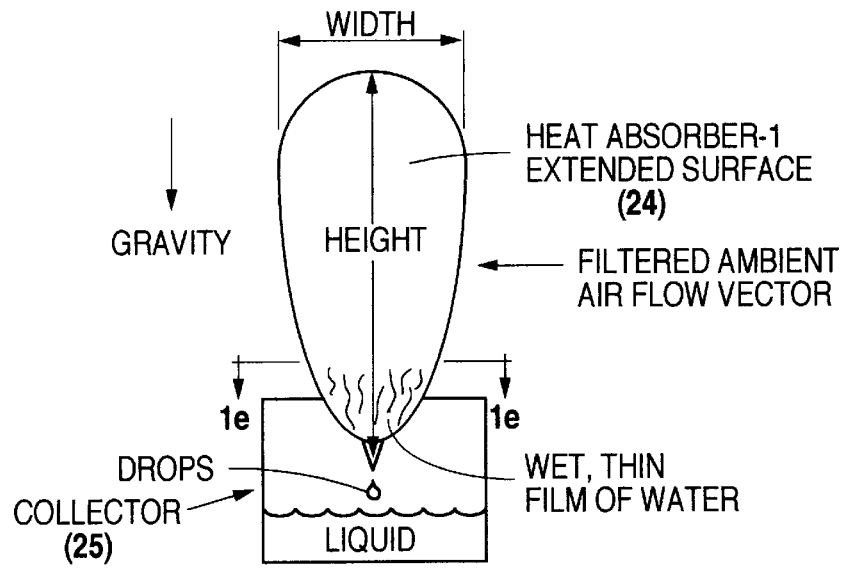
Figure 1E:
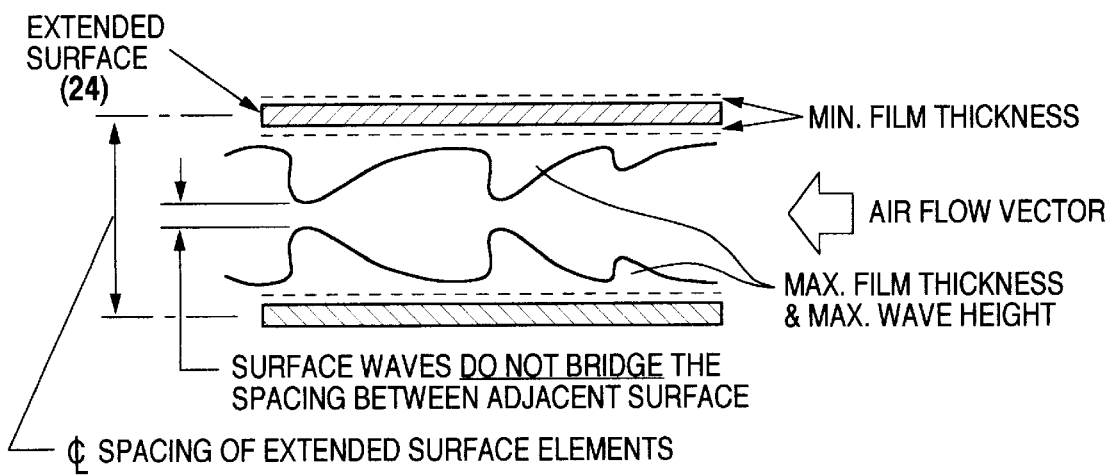
Figure 2:
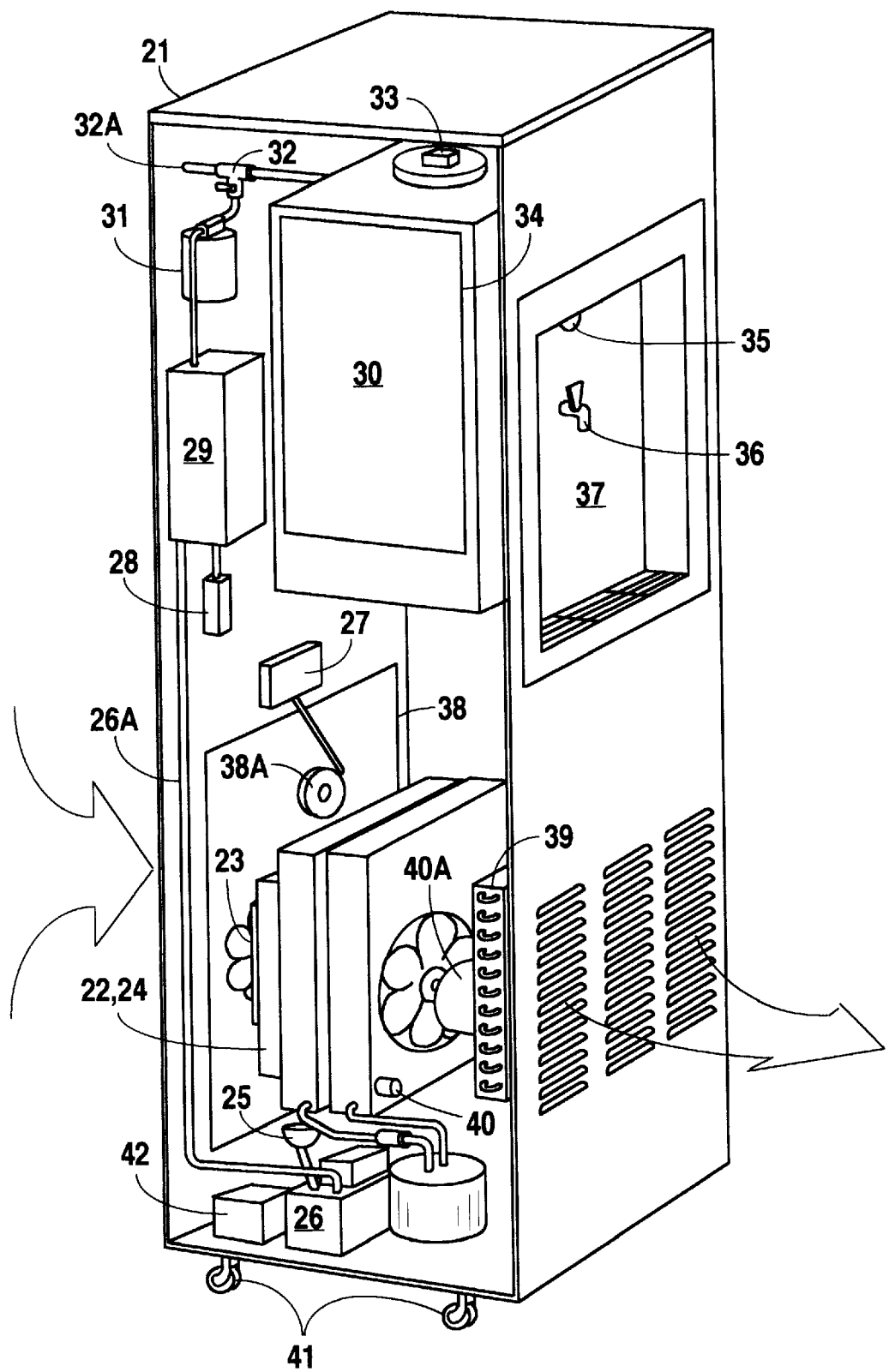
FIG. 2 is a cut-away perspective view, with one vertical panel removed, showing diagrammatically the front and left side of the basic embodiment of the present invention.

Table 1. includes a listing of all special and standard nomenclature used in this specification; the column headed "Indicia" shows the reference number of each feature or element and the column headed "Figure" indicates the figure where the feature or element is first shown. The water collection and treatment processes of the present invention are shown in FIGS. 1(a)–1(c). FIGS. 1(d) and 1(e) show design details of the dew-collecting surfaces of heat absorber 1. The general configuration of the basic water collection system is shown in FIGS. 2–4. The working components are enclosed in a housing (21) with a top cover, four vertical side panels and a base. The housing (21) may incorporate a bracketed opening in the rear cover panel opening through which is inserted an optional electronic air filter (38). The optional air filter (38) contains an optional whistling, audible warning device (38-A) which signals when the air filter needs to be cleaned. Other known warning devices may also be used. An additional optional fail-safe switch (38-B) prevents operation of the system when the air filter (38) is not in place. The housing (21) incorporates a front wall alcove opening and assembly (37) which consists of an alcove shell, grid and waste water receptacle; see also FIG. 11 for an exploded detail. Above the alcove is an optional low-light-level lamp, or "night light" (35). The alcove also contains a fluid delivery control (36) for dispensing ambient-temperature water. One panel of the housing (21) has an inlet opening into the air filter (38) which may include a whistling alarm device (38-A). One panel of the housing (21) provides an opening for air exhaust. This opening has an optional insect-resistant screen (49) on the interior of the housing (21) outlet port.

TABLE 1

Descriptive Nomenclature and Indicia

| Indicia | Description, function | Figure |
| --- | --- | --- |
| 21 | housing, case, cabinet | 2 |
| 22 | heat absorber-1 | 2 |
| 23 | strip heater | 2 |
| 24 | Extended-area of fins | 2 |
| 25 | water, condensate collector | 2 |
| 26 | chamber, condensate pump assy | 2 |
| 26-A | Transparent tube | 2 |
| 26a | pump-failure sensor, signal | 21 |
| 26B | pump-failure relay | 21 |
| 26C | pump-failure solenoid | 21 |
| 26D | pump-failure alarm light | 21 |
| 26E | audible alarm, pump failure | 21 |
| 27 | air ionizer | 2 |
| 28 | UV lamp fail-safe switch | 2 |
| 28a | UV safety interlock, sensor, signal | 21 |
| 28-A | UV lamp fail-safe alarm | 4 |
| 28B | UV safety interlock relay | 21 |
| 28C | UV failure solenoid | 21 |
| 28D | UV light failure alarm light | 21 |
| 28E | audible alarm, UV failure | 21 |
| 29 | UV bactericide lamp | 2 |
| 30 | water storage reservoir | 2 |
| 30-A | ambient-temp. water zone, level | 9 |
| 30a | low-water sensor in reservoir, signal | 17c |
| 31 | water filter assy | 2 |
| 32 | diverter valve | 2 |
| 32-A | diverter valve outlet | 2 |
| 32B | electronic diverter valve | 20d |
| 32C | diverter valve relay | 21 |
| 32D | diverter valve solenoid | 20d |
| 32E | diverter valve switch | 21 |
| 33 | storage reservoir float switch, lid | 2 |
| 34 | insulat. jacket, storage reservoir | 2 |
| 35 | Night light | 2 |
| 36 | delivery valve, ambient temp water | 2 |
| 36-A | delivery valve, cold water | 8 |
| 36-B | delivery valve, hot water | 8 |
| 37 | wall alcove assy | 2 |

TABLE 1-continued

Descriptive Nomenclature and Indicia

| Indicia | Description, function | Figure |
|---|---|---|
| 38 | electrostatic filter | 2 |
| 38-A | whistle alarm | 2 |
| 38-B | fail-safe switch, filter | 2 |
| 39 | ozone generator | 2 |
| 40 | defrost sensor, heat absorber | 2 |
| 40-A | multi-speed intake fan assy. | 2 |
| 41 | Casters, wheels | 2 |
| 42 | Vibratory, ultrasonic pest control | 21 |
| 42C | pest control freq. relay | 21 |
| 43-A | cold water temp sensor, switch | 6 |
| 44 | heat absorber 2, cooled surface | 5 |
| 44B | encompassing, perforated inner enclosure, thermal isolation, cooling probe zone | 20d |
| 44C | encompassing, perforated outer enclosure, thermal isolation, cooling probe zone | 20d |
| 44D | Perforations in inner, outer enclosures | 20d |
| 45 | floating, insulating separator | 5 |
| 46 | hot water tank assy | 9 |
| 46-A | hot water temp control, switch | 12 |
| 46B | inline hot water heater switch, sensor, signal | 20d |
| 46C | inline hot water heater | 20d |
| 46D | inline hot water flow through timer relay | 21 |
| 46E | heated-water flow control solenoid | 21 |
| 46F | Peltier cooling probe | 17c |
| 47 | Dispenser, cups, cold, RT fluid | 6 |
| 47-A | Dispenser, cups, hot fluid | 9 |
| 49 | insect screen | 3 |
| 50 | manual on-off control | 4 |
| 51 | multi-speed fan switch | 4 |
| 52 | quick-disconnect assy | 9 |
| 52-A | male quick-connect, ambient | 9 |
| 52-B | female quick-connect, ambient | 9 |
| 52-C | male quick-connect, hot water | 9 |
| 52-D | female quick-connect, hot water | 9 |
| 141 | external reservoir | 14 |
| 142 | seal plug | 14 |
| 143 | flexible external plug | 14 |
| 144 | vent w. barrier | 14 |
| 145 | manual valve | 14 |
| 146 | Low Volt. solenoid valve | 14 |
| 146-A | Low Volt. transformer | 14 |
| 147 | Low Volt. leads | 14 |
| 148 | flexible sheath | 14 |
| 149 | level sensor | 14 |
| 151 | counter force | 15 |
| 152 | mass sensor | 15 |
| 153 | pivoting support plate | 15 |
| 161 | seal adapter | 16 |
| 162 | level sensor | 16 |
| 163 | water tube | 16 |
| 164 | vent tube | 16 |
| 165 | flexible zone, sheath | 16 |
| 171 | Branching valve, interface | 17a |
| 172 | splitter valve, interface | 17a |
| 201 | UV radiation module | 18b |
| 202 | float switch, pump enable, level control, collector | 18b |
| 203 | "OR" valve, solenoid | 18b |
| 204 | Icemaker | 18b |
| 205 | valve, icemaker branch, solenoid | 18b |
| 206 | valve, reservoir, pump enable, level control/reservoir | 18b |
| 207 | vent w. bacterial barrier | 18b |
| 208 | supply, pressure head | 18b |
| 209 | return, gravity head | 18b |
| 220 | refrigerant compressor | 18a |
| 221 | refrigerant condenser | 18a |
| 222 | "reciprocal AND" valve 1 w. branch flow controls | 18a |
| 223 | "reciprocal AND" valve 2 w. branch flow controls | 18a |
| 224 | refrigerant accumulator | 18a |
| 225 | freezer/icemaker evaporator | 18a |
| 226 | high-pressure refrigerator line | 18a |
| 227 | low-pressure refrigerator line | 18a |
| 230 | icemaker cabinet front elevation | 19a |
| 231 | ice-access door, right-hinged w. handle, left edge | 19a |
| 232 | exterior grip handles, left, right side panels | 19a |
| 233 | exterior potable water faucet | 19a |
| 234 | holder/dispenser for disposable cups | 19a |
| 235 | air inlet w. grille, filter | 19a |
| 236 | supporting surface, floor | 19a |
| 240 | icemaker cabinet, front/interior | 19b |
| 241 | manual trim valve, recirculation flow cont. | 19b |
| 242 | water, pressure supply | 19b |
| 243 | water, pressure return, recirculation | 19b |
| 243a | recirculation line | 17c |
| 243B | incoming water solenoid | 21 |
| 243C | recirculation line relay | 20d |
| 243D | incoming water solenoid | 21 |
| 244 | water, pressurized reservoir | 19b |
| 244B | water input connection, seal, cover | 20d |
| 244C | emergency water input solenoid | 20d |
| 244D | emergency water input relay | 21 |
| 244E | emergency water input switch, signal | 20d |
| 245 | ext. potable water faucet | 19b |
| 246 | reservoir inlet check valve | 19b |
| 247 | flow control valve to icemaker, solenoid | 19b |
| 280 | flow-routing controller | 17c |
| 280A | control circuits, discrete, IC, microprocessor | 17c |
| 280B | low-voltage transformer | 21 |
| 280C | Fuses | 21 |
| 280D | low-voltage power circuit for microprocessor | 21 |
| 280E | clock and timing circuit, microprocessor | 21 |
| 280F | pest control frequency changer | 21 |
| 280G | incoming power w. optional on/off switch | 21 |
| 280H | piezoelectric device for generating distinctive audible alarms | 21 |
| 280I | outgoing power to heat absorber-a | 21 |
| 280J | outgoing power to pump | 21 |
| 280K | outgoing power to UV source | 21 |
| 280L | outgoing power to heat absorber-2 | 21 |
| 300 | booster pump for internal treatment filter and/or external pressurized water delivery | 17c |
| 301 | booster pump check valve | 17c |
| 302 | pressure sensor | 17c |
| 302A | pressure sensor signal to microprocessor | 21 |
| 302B | booster pump relay | 21 |
| 303 | cold water switch | 20a |
| 303b | pressurized reservoir | 17c |
| 304 | hot water switch | 20a |
| 304a | recirculation solenoid | 17c |
| 304b | recirculation relay | 21 |
| 305 | cold water safety interlock, valve | 20a |
| 306 | hot water safety interlock | 20a |
| 307 | cold water display, lamp, LED | 20a |
| 307a | icemaker water input solenoid in household refrigerator | 17c |
| 308 | hot water display, lamp, LED | 20a |
| 309 | vehicle power, ignition, cold | 20a |
| 310 | water-syst. elect. safety fuse | 20a |
| 311 | water-syst. main switch | 20a |
| 311a | spilled water sensor, signal | 21 |
| 311A | spilled water sensor relay | 21 |
| 311B | spilled water solenoid | 21 |
| 311C | spilled water alarm light | 21 |
| 311D | audible signal spilled water | 21 |
| 312 | reservoir fluid lev. sensor/switch | 20a |
| 313 | circ. pump/UV indicator, lamp, LED | 20a |
| 314 | circulation pump | 20a |
| 315 | power circuit for UV source | 20a |
| 315a | water-condition sensor, signal | 21 |
| 316 | display UV source, lamp, LED | 20a |
| 316a | sensor input for future use | 21 |
| 316b | circuit or relay for future use | 21 |
| 317 | UV source and switch | 20a |
| 318 | heater-power interlock, no water | 20a |
| 319 | thermostat control (triangle) | 20a |
| 320 | display, heater "on", lamp, LED | 20a |
| 321 | thermostat.-cont heat element | 20a |
| 322 | display, temp satisfied, lamp, LED | 20a |
| 323 | switch for D203display | 20a |
| 325 | cold water delivery valve | 20b |
| 326 | hot water delivery valve | 20b |

TABLE 1-continued

Descriptive Nomenclature and Indicia

| Indicia | Description, function | Figure |
|---|---|---|
| 327 | hot water check valve | 20b |
| 328 | housing for heater | 20b |
| 329 | NSF-53 comp. carbon-block filter | 20b |
| 330 | check valve, pressurized system | 20b |
| 331 | valved reserv. drain line | 20b |
| 333 | enclosure, UV source | 20b |
| 334 | valved impure priming water input | 20b |
| 335 | condensate diverter valve | 20b |
| 336 | veh. condensate, unpressurized | 20b |
| 337 | veh. AC heat-exch. cover | 20b |
| 339 | sealed UV window, reservoir | 20b |
| 340 | condensate reservoir | 20b |
| 341 | UV reflective foil, exterior | 20b |
| 342 | condensate inlet to reservoir | 20b |
| 342 | condensate inlet to reservoir | 20b |
| 343 | condensate overflow | 20b |
| 344 | reservoir outlet line to pump | 20b |
| 345 | check valve, pressurizing | 20b |
| 346 | hot water low line | 20b |
| 347 | cold water flow line | 20b |
| 350 | hot water enable switch, console | 20c |
| 351 | cold water enable switch, console | 20c |
| 352 | instruction manual, retrofit kit | 20b |
| 353 | driver console | 20b |
| 354 | retrofit kit | 20b |
| 355 | periodic recirculation chamber | 20b |
| 356 | timing and valve-seq. controller | 20b |
| 357 | controllable check valve, timing | 20b |
| 358 | recirculation lines | 20b |
| 359 | on/off switch for timing | 20b |
| 360 | additive and metering dispenser | 20b |
| 361 | flap-check valve, condensate dischg. | 20b |
| 363 | pressurized portion of system | 20b |
| 406 | line and connection, ext. appliance | 17c |
| 407 | input solenoid, ext. appliance, refrigerator, icemaker | 17c |
| 409 | household refrigerator w. icemaker attachment | 17c |
| 409 | ext. refrigerator, icemaker | 17c |
| 410 | inlet line ck. Valve | 17c |
| 500 | Peltier probe, ext. portion | 20d |
| 501 | ext. fan for Peltier probe hot junction | 20d |
| 508 | housing, case, cabinet | 22 |
| 510 | dehumidifier, compressor | 22 |
| 512 | evaporator | 22 |
| 514 | on/off switch | 22 |
| 516 | fan | 22 |
| 518 | HEPA filter | 22 |
| 520 | funnel | 22 |
| 522 | combined condensate collector and storage reservoir | 22 |
| 524 | ion generator | 22 |
| 526 | heater | 22 |
| 528 | storage reservoir float switch or electric switch | 22 |
| 530 | pump | 22 |
| 532 | NSF 53 water filter | 22 |
| 534 | UV light (bacteria killing device) | 22 |
| 536 | discharge line | 22 |
| 538 | quick disconnect point | 22 |
| 538A | quick disconnect point | 22 |
| 540 | alternate location for bacteria killing device | 22 |
| 542 | leak detector switch | 22 |
| 544 | recirculation loop | 22 |
| 546 | quick disconnect point | 22 |
| 548 | recirculation solenoid | 22 |
| 550 | pump timer | 24 |
| 552 | pressure switch solenoid | 22 |
| 554 | dispenser | 22 |
| 556 | dispenser | 22 |
| 558 | dispenser, ice maker | 22 |
| 560 | low condensate switch | 22 |
| 562 | inlet water solenoid | 22 |
| 564 | municipal water | 22 |
| 566 | check valve | 22 |
| 568 | flexible discharge line | 23 |
| 570 | refrigerator | 22 |
| 571 | cut off valve | 22 |
| 572 | cut off valve | 22 |
| 574 | ice maker's timer | 22 |
| 576 | ice tray | 22 |
| 578 | "tee" connector | 22 |
| 580 | ice discharge | 22 |
| 582 | cold water faucet | 22 |
| 584 | housing, case, cabinet | 24 |
| 586 | wheels | 24 |
| 588 | handles | 24 |
| 590 | flexible tubing water line | 23 |
| 592 | quick disconnect point | 23 |
| 592A | quick disconnect point | 23 |
| 594 | sleeve/jacket | 23 |
| 596 | elongated portion of sleeve/jacket | 23 |
| 598 | computer programmed timer | 22 |
| 600 | thermostate/humidistat | 22 |
| 602 | operation display panel | 22 |
| 603 | fan speed control | 22 |
| 604 | digital water level sensor display | 22 |
| 606 | total production digital counter | 22 |
| 607 | estimated water production chart | 22 |
| 608 | recirculation switch | 22 |
| 609 | overflow indicator | 22 |
| 610 | bacteriostat safety switch display | 22 |

Figure 13:
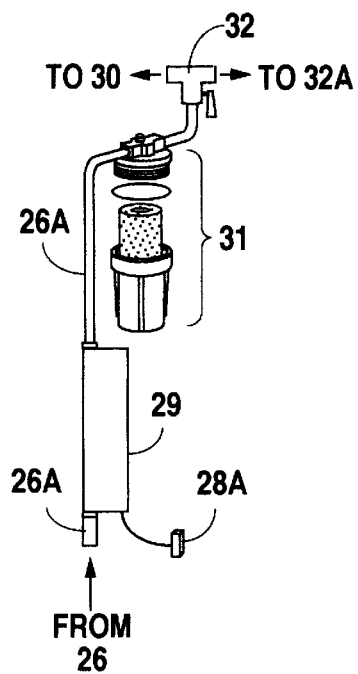
FIG. 13 is an exploded perspective view showing diagrammatically the details of bacteriostat, including the activated-carbon block VOC filter, for the basic embodiment of the present invention.
Figure 12:
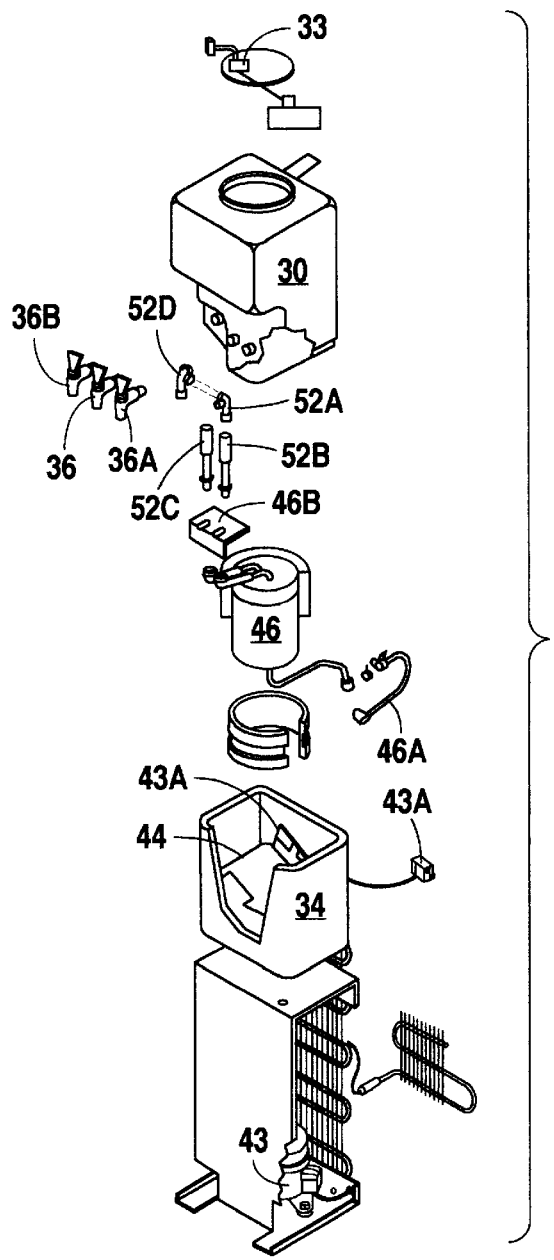
FIG. 12 is exploded perspective view showing diagrammatically the cold fluid tank, quick disconnects, heated fluid tank assembly, including connections, insulated jacket and the secondary heat absorber for an embodiment which collects and dispenses ambient, chilled and heated potable water.

Operation of the apparatus is initially controlled by the manual on/off switch (50) located on the housing (21). The variable-speed fan control switch (51) is adjacent to the on/off switch (50) on the housing (21). Air Flow and Treatment. Air entering the housing first passes through the replaceable air filter (38) and across the optional, self-contained ionizing device (27). Air then is drawn past an optional heating strip and fan assembly (23). then across heat absorber-1 (22) and film-coated, dew-forming surfaces (24) by an optional multi-speed intake fan assembly (40-A), which is controlled by the optional multi-speed fan control switch (51). Liquid condensate flows by gravity into the enclosed sump (25) and pump system reservoir (26). The pump system (26) has a self-contained switch and liquid-level sensor which shuts off heat absorber-1 (22) when the reservoir is filled. From the pump reservoir. condensate flows through a section of tubing (26-A) and is recirculated through a bacteriostat subsystem i.e., a pump, carbon block VOC filter (31) and a ultraviolet germicidal light for killing bacteria (29). This subsystem is controlled by a fail-safe switch (28) connected to a fail-safe indicator light (28-A), as shown in more detail in FIG. 13. The bacteriostat indicator light (28-A) is located on the housing (21). As shown in FIG. 1(d), heat absorber-1 includes an array of extended-surface elements which are in good thermal connection with heat-sink contact zones at predetermined locations. The heat-sink points are mechanical-thermal connections adapted to remove heat from the extended surface and transfer it into an external environment. A variety of known heat sink techniques can be used to cool the surfaces of heat absorber-1 or -2, including classic boiling fluids contained in tubes, thermoelectric elements, and heat pipes. The heat-sink points are located at intervals of approx. 40–100 mm along the vertical direction of the extended area. The section profile of the bottom of the collector tray may be rectangular or half circle. As shown in FIG. 1(e) the extended surface elements are generally parallel and spaced apart a predetermined distance to avoid bridging over of surface waves due to heavy or maximum condensate flows and high air-flow velocities. The minimal condensate film thickness is indicated by dashed lines; this thickness corresponds to the condition when the air heaters are activated and operating at maximum power to prevent icing over.

Water in the reservoir is recirculated through the bacteriostat subsystem, including the activated-carbon VOC final filter system assembly (31). The final water filter is fitted with a replaceable activated-carbon VOC adsorbent cartridge which is capable of removing organic contaminants, cysts and heavy-metal compounds. Processed water is then held in fluid reservoir-1, (30), which includes an optional form-fitted insulating jacket (34); through use of a manual (32) or electronically-controlled diverter valve (32-B), processed water can also be delivered through a35diverter valve outlet (32-A) to a large external collection container. The water level in the fluid tank (30) is controlled by the electrically-operated sensor switch and lid assembly (.33), which causes the pump (26) to cease operation when the fluid tank (30) is filled.

Ambient temperature water is dispensed from the fluid reservoir (30) via the ambient fluid delivery control (36). Disposable liquid containers, e.g., paper cups, suitable for cold water, are provided from optional attached dispenser (47) mounted on the side of the housing.

In alternative embodiments, fluid reservoir-1 (30) is removable from the housing for cleaning without removing its insulated jacket (34). This is accomplished by pulling aside the level sensor and lid assembly (33), which remains in the unit. The ambient fluid delivery control (36) remains affixed to the fluid tank (30). The fluid tank (30) can be cleaned using cleaning materials appropriate to its materials of construction and in accordance with public health requirements governing use of cleaning materials for food handling and potable water systems. By design of alternative embodiments of the present invention, mechanical removal of fluid reservoir-1 (30) is simple, and can be accomplished without disturbing the permanent tubing connections.

Additional and Optional Features. The housing (21) may be fitted with an optional ozone generator (39) adjacent to the departing air stream to further improve air quality. The housing (21) may also contain an optional warbling, ultrasonic pest-control device (42) which operates continuously. To provide for mobility of alternative embodiments of the apparatus, four casters or rollers (41) suitable to the weight and size of the present invention may be affixed to the four corners of the lower side of the base of the housing (21). Optional carrying handles, suitable to the weight and size of the present invention, may also be fixed, one on each side of the housing (21) at a height appropriate for transport by two adults.

ALTERNATIVE EMBODIMENTS

Figure 5:
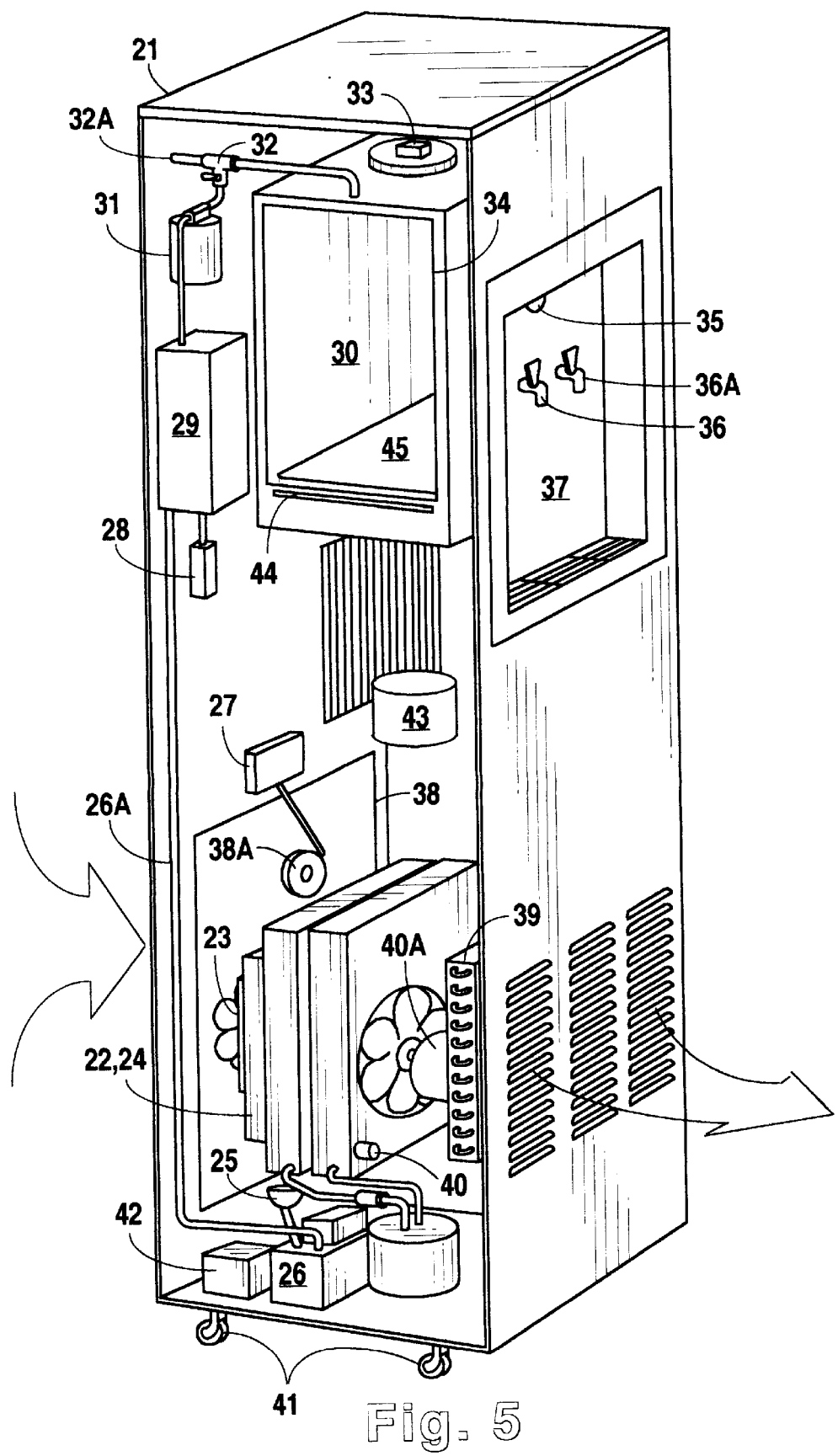
FIG. 5 is a cut-away perspective view, with one vertical side panel removed, depicting a second alternative embodiment of the present invention showing the addition of components to la collect and dispense both room-temperature and chilled water.

Model 2. As shown in FIGS. 5–7. another embodiment of the present invention, Model 2, contains all elements of the basic model and also dispenses chilled water at a nominal temperature of 5° C. in addition to ambient temperature water. The chilled water is produced by alternative methods.

The first method is to incorporate a secondary heat sink, heat absorber-2, (43), which is controlled by the cold water temperature sensor and switch assembly (43-A). The heat-exchange probe (44) of heat absorber 2 is positioned between the insulation jacket (34) and the cold fluid tank (30A). An insulated baffle (45) is located in the cold fluid storage tank (30A) allowing for ambient water to be stored above the baffle and chilled water to be stored below the baffle.

Chilled water is dispensed via the chilled fluid delivery control (36-A).

Figure 20A:
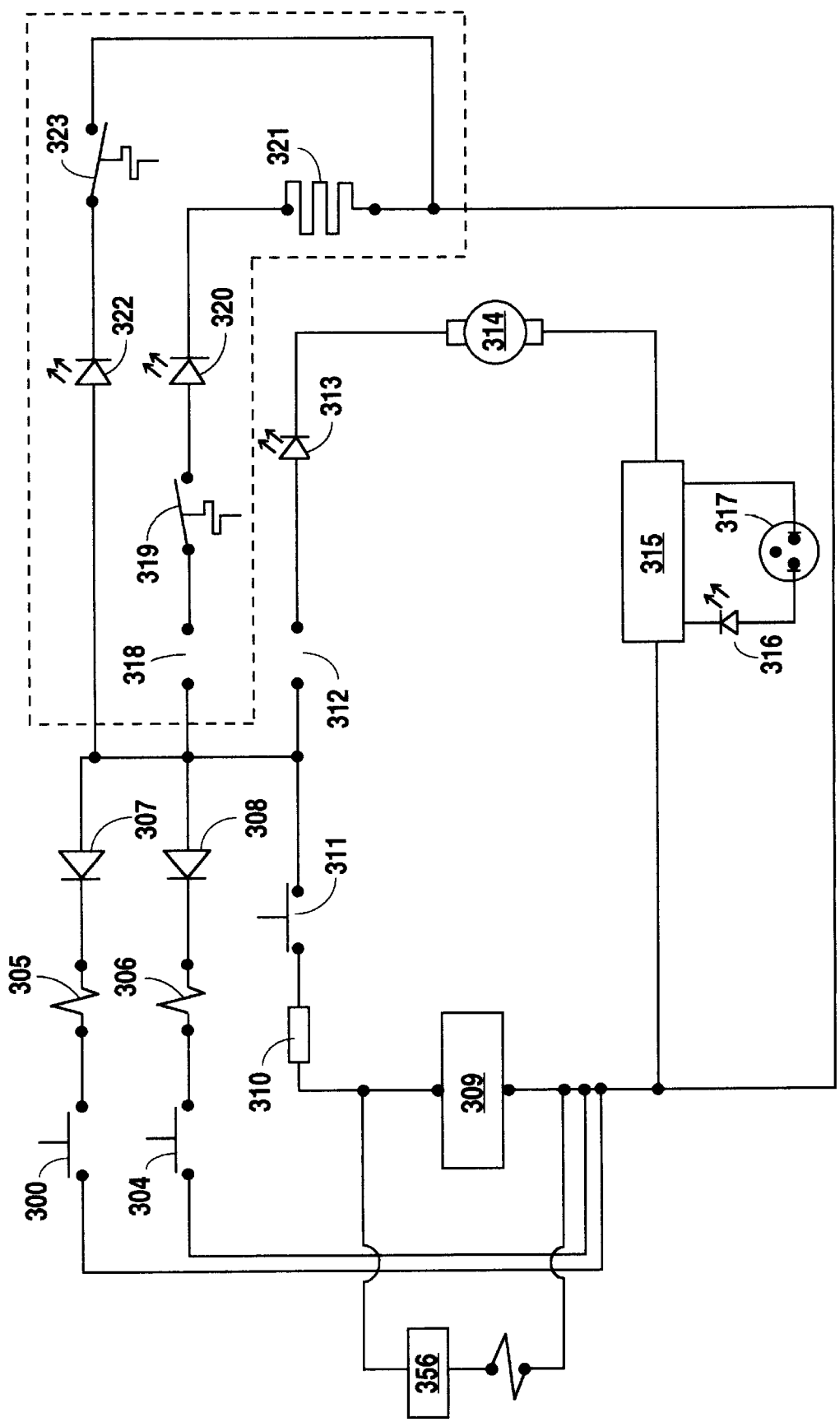
FIG. 20a is an example of an electrical control circuit diagram for the pump, switches, sensors, valves, indicators for Example M18, an embodiment of the present invention integrated into a vehicle air conditioning unit.
Figures 20B, 20C:
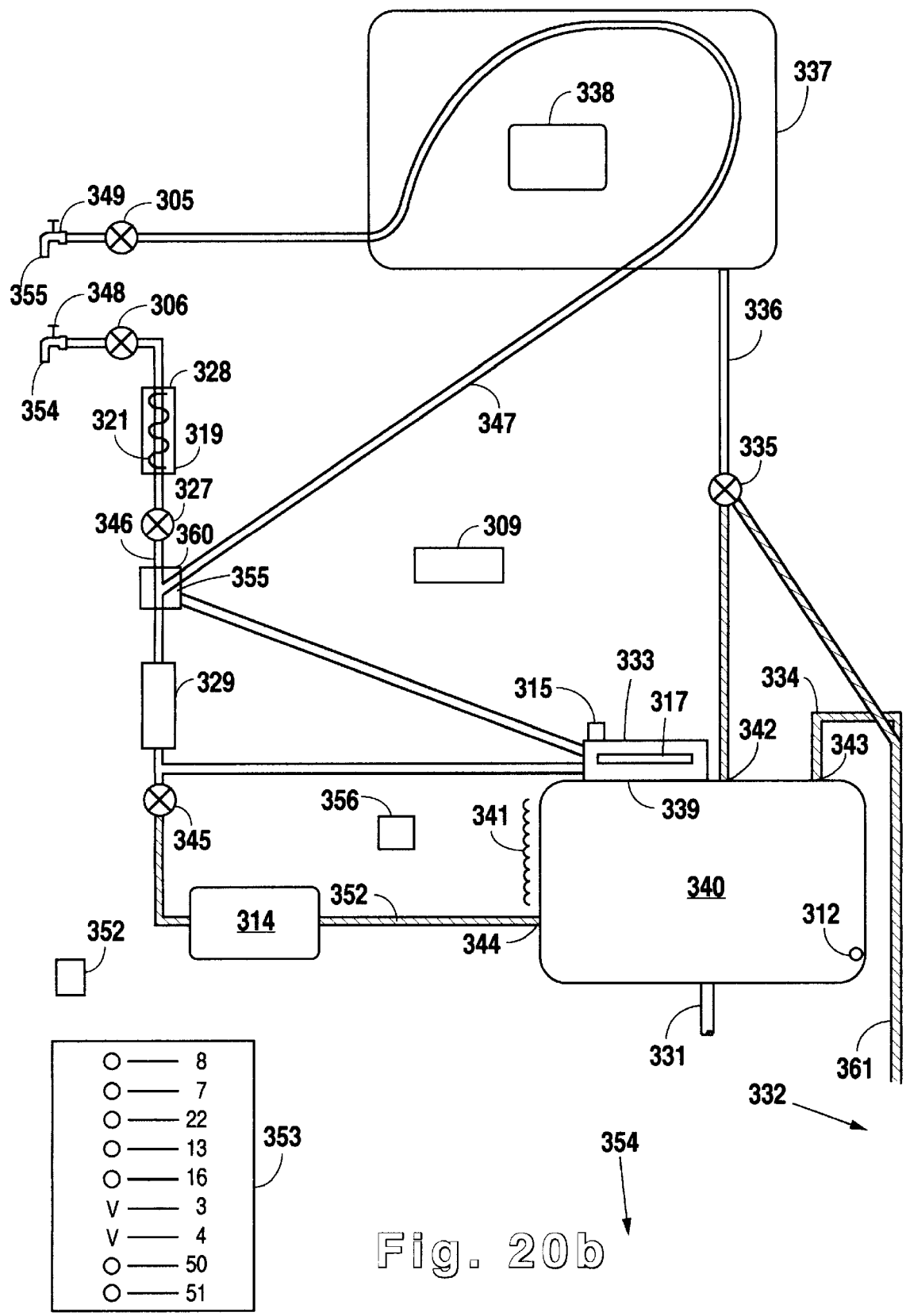
FIG. 20b is a schematic diagram of the water-flow and control systems of a water generator embodiment shown in Example M18.
FIG. 20c is a schematic view of the switches and indicator light display for the embodiment shown in Example M18.
Figure 20D:
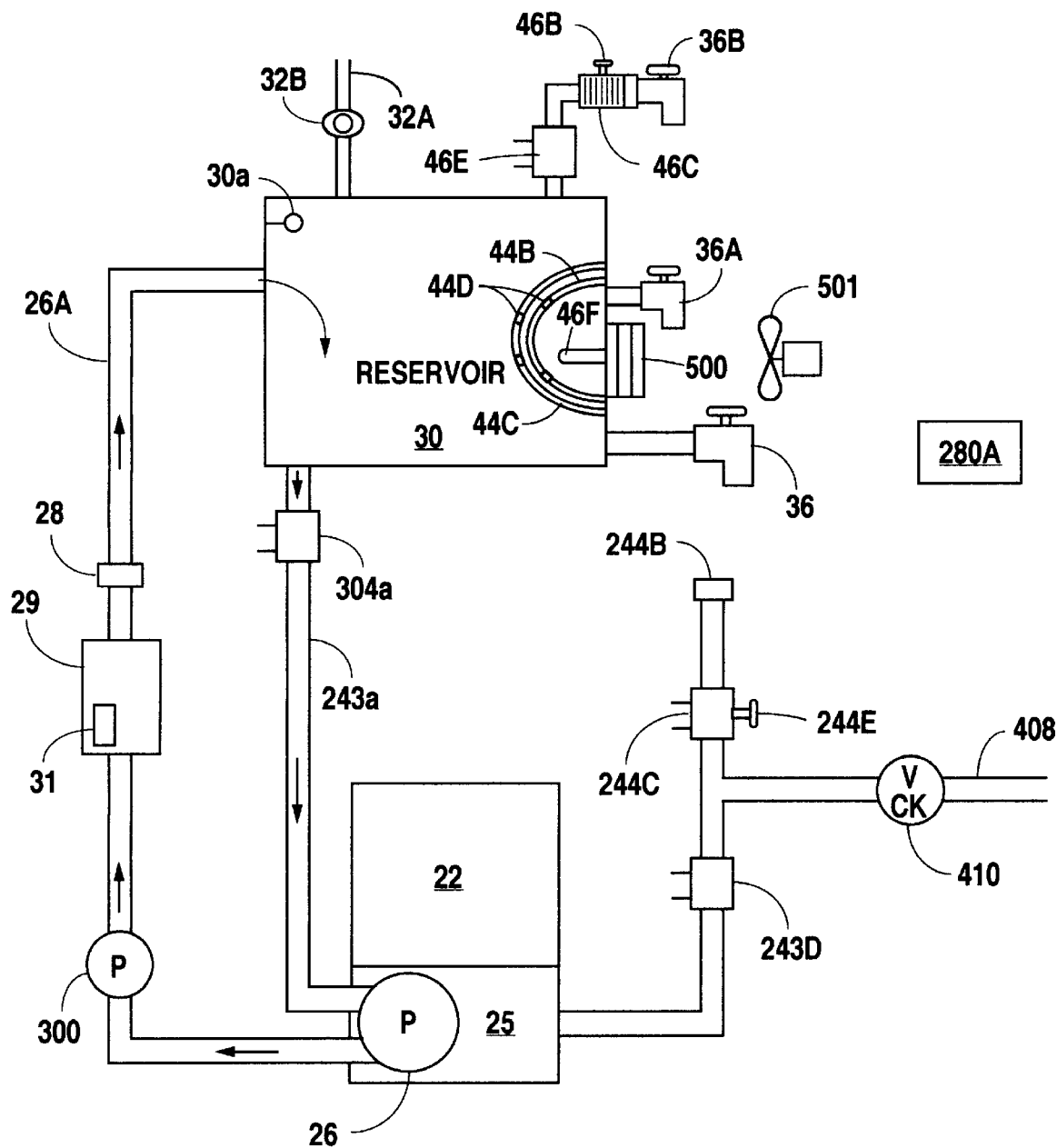
FIG. 20d is a schematic view showing the embodiment described in Example M20. As explained later, this unit includes a thermoelectric cooling probe, its external cooling fan, its insulating, nested enclosure cups inside the reservoir, the cooled water zone encompassing the probe, the in-line heater for the hot-water delivery tube and the periodic-recirculation flow pattern for purifying generated or external-charged water. This figure also shows both the emergency water input connection and the municipal-water inlet.
Figure 20E:
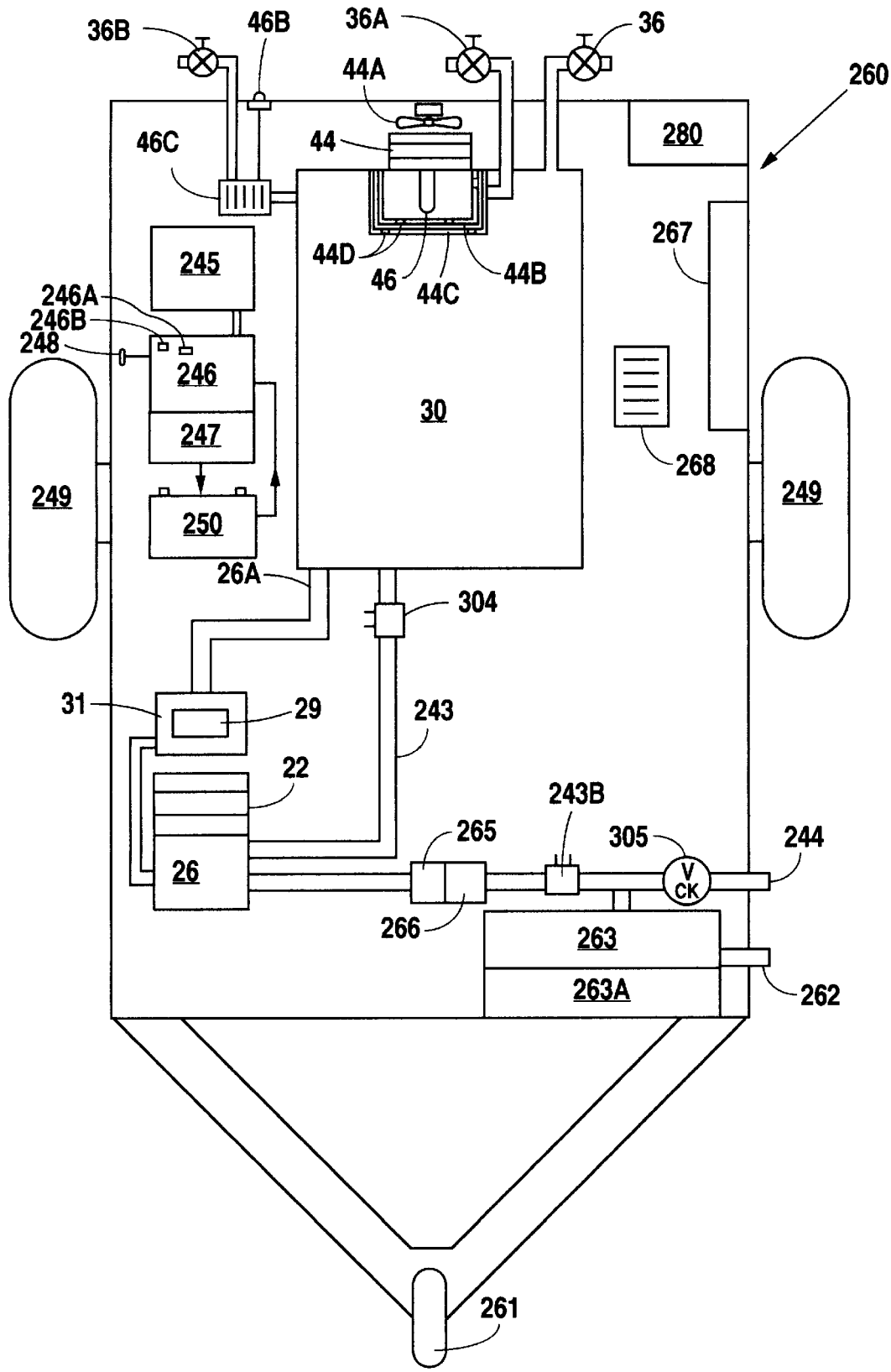

The second method, which is shown in FIG. 20d, includes an electronic, thermoelectric cooling module 44, the exterior portion of which is cooled by a fan 44A. The ice finger or probe (46) of the module 44 protrudes into the storage tank. To shield the ice probe from ambient water an interior enclosure 44B is placed around it. The enclosure is sized according to the expected demand for cold water and it has orifices or holes 44D to allow entry of ambient water when the cold water valve, which extends into enclosure 44B, is opened. An exterior enclosure 44C with holes 44D is spaced over 44B to provide a convection-resistant, insulating water layer between the chilled zone and the ambient zone. The holes of 44B and 44C are sized and aligned so that radial or through-flow is prevented. Moreover, the total hole area and partitioning of area is optimized for thermal isolation from the ambient water in the reservoir.

Figure 8:
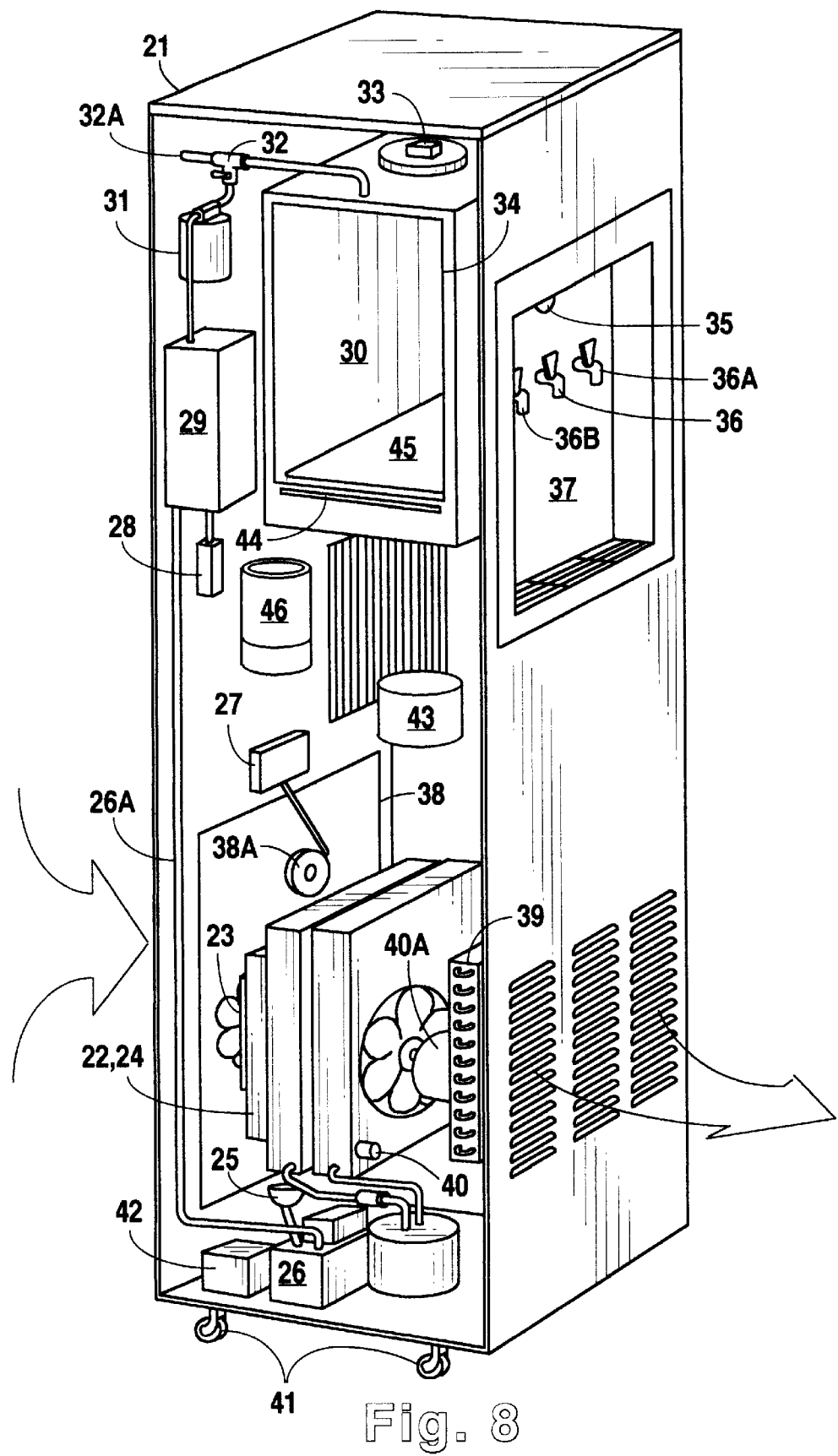
FIG. 8 is a cut-away perspective view showing a third embodiment of the present invention which prepares and dispenses potable water at three predetermined temperatures, i.e., ambient chilled and heated.

Model 3. As shown in FIGS. 8, 9 and 10 another embodiment of the present invention, Model 3, includes all of the elements of the basic model and Model 2, but also dispenses heated water at a nominal temperature of 75° C. Hot water can be provided in two ways.

The first method is to provide a hot water tank assembly (46) connected by means of a "quick" disconnect connection assembly (52), which is described below. The hot water tank assembly (46) includes a sealed stainless steel tank of the appropriate grade and type of stainless steel utilized for food handling, provided with an electric heater and insulating jacket (46).

Figure 11:
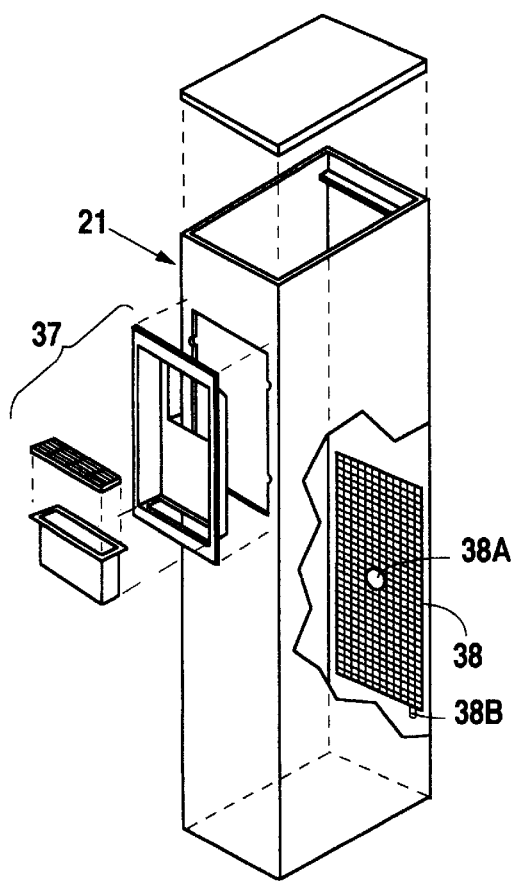
FIG. 11 is an exploded perspective view showing diagrammatically the front alcove assembly portion of the outside envelope of the basic embodiment of the present invention.

Temperature of the hot water is controlled by a heated water temperature control sensor and fuse assembly (46-A). A dispenser (47-A) for disposable liquid containers, suitable for hot water, is attached to the side of the housing. As described earlier, a quick-disconnect system (52) links the hot water tank (46) to the ambient fluid delivery control system by means of a "tee" connection. The same quick-disconnect system (52) links the heated fluid delivery control (36B) to the hot water tank assembly (46) to enable easy removal of the cold fluid tank (30) for cleaning, without the need for manual connections and disconnection of plumbing. As shown in FIG. 11, the quick-disconnect system (52) consists of a pair of receiver adapters, as follows: male adapter A) connects with female receiver (52-B) to carry ambient temperature water into the hot water tank assembly (46). A male adapter (52-C) connects with female receiver (52-D) linking the hot water storage tank (46) with the heated fluid delivery control (36B). The tube divider (46-B) physically separates the adapter system tubing and connections. This quick-disconnect system allows for removal and reinstallation of the main water cold fluid tank (30) without manual interference with the refrigeration system, the water tubing or the hot water tank fittings. The second method, as shown in FIG. 20d, is to add an in-line heater to the delivery line for heated water. The heater (46C) is actuated by switch (46B). The heater is a stainless steel, in-line, electric-resistance heater such as used in coffee makers. The heating element provides sufficient thermally-connected area to the flowing heated-water stream by selecting its length, i.e., it is long enough and hot enough that the water is sufficiently heated when it reaches the delivery valve (36B). The in-line heater is activated to operate only for a sufficient time, which is defined by preset timing relays and triggered by a push-button switch (46B).

Figures 23, 23A:
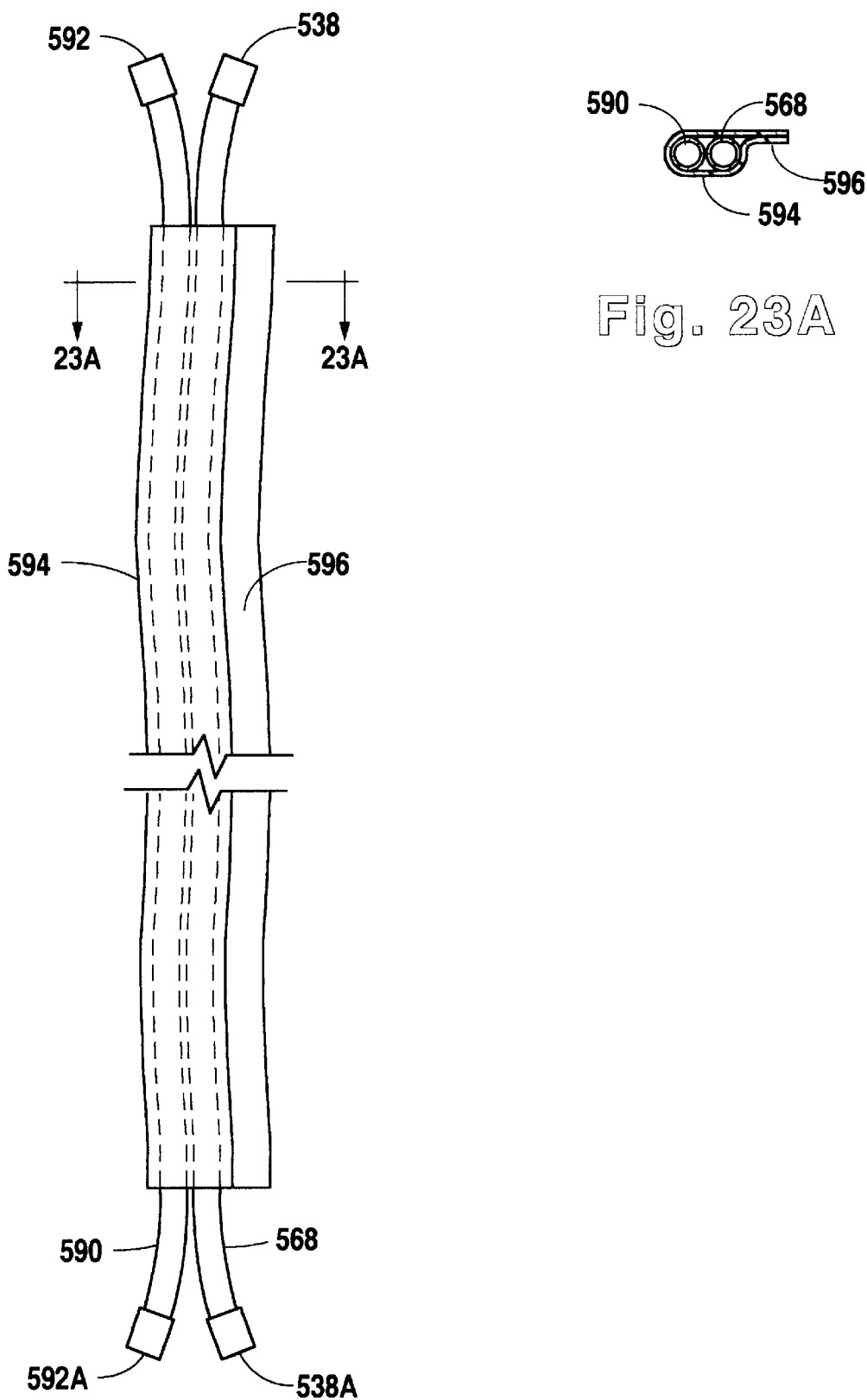
FIG. 23 is a depiction of a remote dispensers' flexible water line with attached quick disconnect fittings shown with a sleeve encircling the tubing having an elongated portion to facilitate mounting.
FIG. 23A is an end view along section 2A of the tubing encircled in the sleeve
Figure 24:
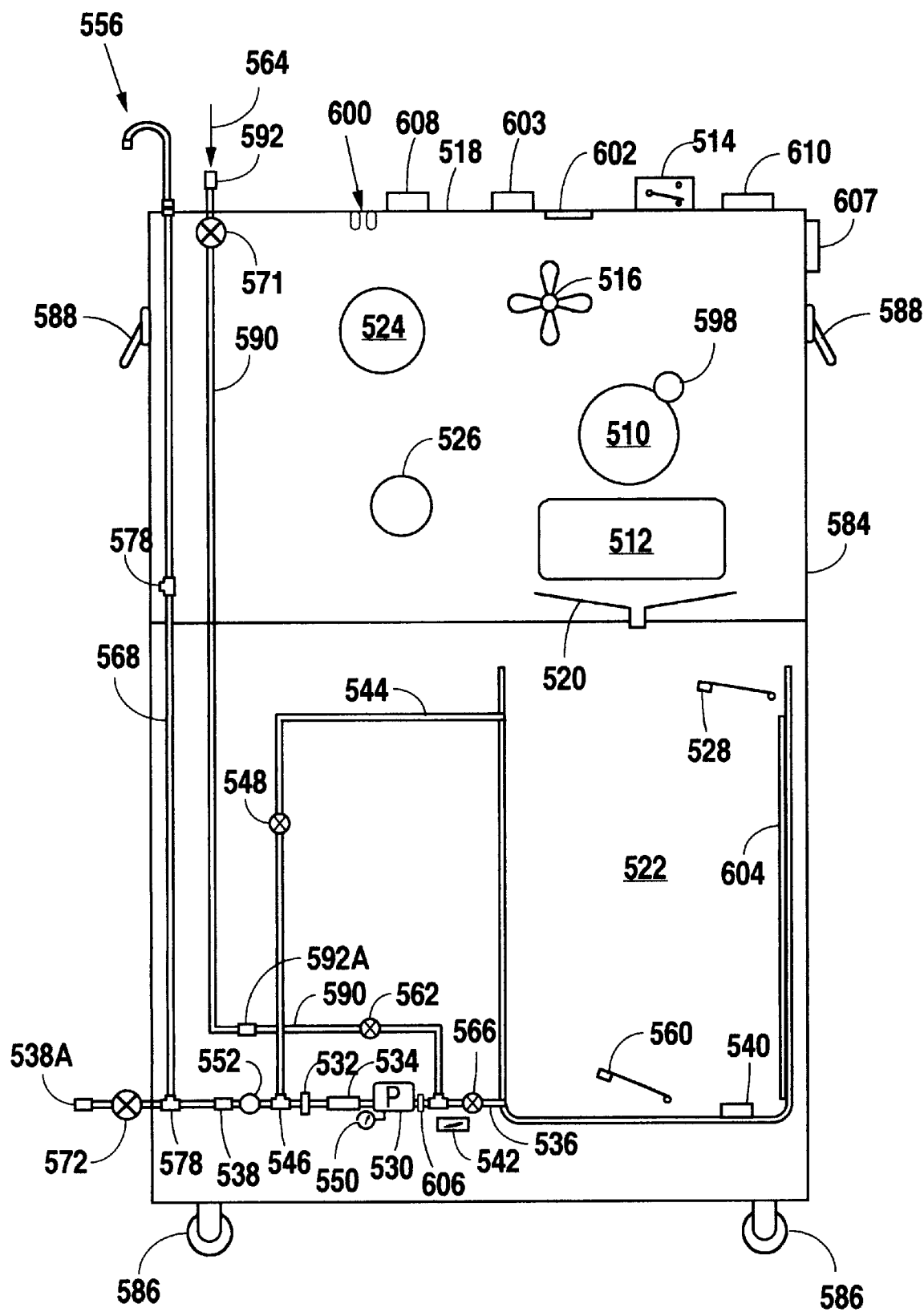
FIG. 24 is a cross section view of the embodiment described in Model 4 oriented vertically to facilitate a floor standing model.

Model 4. As shown in FIGS. 22–24, another embodiment of the present invention, Model 4, contains many of the same elements of the basic model but employs a combined condensate collector and storage reservoir. Referring first to FIG. 22, the water collection and treatment processes of the present invention are shown. The working components of the dehumidifier, heat exchanger are included. The dehumidifier's compressor (510) and its evaporator (512) are essential elements of dehumidifier's heat exchanger and are enclosed in a housing (508). The compressor is operated initially by an on/off switch (514) which, in the preferred embodiment, is a circuit breaker. The housing has an upper and a lower chamber separated by a horizontal partition. A fan (516) draws warm air through an air filter (518) optionally meeting HEPA standards, and blows it across the cool evaporator to drip into the funnel (520). The funnel penetrates the horizontal partition to allow condensate to be discharged into a combination condensate collector and storage reservoir (522). An optional ion generator (524) is placed before the air filter (518) to further assist in removing particulate matter from the intake air and to impart a negative charge to the discharged air. A heater (526) within the housing is thermostatically controlled to prevent the apparatus from freezing when operated in remote locations. Switch (528) is either a float switch or an electric switch and cuts off power to the pump (530) to prevent condensate overflowing the combined condensate collector and storage reservoir. The condensate in the combined condensate collector and storage reservoir is sealingly connected to the pump (530), the NSF 53 water filter (532), and the bacteriostat (534) by discharge line (536) which extends through the housing to a quick disconnect point (538A). If the quick disconnect fittings do not have automatic closure when disconnected, valves (572) or end plugs attached to quick disconnect points (538, 538A) close off the water lines. An alternate location (540) for the bacteria killing device (534) is in the combined condensate collector and storage reservoir (522) itself. The optional leak detector switch (542) is located in the bottom of the housing and if spilled or leaking water is detected, shuts off power to the apparatus. The recirculation loop (544) is connected to the discharge line (536) by a quick disconnect (546). If there is no recirculation line, it is terminated at (546) with an end plug. A recirculation solenoid (548) opens and closes periodically as controlled by a pump timer (550) at the same time as pump (530) is actuated to allow treated water to be recirculated into the combined condensate collector and storage reservoir (522). A pressure switch (552) electrically connected to pump (530) senses the pressure in the water line and any time any dispenser (554), (556), (558) opens and water pressure drops, the pump (518) turns on. It is deactivated when the dispenser is closed causing pressure to return.

In the bottom of the combined condensate collector and storage reservoir (522) is a low condensate switch (560) which can be either a float switch or electronic switch. If there is low water, an electrical signal is sent to inlet water solenoid (562) which opens, letting municipal water (564) pressurize the system. A check valve (566) is installed in the combined collector condensate and storage reservoir discharge line (536) to prevent municipal water pressure from filling combined condensate collector and storage reservoir (522). When a dispenser is opened, municipal water (564) flows through the deactivated pump, the water filter, and the bacteria killing zone in the bacteriostat to the open dispenser. When condensate has built up in the combined condensate collector and storage reservoir (522) covering the low water switch (560), a signal is sent to the recirculation solenoid (548) shutting off municipal water enabling activation of the pump (530) when a dispenser is opened.

Remote dispensers are attached by quick disconnect fittings (538, 538A). The flexible discharge line (568) is shown connected to a refrigerator's (570) ice maker (558) with quick disconnect fitting (538). When the municipal water line is cut to allow fitting of the apparatus with quick disconnect fittings (592, 592A), a cut off valve (571) is installed to allow easy variance of the length of flexible tubing water line (590). If the quick disconnect fittings do not have automatic closure when disconnected, valves (571) or end plugs attached to quick disconnect points (592, 592A) close off the water lines. When the ice maker's timer (574) opens the internal ice maker valve, water is discharged into the ice tray (576). The drop in water pressure is sensed by pressure switch (552) in the apparatus, turning on the pump (530). If there is inadequate condensate, treated municipal water fills the ice trays. Further, "tee" connector (578) allows connection of several additional remote dispensers to the discharge line. Crystal clear ice is released at ice discharge (580) and cold water faucet (582).

During unfavorable times for producing condensate, the compressor (510) can be enabled to activate until it frosts over and then deactivate until the frost melts, producing condensate. When there is sufficient humidity but low temperatures, the evaporator (512) will freeze. Accordingly, the compressor can be enabled by timer (598) to activate and deactivate to produce condensate. When condensate freezes at progressive lower temperatures, however, the condensate becomes finer and finer to the point where it does not easily react to gravity. In these situations, special means are required to collect condensate which can include use of an evaporator shaped to create a vortex.

The maximum condensate production for any model can only be determined by engineering tables and by testing in a controlled environmental test chamber. From the results of those tests, a computer program is written and programmed into an optional timer (598) that controls the on/off cycle of the compressor (510) for maximizing condensate for each temperature/humidity combination. The housing of the apparatus has an optional thermostat and humidistat (600) which sends the current temperature and humidity to the computer programmed timer (598) to maximize condensate collection. The programmed timer (598) and the thermostat/humidistat (600) are optional as they would not be needed in some climates. The recirculation loop 544), the recirculation solenoid (548), and the pump timer (550) are optional as some water generators are expected to be used continuously rather than periods of prolonged absences (i.e. vacations).

The optional operation display panel (602) contains some or all of the following operational items: an on/off switch (514); a fan speed control (603); a humidistat/thermostat (600); bacteriostat safety switch (610); a total production digital counter (606) for determining when the water filter (532) is to be changed; recirculation switch (608); overflow indicator (609); and other indicator lights for monitoring system operation. A humidity/temperature, water production chart (607) showing the expected water production at various combinations of temperature and humidity is created accordingly and can be posted. The optional digital water level sensor display (604) of the combined condensate collector and storage reservoir (522) can also be programmed so that it would also act as the low water switch (560). The optional total production digital counter (606) counts the gallons of water processed so that the time to change the water filter (532) may be determined.

Turning to FIG. 23 and FIG. 23A, the flexible tubing inlet water line (590) and the flexible discharge water line (568) are shown encircled by a sleeve or jacket (594). Use of the sleeve (594) is optimal when these lines are exposed as it provides for neat, unobtrusive location of the lines. The elongated portion of the sleeve (596) is for easily attaching the sleeve and the tubing to the wall. Both sides of the sleeve could be elongated if desired.

FIG. 24 is a cross sectional view of this embodiment oriented vertically to facilitate a floor standing model. While the wall hanger housing (508) is longer than it is tall (shown in FIG. 22), the floor model housing (584) is taller than it is wide. The built in housing dispenser (550) does not prevent other remote dispensers from being added if desired. Optional connection of municipal water (564) is still available and all the features of the wall model are all the same. The floor model includes optional wheels (586) and handles (588).

OPERATION OF THIS INVENTION

In this invention, heat absorber 1 (22) produces condensate on an inert-coated surface (24). This system is explained below. Incoming air is filtered by a known depth-screen filter assy. or an optional electrostatic filter assy. including the filter (38), a filter warning whistle (38-A) and the air-filter fail-safe switch (38-B). An ionizer (27) puts a negative electrical charge onto particulate matter in the incoming air stream to assist in the trapping of particulates in the electrostatic filter. If desired for operation in a home or office, an optional ozone generator (39) can be included; this addition allows the present invention to function as a charged-particle generator and room-air purifier.

Condensate collected from the air flow across the extended area cooling surface (24) flows downward by gravity to a temporary collector for condensate (25) and is further conducted by gravity flow into a pumping reservoir assembly (26). In this assembly there is a self-contained float switch which actuates the condensate pump when a predetermined water level is reached. The condensate is conducted through UV-transparent tubing (26-A) prepared to comply with medical and human food-handling requirements. The condensate is subsequently exposed in multiple passes to a bacteriostat, or apparatus for killing bacteria, such as an ultraviolet germicidal light, (29) or other known UV source capable of producing radiation for effective killing of water-borne bacteria, viruses and organisms. The bacteriostat (29) is monitored by the fail-safe switch (28). Multiple passes through the UV and carbon block VOC filter portions is accomplished by activating the recirculation pump at least once at predetermined time intervals in the range 1–12 hours, for a predefined flow or time duration in the range 1–50 times the reservoir volume or 1–200 minutes at a specific flow rate. By this repeated process, water is intermittently and continually recirculated across the VOC filter and UV portions of the purification circuit whenever the water generator is in use. The flow duration may be defined by the volume circulated or by time. A fail-safe indicator light (28-A) on the exterior of the housing (21) confirms proper operation of the bacteriostat. If the bacteriostat is not enabled, as indicated by the light being "off", operation of the entire machine is stopped and an audible alarm is activated.

The condensate is pumped under positive pressure through an activated-carbon VOC adsorbed purification filter assembly capable of NSF-53 purification. and then pumped into fluid tank (30), or (30A) for Model 2 or 3, of plastic or stainless steel as is common for food-service contact. The fluid tank may be encased by an optional, form-fitted insulation jacket (34) made of a nontoxic material, such as polymer foam. A fluid delivery control (36) is installed into the storage fluid tank (30) using nontoxic sealants suitable for contact with potable water intended for human consumption. The fluid tank (30) in one embodiment, is removable for cleaning. The fluid delivery controls (36, 36-A, 36-B) are at an ergonomically-correct level above the floor, making water easily accessible for children or persons in wheelchairs. An optional holder (47) for disposable cold-liquid containers is shown in close proximity to the fluid delivery controls (36).

A major improvement in the design of the present invention is the addition of a standard deicing system and including in its place a heat strip and fan assembly (23). An electric-powered heating element and defrost sensor (40) senses when the heat-exchange surface of heat absorber-1 (24) is about to freeze over. Rather than turning off heat absorber-1 (22), as in typical old-art refrigeration systems, the temperature sensor (40) activates the heat strip and fan (23) which warms air passing over the cold surfaces (24) just enough to keep the accumulated liquid dew from freezing. The warmed air usually allows more moisture to be extracted from the incoming air flow.

Because the open-air embodiment of the present invention can operate for long periods without human tending, a manually operated diverter valve (32) allows the potable water to be pumped to a remote cistern. Diverting the water flow does not prevent dispensing water from the storage cold fluid tank, provided that the tank contains water. In some models the diverter valve is electrically operated and water is automatically diverted whenever the reservoir tank is filled. The cold and ambient fluid delivery control (36-A) and (36) extend from the fluid reservoir-1 (30) through the front of the housing (21) into a common dispensing alcove assembly (37) containing a grill-type drain insert to collect waste water. An optional night light (35) above the alcove provides illumination for water dispensing during periods of darkness or low light levels. An optional multi-frequency ultrasonic pest control device (42) and optionally for models, extraordinary attention to sealing the housing (21) with nonporous, nontoxic sealants allows the open-air version of the present invention to operate for extended periods of a month or more indoors or outdoors without human tending.

Model 2 contains all subsystems which allow it to produce and dispense chilled water in addition to the ambient temperature water. The chilled water is at a nominal temperature of 50° C. Chilling of the collected purified water is accomplished by adding a secondary cooling device, heat absorber-2 (44). In one embodiment, the surface (44) is positioned between the insulation jacket (34) and the bottom of the fluid reservoir-1 (30). In another embodiment (see Example M20), heat absorber 2 is a cooling finger extending into the reservoir. To avoid cooling all of the liquid in the fluid reservoir-1, because this model also dispenses ambient temperature liquid, an insulated baffle (45) is placed in the fluid reservoir-1 (30A) allowing for ambient water to be stored above and cold water to be stored below. The cold water below the baffle is delivered through the cold-fluid delivery control (36-A); The ambient-temperature water is delivered through the ambient temperature fluid delivery control (36). Both fluid delivery controls protrude from the fluid reservoir- 1 (30) through the front of the housing (21) into the dispensing alcove assembly (37). Because the fluid reservoir-1 (30) in one embodiment is removable for cleaning without dismantling the internal mechanisms, the present design represents a significant improvement over old-art systems.

Model 3 of the present invention includes subsystems which permit it to produce and dispense heated water in addition to ambient-temperature water and chilled water. Heated water is dispensed at a nominal temperature of 75° C.

Heating of the water is accomplished by adding a heated water tank assembly (46) comprising a stainless steel tank in compliance with food-handling codes, a heater, an insulated jacket and a electrical, fused water-temperature control assembly (46-A). Ambient temperature water is drawn into the hot water tank through a quick-disconnect "tee" fitting behind the ambient temperature fluid delivery control (36). Hot water is dispensed through the hot fluid delivery control (36-B), which is connected to the hot water tank assembly (46). The quick-disconnect receiver-adapter assembly system (52) allows easy removal of the fluid reservoir-1 (30) for cleaning, without the need for manual connections and disconnections. The ambient temperature water portion of the assembly consists of a quick disconnect male adapter (52-A) that mates with the quick disconnect female receiver (52-B) to supply incoming water to the water heater tank (46). The heated water portion of the assembly in one embodiment consists of a quick disconnect male adapter (52-C) that mates with the quick disconnect female receiver adapter (52D) to supply heated water to the hot fluid delivery control (36-B). Alternatively, the water-heating feature of this invention may be supported by adding a known, in-line water heater to the hot-water delivery line. This unique disconnect concept represents a significant design improvement over old-art systems.

Model 4 of the present invention includes sub-systems and design changes which permits it to operate with a combined condensate collector and storage reservoir (522).

The housing of Model 4 has an upper and a lower chamber separated by a horizontal partition. A fan (516) draws warm air through an air filter (518) optionally meeting HEPA standards, and blows it across the cool evaporator to drip into the funnel (520). The funnel penetrates the horizontal partition allowing condensate to be discharged into a combined condensate collector and storage reservoir (522). The condensate in the combined condensate collector and storage reservoir (522) is sealingly connected to a pump (530), an NSF 53 water filter (532), and a bacteriostat (534) by discharge line (536) which extends through the housing to a quick disconnect point (538A).

In the bottom of the combined condensate collector and storage reservoir (522) is a low condensate switch (560). If there is low water, an electrical signal is sent to inlet water solenoid (562) which opens, letting municipal water (564) pressurize the system. Accordingly, condensate from the combined condensate collector and storage reservoir (522) or municipal water (564) can be automatically dispensed through the bacteriostat (534) if a pressure drop is sensed by pressure switch solenoid (552) as a dispenser (556) or an appliance's timer (574) is opened. The pressure switch solenoid (552) turns off the water flow when pressure builds back up after the dispenser is closed. The force of the water is dependent upon the amount of water in the combined condensate collector and storage reservoir (522) as determined by low condensate switch (560). Remote dispensers as well as municipal water sources are attached by quick disconnect fittings.

During unfavorable times for producing condensate, the compressor (510) can be enabled to activate until it frosts over and then deactivate until the frost melts, producing condensate. When there is sufficient humidity but low temperatures, the evaporator (512) will freeze. Accordingly, the compressor can be enabled by timer (598) to activate and deactivate to produce condensate. Further, during extended absences, recirculation switch (608) activates recirculation of water from the combined condensate collector and storage reservoir (522) through the bacteriostat (534), the water filter (532) as timed by pump timer (550). The invention may be connected to various dispensers remotely located through tee connectors and quick disconnect fittings. An operation control panel (602) contains various indicator displays electrically or audibly indicating system operation.

Further, a humidity/temperature water production chart (607) showing the expected water production at various combinations of temperature and humidity can be created according to testing conducted in a controlled environmental test chamber. This graph can then be posted on the outside of the cabinet (508) to show expected water production.

EXAMPLES

Examples M1 and M2 below give technical parameters for the design and inert surface coating of the extended heat-exchange area of heat absorber 1, i.e., the air cooling and dew-collecting surface.

Example M1

Extended heat exchange area.

Incoming ambient air at a velocity of 1–10 meters/sec is cooled below its dew point by circulation across an array of generally-vertical, spaced-apart, cooled surfaces shaped and oriented to drain collected liquid dew dropwise from a pointed zone on the bottom edge. The active extended cooling area for both sides of each 30element in the array is in the range 100–500 cm2; the total active area of the array is in the range of 1–4 m2. The general outline shape of the dew-forming elements is shown in FIG. 1(d). The height dimension of each cooling element is in the range of 15–40 cm; the element width dimension is in the range of 3–10 cm. The height dimension is measured generally parallel to the gravity vector; the width dimension is measured generally perpendicular to the gravity-force vector. Each element is formed from one or more sheets of high thermal conductivity material of thickness in the range 0.2–1.5 mm. The average center-line spacing of adjacent cooling elements is in the range 3–10 mm. For increased convective heat transfer, the profile may be either parallel—planar elements, as shown in FIG. 1(e) or parallel—corrugated elements. Parallel—corrugated elements may be prepared by 3D forming of planar elements to include an array of ridges and valleys arranged parallel to the vertical or at an acute angle in the range 1–15 deg. to the vertical. As shown in FIG. 1(e), surface waves formed on the maximum-thickness draining liquid condensate layer do not bridge across the element spacing. It has been found that dew-bridging results in liquid trapping and ice-blockage of the air-flow channels between elements. Heat absorption from the extended area can be accomplished by a variety of cooling means thermally connected to the area; such cooling methods include refrigerant-expansion coils, thermoelectric coolers, heat pipes, etc. The design of heat absorber 1 includes defining the number, size and placement of cooling conductors to cool the extended surface elements. In the case of cooling by a boiling liquid in contained tubes. the tubes are oriented generally horizontal and perpendicular to the extended surface plane. Several refrigerant tubes of 3–6 mm diameter spaced apart at a distance of 40–100 mm have been found to provide effective cooling. Extended surface elements may be formed from thermally-conductive metals, alloys, ceramics/glasses and polymer composites including alloys, Cu, alloys, Al-filled amide or olefin polymers and ceramics.

Example M2

Inert surface coating.

To prevent chemical interaction of the dew condensate with the exposed cold surfaces of heat absorber 1, all such exposed, cooled surfaces are coated with a continuous, thin, inert, food-grade film of polymer such as siloxane, PTFE, urethane, olefin, etc. All exposed surfaces of the heat absorber which come into contact with liquid dew are cleaned to remove surface contaminants such as grease, oxides and other adventitious residues prior to the initiation of the coating process. An inert coating of thickness in the range 0.01–0.2 mm is then applied by known methods such as spraying, dipping, electrostatic coating, etc.,. After application and curing, the film coating is then cleaned to remove any volatile or extractable components which might contaminate the dew or water being-produced.

Example M3

Air Filters, Alarms and Interlocks.

The first line of defense against insect penetration into the unit are woven-wire screens covering the entire area of both the inlet and outlet air ports. The screen mesh openings range from 0.3 mm to approx. 1.0 mm in diameter. The depth and screen elements of the air filter apparatus are prepared and sized to achieve approx. 99.99% filtration of all solid particles of diameter greater than 1 micrometer for an air flow rate of 4–9 m3/min. The filter apparatus may also be fitted with a pressure-drop sensor which will permit buildup of collected particles of approx. 65% of the limit capacity of the element before an alarm condition is signaled; the optional filter-overload alarm may be an intense, high-frequency acoustic whistle or other known alarm device. The air filter may also be fitted with gas-ion generators, alpha- or beta- particle emitters, such as radioisotopes, electrostatic charging devices, such as agitated filament arrays or high- voltage corona wires, which facilitate retention of smaller, less-dense airborne particles. The air filter may also be fitted with an optional interlock switch which prevents operation of the entire generator if the element is incorrectly positioned or an incorrect size is used. Bacteriostat System and Interlocks. The bacteriostat system includes two stages: (a) an active killing stage for microorganisms and (b) an activated-carbon VOC adsorption stage for removing undesirable and toxic organic impurities which are present as vapors in the ambient air and will be dissolved in the condensate water produced. The killing stage may employ electromagnetic radiation, such as UV or gamma, of selected intensity and wavelength, to kill adventitious bacteria and viruses which are present in the condensate water. Alternatively, the killing stage may employ one or more physiologically-tolerated oxidizing chemical species such as ozone or hydrogen peroxide for killing bacteria. It is of course important to provide an exposure chamber which allows the condensate water to be exposed to or circulated through the killing zone. Either the UV source or the chemical generator may be fitted with positive interlocks which shut down the delivery pump if the device is not operating within control ranges of wavelength, intensity or sterilization-agent dispensing rate.

Example M4

UV germicidal lamps.

The simplest killing stage includes a high-intensity, short wavelength ultraviolet lamp, UV sterilizing device, and fusible link interlock with the recirculation pump. Should the UV lamp fail to operate at an effective wavelength and intensity, electrical interlocks prevent the circulation pump from operating; in this event, no water can be delivered from the generator. The UV generator can be: (a) mounted into the cover of the reservoir for direct exposure or (b) mounted adjacent to a section of low-pressure tubing which transmits the effective radiation wavelengths through the water. In addition to quartz, known UV-transmitting glasses, polymers or ceramics may be used for the UV-lucent tube zone. The treatment zone or chamber must also be fitted with UV reflectors to maintain a high intensity level of the effective wavelengths and prevent accidental personnel or user UV exposure during maintenance work. For the UV lamp tube, the GE model T5 has been found to give good results.

Several other types of UV sources can be adapted to operate with the present invention; these include electronic solid-state UV devices, natural sunlight light pipes, and fluorescent/chemiluminescent sources.

Alternative Ozone or Ultrasonic Water Treatments. As an alternative to the UV sterilization device, an ozone generator or an intense ultrasonic field may also be used for water sterilization. The ozone systems operate by electrochemical formation of microbubbles of O3 in the condensate water. Known piezoelectric or magnetostrictive ultrasonic probes can be fitted to a section of tubing or mounted to immerse the probe into the reservoir tank.

Example M5

Ozone Gas Generators for Air Freshening.

Gaseous ozone is thought to assist in removal of undesirable vapors and aerosols from the ambient air. An optional ozone generator can be mounted in the air-handling section of the present invention. Several alternative ozone generators have been evaluated for conditioning the air being circulated through and discharged from the present water generator; the most cost-effective seems to be the Bora model from Alpine Ind. Alternatively, other electrochemical generators can be used to generate or release sterilizing gases; one example is the release of halogen gases based upon metered injection of compounds which decompose spontaneously or which can be electrochemically dissociated in liquid solution.

Example M6

Air Ionization Pre-Treatment.

Electrostatic charged-particle generators of various types such as polonium strips and Sanyo HAF 3000 ion generators have been evaluated and found to work well with the present air filter for removing aerosol particulate contaminants. Charged particles emitted from the generator impart a charge to the particles which makes them easier to filter. Such modules are connected to the main controls with a fail safe circuit to prevent operation if the ionizer is not operating within control limits. Alternative embodiments f the present invention using other sources of charged particles including alpha particles, beta particles, and charged ions may be used. For example, isotope mixtures and/or decomposition-result alloys of radioactive metals such as radium and polonium are useful charged-particle sources; since such emitters can be made with controlled particle fluxes, small area sources are also possible.

Example M7

Activated Carbon Block Filter.

The simplest and least expensive absorber for volatile organic compounds, VOCs, includes a porous activated-carbon block VOC filter; such a filter is connected in series with the UV sterilization device. At a flow of 0.8 to 2 liter/min, the cartridge is capable of trapping 1–2 micrometer diameter suspended particles, removing taste and color bodies and reducing dissolved toxic hydrocarbons to acceptable levels for safe drinking water according to ANSYNSF-53. Before this filter becomes substantially blocked. an integrated output flow meter indicates the cumulative volume of water treated by the VOC filter. Preferably, this indicator or display can be seen from the rear exterior of the unit. Known mechanical. electromechanical or electronic volume-measuring devices are used to display the remaining design capacity of VOC filter. Water is continually recirculated through the UV and activated carbon units when the generator is "on". A number of known carbon-block filters are found to perform reliably to NSF-53 standards; one acceptable filter is the Amtek C240 MMB. In regular operation, water delivered from any output valve, including, cold. ambient, hot and the diverter valves will have passed repeatedly through the VOC filter and the bacteriostat unit.

Example M8

Alternative working fluids in compression refrigerator cooler for heat absorber-1.

Approved working fluids for high-efficiency reverse-cycle equipment fall into two main classes: high temperature and low temperature. So-called low-temperature refrigerant fluids, such as 406A operate at lower temperatures and lower pressures; use of such fluids can be significant for units operating in air-conditioned spaces.

Example M9

Alternative heat sinks for units operating in air-conditioned spaces.

For esthetic reasons it may also be desirable to reject heat from heat absorber or heat absorber2 into: (a) the frame and/or surface skin of the enclosure or (b) the liquid condensate water collected below heat absorber-1. When a mechanical refrigeration system is used for heat-absorber-1, it is also possible to provide a thermal/mechanical linkage from a portion of its evaporator section and its condenser, for the purpose of modulating the temperature of the exhausted air. In this embodiment, it is possible to use a lower flow rate of cooling air and thereby reduce the level of fan noise which is projected into the local environment.

Example M10

Alternative controls for units used in air-conditioned spaces.

The resistance-heating strip deicer, as used for units operated outdoors, can be replaced by known thermostat/humidistat controls as typical for reverse-cycle appliances. This option is of interest for units used in a controlled environment.

Example M11

Additional Alternative Controls.

Instead of the internal reservoir for holding water to be dispensed, it is possible to use an external reservoir such as a 20-liter glass bottle or other container. The system dispensing controls for such an embodiment may be 10modified to connect with an appropriate ancillary liquid level or fluid-mass sensor for the external container to regulate water generation when the container is filled to capacity.

Example M11-A

Ancillary external reservoir.

Version M11A, shown in FIG. 14, is an embodiment with no internal reservoir and a large-volume, covered vessel located on the floor beside the unit. This embodiment is a "cut-off" version of the simple embodiment shown in FIG. 2 wherein the housing is truncated by a horizontal plane at approximately the vertical height of the bottom of the alcove assembly, approximately 0.8 to 1.5 m above the base plane. The water output flow from the water generator is regulated by a solenoid valve (146) which is in turn controlled by a liquid level sensor (149) which is attached to the seal plug (142). The sensor and solenoid valve may be known low-voltage electric devices designed and certified for safe immersion in water or use in wet environments; alternatively the sensor and slave valve may be simple known fluid/mechanical devices. For ease of use, it is envisioned that the flexible external tube (143) and flexible low-voltage leads (147) may be enclosed in a flexible sheath (148) or tied together with known bands and methods. Although the external reservoir (141) is shown here as a vertical bottle standing close by on the base plane and fitted with a tight-fit removable seal plug (142) adapted to prevent entry of liquids or gases from the exterior into the port of the reservoir, it may also be possible to locate it at some distance 2–10 m at the same level, e.g., in another room or building. It may also be possible to locate it above or below the base-plane level , up to approx. 5 m level difference, by the addition of known precautions such as non-siphon check valves. Although the embodiment shown in FIG. 14 shows electrical/electronic sensors (149) and control valves (146), it is also possible to use magnetic, optical, acoustic, or mechanical level sensors and related water-flow control valves. Although the external-line valve (145) is shown as a simple manual valve, it is also possible to use an auto interlock device to detect: (a) whether the external reservoir is correctly connected, (b) whether the unit is powered, or (c) whether the water-generation switch is "on".

Example M11-B

External/overhead storage bottle weighing.

Version M11B, shown in FIG. 15, is an embodiment with no internal reservoir and an adjustable weight or mass-sensing device mounted on its top surface, which supports an external vessel. The top surface is a "cut-off embodiment similar to that shown in FIG. 14. The mass-sensing element serves to shut off the solenoid valve when the container it supports is filled to capacity. By adjusting the zero point and sensitivity of the mass-sensor, containers of differing empty weights and internal capacity can be used, i.e., 4-liter, 8-liter, 20-liter. The external container is placed on a weighing plate (153) secured to the top surface of the truncated housing. A pivoting weighing plate shown in FIG. 15 is subject to the downward load of the reservoir and its contents and to counter forces (151) which keep the weighing plate approx. level, i.e., at an angle of less than 5°

Alternative support embodiments for a non-pivoting weighing plate may include arrays of 1–10 compliant elastomer elements or spring elements. Further, the counter force (151) can be applied at a plurality of points to support the weighing plate (153), i.e., the counter force may be provided by 1–10 resilient elements of differing or variable characteristics to allow for use of containers of different sizes or tare weights. The simple flat plate (153) shown in FIG. 15 can be replaced by a shaped weighing platform having an engagement or retention zone for the bottom of the reservoir, e.g., a recess or pocket, an array of projections, a tie down strap, or snap-in anchor latches for an externally-grooved reservoir. The electronic weighing sensor (152) shown in Fig. is connected by low-voltage leads to the solenoid valve (154); when the container is filled to capacity, its total weight reaches the predetermined value built into the country force (151) and the weighing plate triggers the sensor (152). It is also possible that the signals from sensor (152) can provide valuable control outputs to regulate the operation of the water generator, i.e., if the reservoir contains at least a predetermined quantity of water and the time of day falls in the period 1700 to 0600, the logical management algorithm may be programmed to defer operation of the generator. The manual water flow control valve shown in FIG. 15 can also be replaced by a solenoid and electrical/electronic sensors to detect: (a) whether the external reservoir is correctly connected, (b) whether the unit is powered, or (c) whether the water generation switch is "on".

Example M11-C

Retrofit kit for typical bottled-water dispensers.

Figure 16:
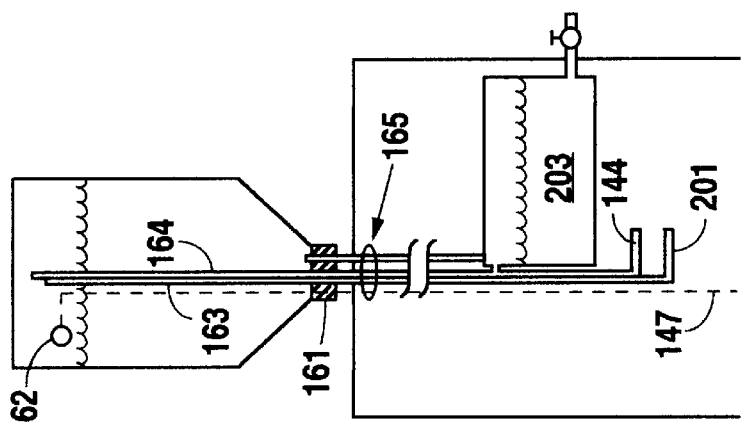
FIG. 16 is a schematic view of a retrofitted typical bottled-water dispenser attached to a cut down water generator positioned along side and connected to supply potable water into existing unit. Components to retrofit typical existing bottled-water dispenser units can be provided as a model-type unique kit or a universal kit.

Version M11C, shown in FIG. 16 is a retrofit embodiment which can be installed to modify a typical gravity dispenser as commonly used for standard bottled water. Such dispensers can be easily converted to use water generated by the present invention by installing a vertical water delivery tube to the rubber seal collar; this tube is fitted with integral water level sensor located at the uppermost end. For such cases, the water generator with a reduced-volume internal reservoir may be located adjacent to or beneath the existing water dispenser. It is envisioned that a vertical, water-delivery tube of appropriate material for potable water, will be installed as a modification of the existing bottled-water dispenser. The length of the vertical tube and the specific position of the water-level sensor can both be adjusted to accommodate different sizes of supply bottles and different seal collar designs. The water level sensor serves to shut off the solenoid valve of the water generator when the water bottle on the dispenser is filled to capacity. The sensor and solenoid valve may be low-voltage electric devices designed for immersion in water or wet environments; alternatively the sensor and solenoid valve may be simple fluid/mechanical devices. As shown in FIG. 16. the level sensor (162) is installed at the uppermost end of the water inlet tube (163) and the air-vent tube (164). The mod. kit also can also include a seal adapter plug (161) if the existing collar does not lend itself to retrofit. For the possible cases in which the existing collar and piping are extremely difficult to connect, the retrofit kit can include an embodiment with flexible connections between the existing system and the new seal adapter (161). The flexible zone and sheath (165) consists of sheathed, flexible connections to the level sensor (162), vent tube (164) and water tube (163). To anticipate the case wherein it is desired to use an already-retrofitted bottled-water dispenser with either the water generator or purchased supply bottles, one embodiment of the conversion kit can be provided with a lengthened flexible zone. This will permit insertion of the seal adapter (161) along with the elongated tubes (163) (164) into a typical filled supply jug held with its mouth facing upward beside a typical cabinet, the length of-the flexible zone is in the range 0.2 to 1 m. When the jug is lifted into position on the cabinet, the excess length can be concealed inside the typical cabinet. When the level sensor (162) 20 detects that the jug is filled to a predetermined level, it sends a signal back to the solenoid control valve of the water generator through the low-voltage leads; this signal stops the flow of water into inlet of the water tube (163). It is envisioned that a "cut-off" embodiment of the present water generator similar to that shown in FIG. 14 is placed beside the existing bottled-water dispenser. Any embodiment of the present invention can be fitted with an external port for providing impure water into the recirculation loop in case of low temperature or humidity in the local environment. This operation provision will also enable the unit to dispense a much greater volume of potable water than would ordinarily be possible by condensation alone. Similarly, an additional alternative system to dispense and meter drinking-water additives such as colorants, flavoring, medicaments, vitamins, mineral supplements, etc. can be added near the end of the RT or cold-water delivery line on any embodiment of the present invention.

Example M12

Water generator for use in vehicles subject to violent motions and tilt angles.

Since automobiles, recreational vehicles and seagoing vessels may need an emergency source of drinking water, it is of interest to provide an embodiment of the present invention which is tolerant during operation of tilts up to 30 degrees in combination with movements which generate centrifugal forces in opposition to normal gravitational forces. It is envisioned that the present invention may be fitted with two changes to meet these needs: (a) gimbalsuspended, sealed condensate collector and (b) enclosed, sealed potable water reservoir with an appropriate vent. Relative to preventing or suppressing spillage from the drip collector under violent pitching motions, porous, hydrophobic foam elements may be attached to the upper wall zone of the tray to cover any gap between it and the edges of the heat-exchange plates or fins. Similarly, the collector tray may also be prepared with internal baffles plates extending perpendicular from the bottom or sides to suppress splashing.

Example M13

Combination refrigerator and water generator.

Since the present invention uses certain systems which are already present in a typical household refrigerator freezer, a further embodiment of the water generator is to incorporate it with the cooling and auto ice making subsystems of a refrigerator to produce a hybrid appliance which both cools food and generates its own mineral-free potable water for dispensing directly as ice water or for automatic preparation of mineral-free ice cubes. It is envisioned that at least three approaches to these alternative embodiments are possible: (a) to incorporate or integrate the water generator of the present invention with such appliances during original manufacture, (b) attach an embodiment of the water generator of the present invention as a field-modification to such units using permanent couplings/mountings/manifolds attached to prepared electronic and fluid interfaces installed at original manufacture, or (c) connect the water generator of the present invention with the cooling systems of such units using a modification kit including permanent or quick-disconnect fittings/mountings. The difference between approach (b) and approach (c) is that the fluid fittings and electrical circuits from the modification kit is attached at predefined points, but not to factory-installed fittings or interfaces, to existing systems of the appliance; it is anticipated that approach (c) may be done "on site" or in a repair shop. Alternatively, it is also possible to make a combination-hybrid appliance which is the combination of the water generator of the present invention within the cabinet of an appliance such as a refrigerator-freezer, ice-maker or room air conditioner. In such embodiments, the water generator may be: (a) provided with its own independent cooling systems in addition to the systems normally provided for the basic appliance or (b) integrated into or interconnected with the reverse-cycle system of the appliance so that only one compressor is used.

Figure 17B:
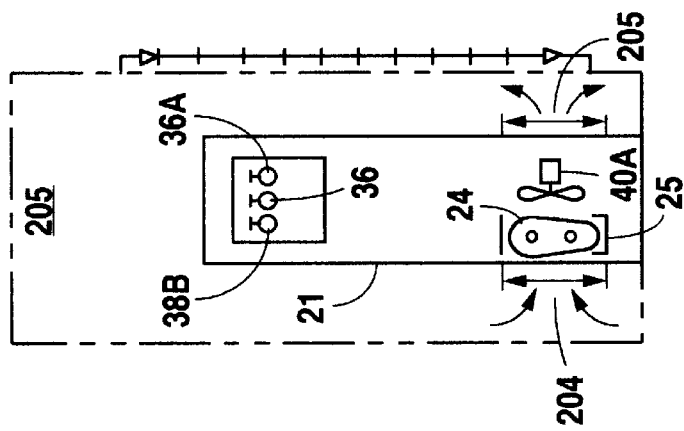
FIG. 17*b* is a schematic side view showing common refrigerant-fluid connections and circulation between a typical refrigeration-type appliance and a hybrid or combination embodiment of the present water generator. This figure also indicates the flow of environmental air into and out of the water generator as well as a rear-mounted, free-convection condenser for the refrigerator appliance portion.
Figure 17A:
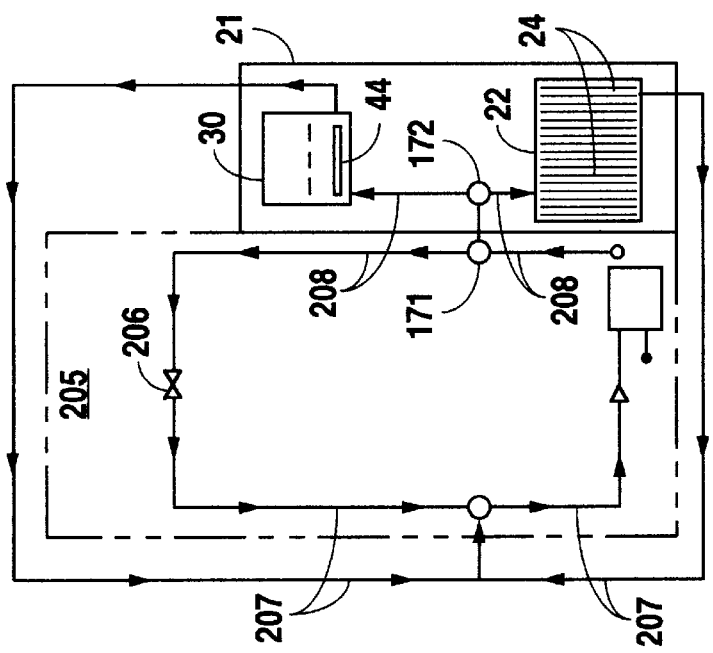
FIG. 17*a* is a schematic front view showing common refrigerant-fluid connections and circulation between a typical refrigeration-type appliance and a hybrid or combination embodiment of the present water generator.

FIGS. 17a and 17b show front and side views respectively of one possible embodiment of the present invention as integrated with a vapor-compression refrigeration-type appliance such as a refrigerator-freezer, icemaker, room air conditioner or a local air-handler. This corresponds to option (b) above. These figures show the outlines of the enclosure of a typical refrigeration-type appliance, and the flow diagram for the liquid and vapor refrigerant through the compressor, expansion valve and condenser. One embodiment of the present water generator is also shown as an integrated sub-system including indicia for its key elements as they can be placed in this embodiment. For this illustrative embodiment, the water generator is shown on the right side of the main appliance; air from the space is drawn into the front of the water generator portion and exhausted toward the rear. While the alcove (37) and delivery valves (36), (36A), (36B) are shown facing toward the right in this example they may also face toward the front of the main appliance. In this example configuration, the main compressor and main condenser carry the extra cooling load imposed by operation of the water generator, and its water cooler. The integrated water generator section would need only heat absorber-1 (22) and heat absorber-2 (44) for its cooling requirements; both these are connected to draw liquid refrigerant from the main system. FIG. 17a shows phantom views of the reservoir (30), heat absorber-2 (44) and heat absorber-1 (22); the extended-area fins are shown in a cut-away view with a portion of the water-generator housing front-wall removed. The branching valve (171) may be included in the integral interface and installed during manufacture of the main appliance; the attached or integrated water generator system may be fitted with a mating interface and splitter valve (171) which is connected to divide the liquid flow from (171) between heat absorbers-1 and -2 of the water generator. As shown in FIG. 17b, the extended-area fins of heat absorber-1 are shown in cut-away view with a portion of the water-generator housing side wall removed. As can be seen, the fins are arranged as a parallel stack with their flat faces parallel to the side face of the main appliance. The water condensate collector is shown schematically as (25); the intake fan motor to circulate room air across the cooled surfaces of heat absorber-1 are indicated as (40A). Essential systems of the water generator as described herein are enclosed within the housing (21); optional and other ancillary systems described can also be included within the enclosure (21). Further, it is possible for such integrated water generators. to use housings of smaller size and different shapes/proportions as needed to assure high efficiency and consumer acceptance of the combined or hybrid appliances.

Example M14

Combination water generator with: ice makers, air conditioners and dehumidifiers.

The water generator of the present invention can be mechanically combined within the cabinet of appliances such as icemakers, air conditioners and dehumidifiers. In the case of the icemaker, the water generator may be operated to supply all or a large portion of the water requirements; for large-capacity units. the VOC filter loop of the present water generator can be used to purify the regular tap-water supplied to the unit. Since the water generator of the present invention uses certain systems which are already present in typical ice makers, air conditioners and dehumidifiers, it is cost-effective to add a certain level of marginal capacity in their cooling systems. generate potable water and provide it at one or more selected temperatures by means of permanent or quick-disconnect fittings/mountings. It is envisioned that at least three approaches to these alternative embodiments are possible: (a) to incorporate or integrate the water generator of the present invention with such appliances during original manufacture, (b) attach an embodiment of the water generator of the present invention as a field-modification to such units using permanent couplings/mountings/manifolds attached to prepared electronic and fluid interfaces installed at original manufacture, or (c) connect the water generator of the present invention with the cooling systems of such units using a modification kit including permanent to quick-disconnect fittings/mountings. The difference between approach (b) and approach (c) is that the fluid fittings and electrical circuits from the modification kit may be attached at predefined points to existing systems of the appliance; it is anticipated that approach (c) may be done "on site" or in a repair shop. The resulting hybrid appliance is thus capable of generating potable water which is compliant with NSF-53 purity standards as well as performing its normal function. In a temperate climate, disposal of water condensate from such units (dehumidifiers, air conditioners) requires special drain piping and provision for manual emptying of the, collector. It is envisioned that the drained condensate from appliances such as an air conditioner may be recycled into the recirculation circuit of the present invention to provide additional potable water above the capability of the unit itself.

Example M15

Evaporative-cooled spaces.

In an and climate, the water generator of the present invention can be placed near a pool or other body of water or in an interior space which is cooled by water-evaporation air conditioning equipment for production of high-purity potable water.

Example M16

Stand-alone refrigerator.

Figure 18A:
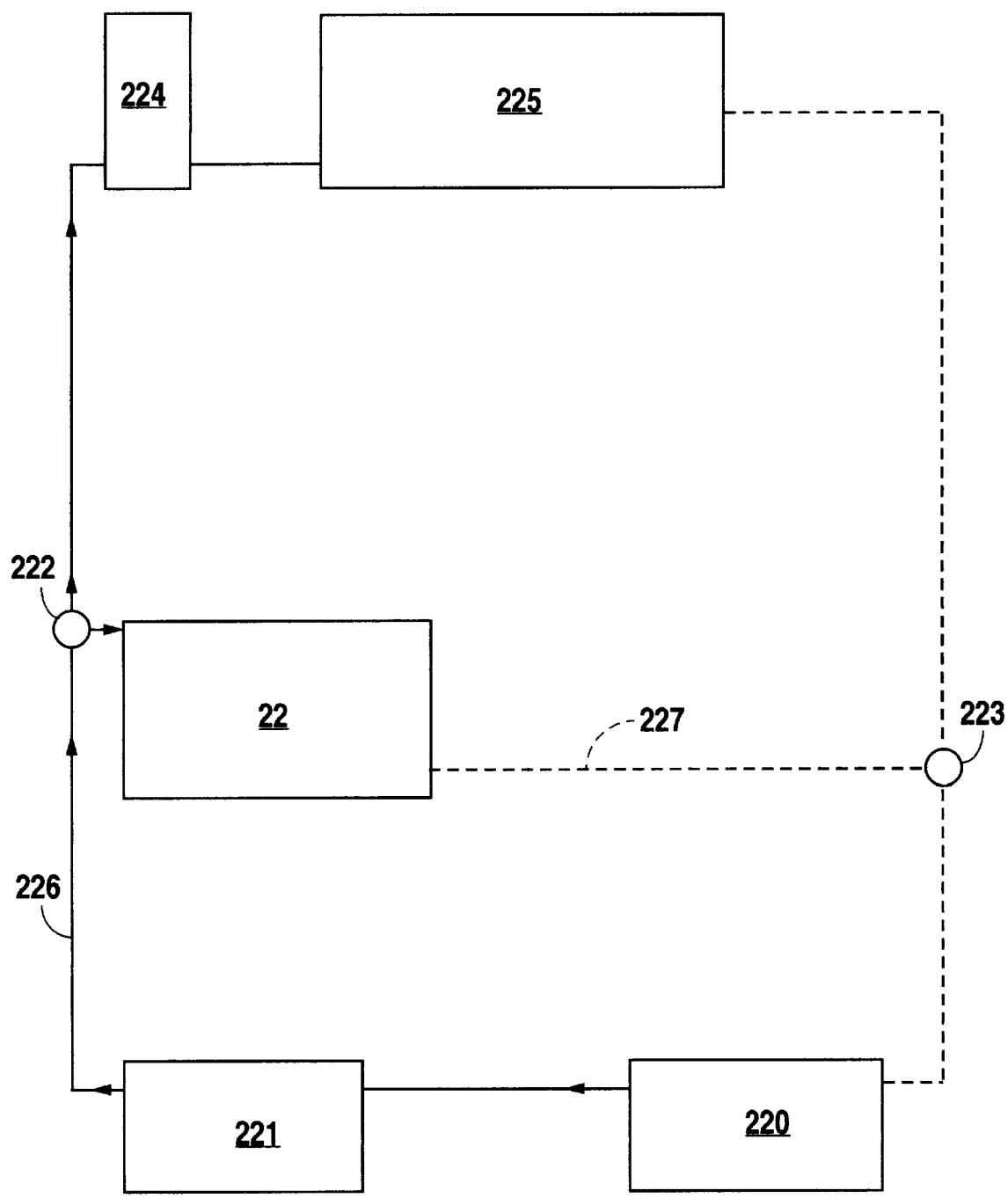
FIG. 18a is a schematic view of the refrigerant flow loop within a hybrid appliance which has the following functions: refrigerator/freezer, automatic icemaker, potable water dispenser and water generator according to the present invention. This appliance generates its own water for making ice and dispensing by condensation of water vapor from room air.
Figure 18B:
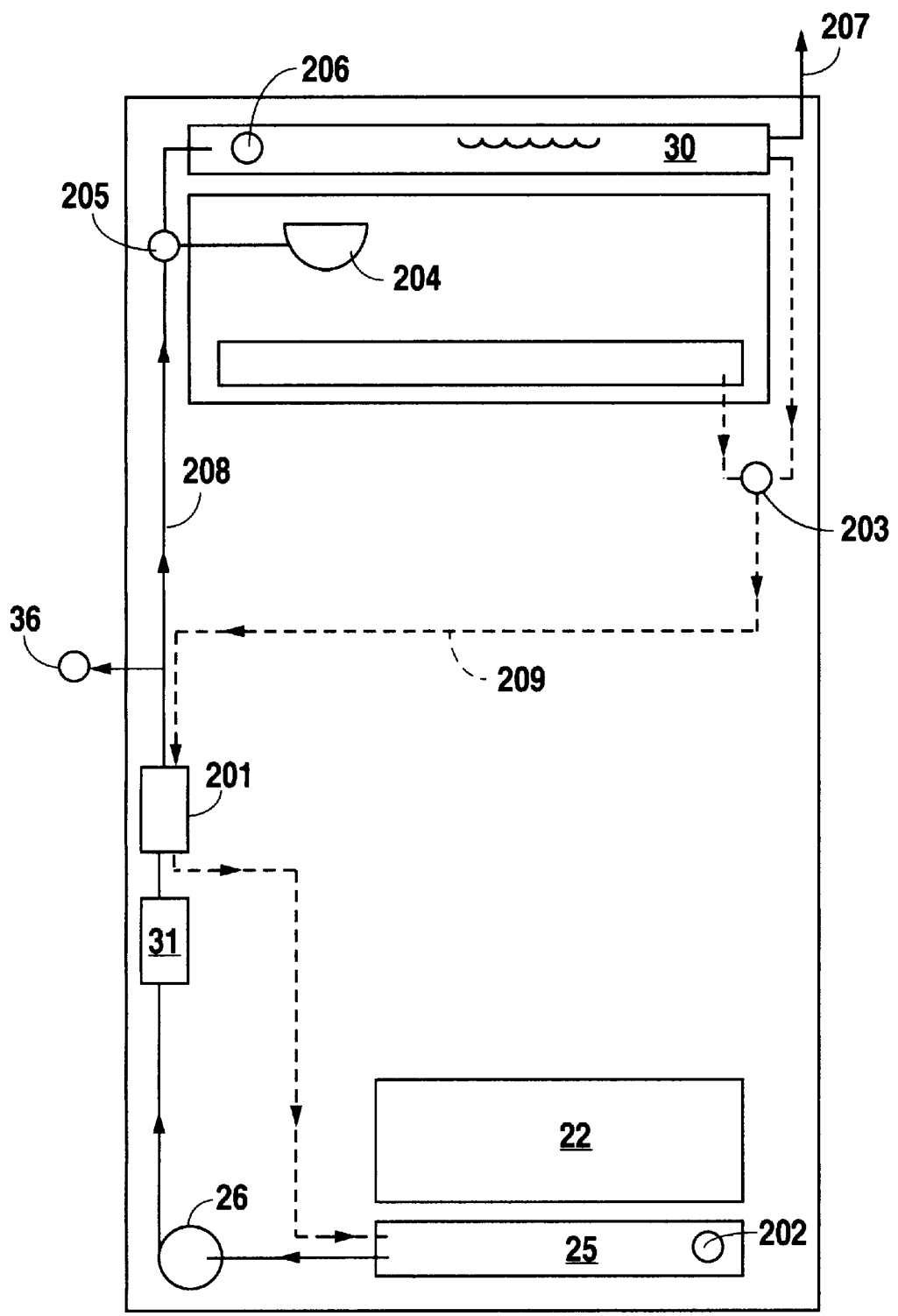

An ice maker and integrated water generator which does not require a water connection. This example is an extension of Example M13 above, which discloses an embodiment of this invention integrated with or into a refrigerator/icemaker which requires a water supply for making ice, but generates its own potable water for dispensing. It is envisioned that the water generator of this invention may be added: (a) as a field modification to a typical refrigerator/icemaker or (b) a factory-integrated version. The resulting hybrid appliance has the capability of generating its own potable water which is available delivered as potable-water ice or dispensed as liquid potable water. FIG. 18a shows a schematic refrigerant-flow diagram of one such embodiment. This particular embodiment includes two "AND" valves. (222) and (22–31), which are controlled to allow flow of refrigerant to heat absorber-1 (22) and/or (225) the evaporators of the refrigerator, i.e., the freezer compartment and the icemaker, if fitted. These "AND" valves permit operation of the water generator alone or the regular systems alone, or any combination of partial flows partitioned according to user control settings or demand sensed automatically by the system. Alternatively, an interconnected series of 3-port reversing valves and tubing manifolds can be used to accomplish the same degree of independent operation of the water generator and the regular systems. Either "AND" or reversing refrigerant valves provide for efficient switching of the basic reverse-cycle apparatus between the usual refrigerator/icemaker functions and the additional functions of the water generator and its optional dispenser reservoirs. Either of these illustrative circuits will also be extremely conservative relative to energy consumption and energy efficiency. FIG. 18b shows the schematic potable-water flow circuit including UV bacteriostat (201) and charcoal-type VOC filter (31) for removal of absorbable/absorbable dissolved or dispersed contaminants. The filter (31) in this embodiment may be any known type of disposable filter which is able to reduce dissolved and dispersed impurities to low levels required by NSF Std.53. The filter may include screen, depth and porous adsorbent elements or stages prepared from known materials. Continual recirculation is provided by the pump (26) and the recirculation control (202); this sensor can be set to cause recirculation for a preset time duration at any predetermined time interval, even if the level in the collector (25) is at the "full" level. The UV radiation module (201) can include any type of known UV source including gas plasma tubes, lasers, and solid-state UV sources. As shown, the return flow (209) passes through the active-radiation field of the UV bacteriostat (201). The wavelength, radiant energy level and water flow rate are adjusted to provide sufficient UV exposure for effective killing of bacteria An additional feature of this embodiment is the auto-defrost water-recovery system which recycles melted frost from the freezer evaporator into the potable water circuit; the potable water circuit includes an "OR" valve (203) which is controlled to collect melted frost from the freezer during auto-defrost operations. This circuit includes a vented reservoir (207) and (30) respectively and a gravity-flow path (209).

Example M17

Stand-alone icemaker with integrated water generator—no water connection required.

Figure 19A:
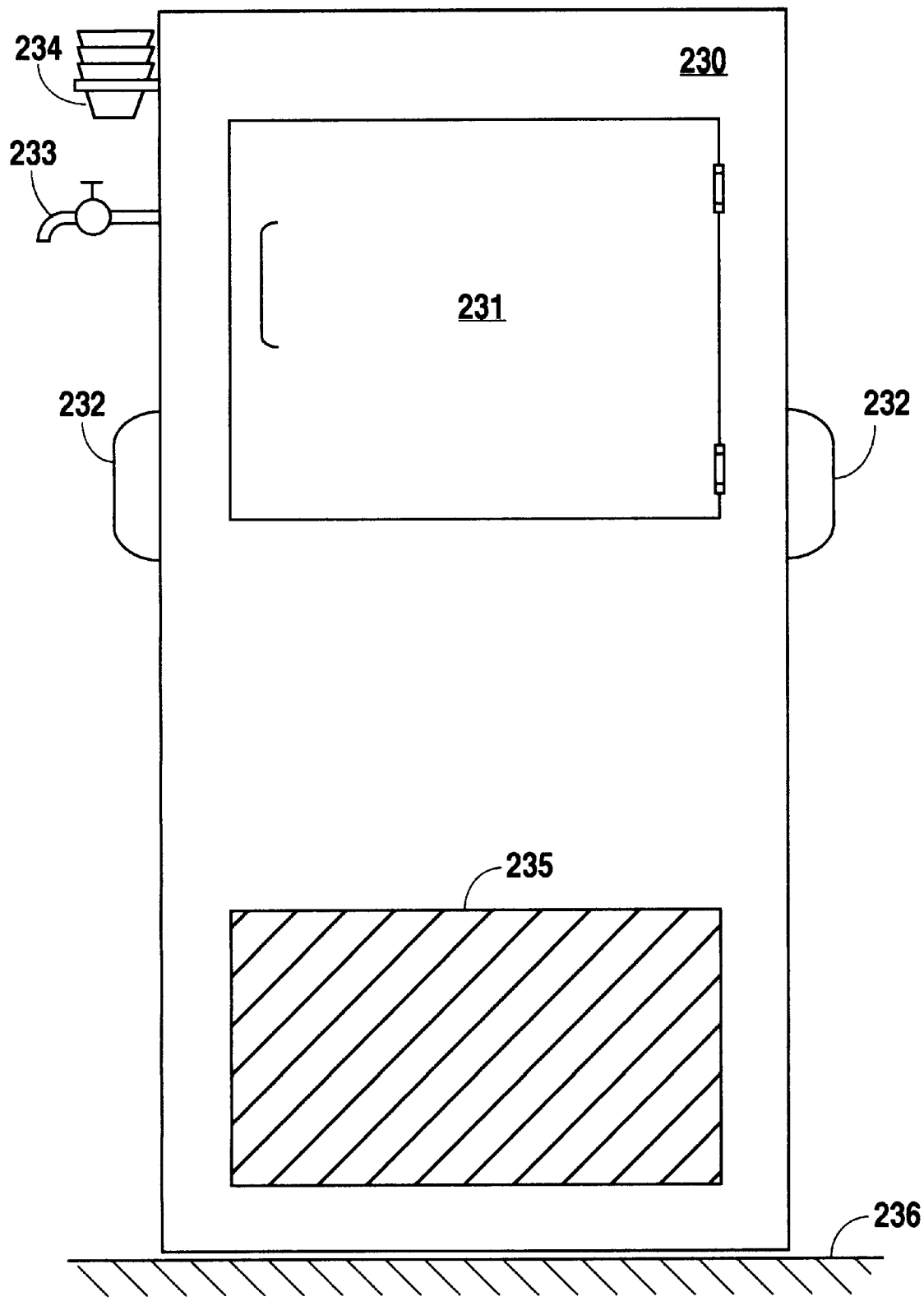
FIG. 19a is a front-elevation exterior view of a hybrid appliance for making ice, dispensing water and generating all its own water using a water generator according to the present invention. This appliance generates its own water for making ice and dispensing by condensation of water vapor from room air.
Figure 19B:
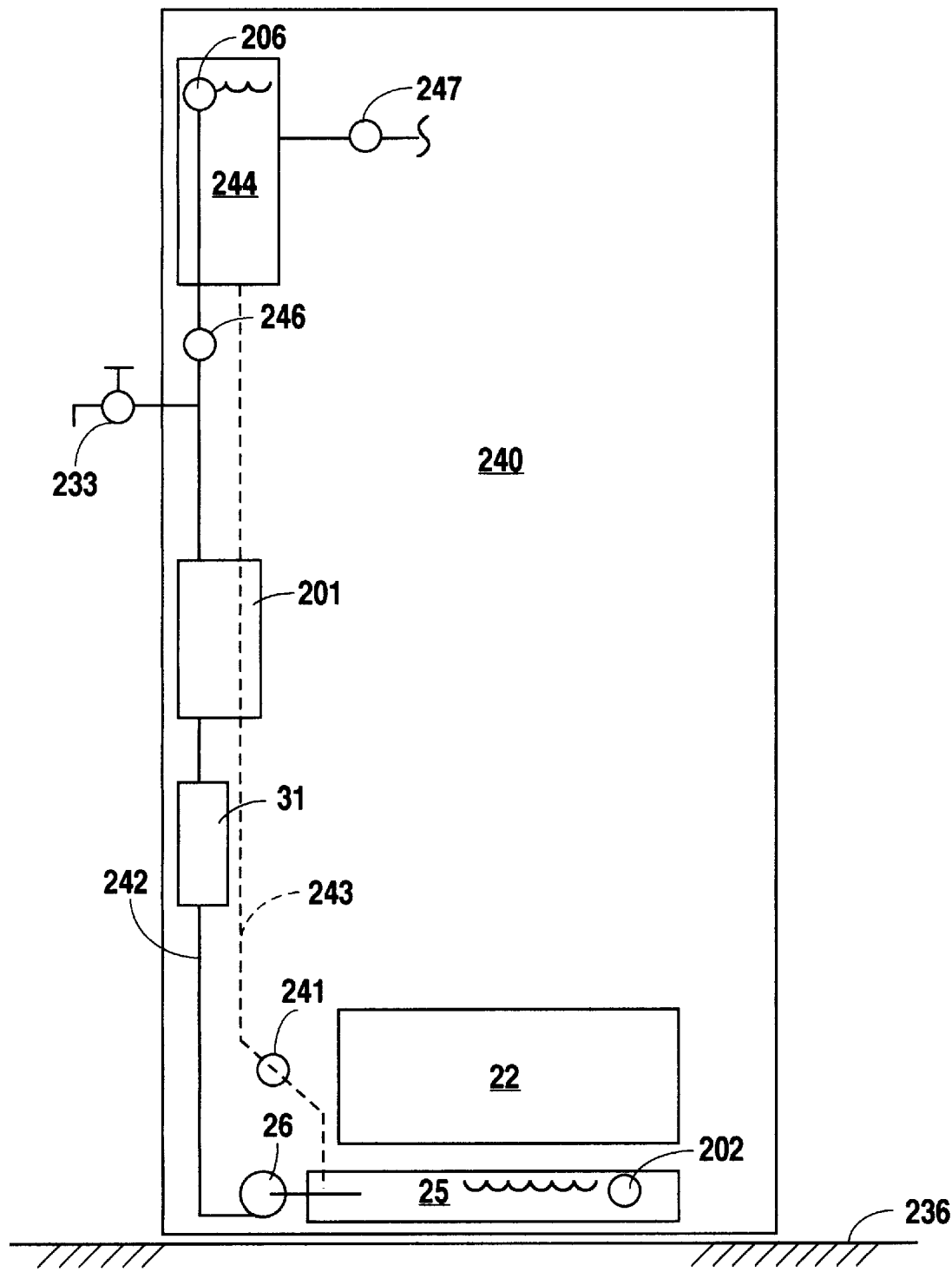
FIG. 19b is a schematic cut-away view of the appliance shown in FIG. 19a showing the potable water flow loop.

This example is an extension of Example M13 above, which discloses an embodiment of this invention integrated with or into a icemaker which does require a water supply for making ice. FIG. 19a shows the front elevation view of a hybrid icemaker/potable-water dispenser (230) which generates its own water supply by means of an integrated embodiment of the present invention. This unit may be floor supported as shown, or may rest upon a supporting surface (236), is moveable by one or two persons taking hold of the lifting handles (232). The general arrangement includes a hinged door (231) into the internal ice compartment; the icemaker freezes solid ice shapes and they fall into the holding bin as they are produced. The internal components include the water generator of the present invention connected into the refrigeration system of the icemaker. Such a unit may be made as a factory version icemaker or a field retrofit kit added to an existing standard icemaker. The unit may have one or more optional external delivery faucets for liquid potable water (233) at predetermined temperatures, e.g., room temp, cooled, or heated. For convenience, the unit may also be fitted with an optional protective holder/dispenser means (234) to deliver clean, fresh, disposable drinking cups. In this illustrative embodiment, a protective intake grille (235) is shown in front of the intake-air filter of the water generator. FIG. 19b shows a schematic view of one illustrative embodiment of the potable-water loop within the illustrative appliance of FIG. 19a. In this cut-away, sectional view, the shell of the cabinet is denoted as (240); one or more optional external faucets for dispensing potable water at one or more selected temperatures is indicated by (233). The cabinet is shown resting upon the floor or a supporting surface (236).

The refrigeration system of the icemaker provides fluid to the heat absorber of the water generator (22) under the system control with user adjustments. Filtered environmental air is circulated across (22) and cooled; resulting liquid water condensate is collected in the collector (25). The electric pump (26) operates in response to control signals generated by the level controller, (202); this controller can enable pump operation to deliver condensate fluid to the pressurized reservoir (244) (a) upon call from the icemaker supply valve (247) (b) upon demand from the external potable-water dispensers (245) or at predetermined time intervals for the purpose of continual recirculation and resterilization of the reservoir contents through the UV radiation module (201). The UV exposure module (201) may be fitted with any UV source which produces effective wavelengths and intensities for sufficient time duration to effect killing of bacteria in the water stream; such UV sources include but are not limited to gas-plasma tubes, solid-state emitters, fluorescent emitters, natural sources, etc. This illustrative loop also includes a trim valve (241) which controls the water flow rate; for the simplest embodiment, it can be a known metering valve which may be manually preset to a selected max. flow when the pump is enabled for periodic recirculation or in any case when the water flow rate exceeds the sum of demands. Alternatively, this trim valve may include attached or integrated electro-mechanical or electronic sub-systems such as sensors/actuators/drivers responsive to digital/analog user inputs to the control system(s)/algorithm(s). The filter (31) in this embodiment can be any known type of disposable filter which is able to reduce dissolved and dispersed impurities to low levels required by NSF Std.533. The filter may include screen, depth and porous adsorbent elements or stages prepared from known materials including but not limited to non-woven fabric, porous elements in the form of membranes, granules and other formed-media shapes and rings, saddles, etc. as well as bonded, porous charcoal preforms. Continuing intermittent recirculation is provided by the pump (26) and the recirculation control (202); this sensor can beset to cause recirculation for a preset time duration at any predetermined time interval, even if the level in the collector (25) is at the "fall" level. The UV radiation module (201) can include any type of known UV source including gas plasma tubes, lasers, and solid-state UV sources. As shown, the pressurized return flow (243) passes through the active-radiation field of the UV bacteriostat (201). The wavelength, radiant energy level and water flow rate are adjusted to provide sufficient UV exposure for effective killing of bacteria As mentioned above the recirculation flow rate is limited by the trim valve (241). This illustrative embodiment includes a pressurized reservoir (244) fitted with a gas-filled bladder or an airspace as shown; the reservoir water-inlet check valve (246) prevents water from flowing backwards from the reservoir and into the supply channel (242). The level of liquid water in the reservoir is controlled by (206) which senses the level and/or pressure; it is responsive to system control signals for maintaining the water level/pressure according to demand for ice or potable water or preset system commands for periodic recirculation of water already in the reservoir.

Example M18

Vehicle Potable Water Apparatus.

This embodiment is an example of a version of the present invention to produce potable drinking water from condensate available from auto or truck air conditioning systems or from other vehicular conveyances, such as trailers, mobile homes, cabin cruisers, etc., and dispensing hot and/or cold potable water safely. See FIGS. 20(a)–(c).

It consists of an enclosed reservoir (340) made of a UV-transparent polymer material, such as polycarbonate or acrylics, or is provided with a UV-transparent window (390) that is resistant to UV or oxygen degradation. The reservoir is provided with a safety-interlocked, enclosed (333) UV source (317) which may be located exterior to the reservoir and abutting either: (a) the UV-transparent window (390) or (b) a UV-transparent portion of the top or side walls. The UV source (317) is selected to provide a sufficient intensity and effective wavelength range for killing any live organisms present in the water being exposed within the reservoir. Another embodiment is to locate the UV source with a fluid-sealed, safety-interlocked, UV-transparent tube which traverses the reservoir interior. The reservoir has a fluid-level control sensor (312) that shuts off the circulation pump when low fluid is sensed in the reservoir. When the water level is low, the sensor shuts off the entire system. The light-emitting diode (LED) indicator display (308) also goes out at the driver's console (353) signaling a low water level. The reservoir has a drain valve (331) located at the lowest point for draining the system in the winter. In the case of a UV-opaque metal or alloy reservoir, it's inner surface may be polished or otherwise treated to increase it's reflectivity for UV wavelengths. If made of transparent polymer material, the exterior of the reservoir may also be wrapped with a UV-reflective metallic foil (341) to increase the killing effectiveness and power-efficiency of the source.

The reservoir has one inlet for the incoming condensate (342) from the vehicle AC evaporator drain pan. It has two outlets. One outlet connects to the circulation pump (344) and the other outlet (343) connects to the overflow condensate. Upstream, on the incoming condensate line, is a controllable diverter valve (335) which allows condensate to go either to the reservoir or be discharged. This latter mode may be for seasons when the potable water system is not being used, such as in the winter, or for repairs or some other reason.

The circulation pump may be located outside the reservoir or within in the reservoir. It is electrically connected so that it can operate only if the vehicle ignition switch is "on" (309), and either the hot (303) or cold (304) switch is "on" and the radiation source (317) fully operative. Downstream from the circulation pump is a check valve (345) that operates to keep the portion of the system downstream from it pressurized (363) when the circulation pump is stopped.

After leaving the circulation pump, the UV-radiation-treated water continues through a porous, carbon-block absorber filter (329) tested to meet NSF 53 standard for removing volatile organic compounds (VOC). After passing through the VOC filter, the water flow branches at the periodic-recirculation chamber (355); one branch connects to the hot water flow line (346) and the other branch connects to the cold water line (347). An additional line recirculates through the solenoid check valve (357) and flows past the UV source and the filter (329) and back into the recirculation chamber. The recirculating system control allows treated water to be periodically recirculated past the integrated radiation source (317) and the solid block VOC filter (329). This recirculation takes place when the circulation pump (3, 14) is activated by a timing and valve sequence control (356). Controllable check valve (356) opens when the timer sequencer starts recirculating the water.

A dispenser (360) and related control sensor may be added to the hot or cold delivery lines beyond the recirculating chamber, to allow delivery and accurate metering of certain desirable drinking water additives such as colorants. flavoring, vitamins, mineral supplements. herbal extracts, fluorine and other known therapeutic compositions. The recirculation assures that the water remains pure in the lines even after the vehicle air conditioning system has not operated for10extended periods. The energizing circuit for the timer-sequencer is electrically connected directly to the vehicle battery so that water is recirculated even when the vehicle is parked. Switch (359) disconnects the timer-sequencer from the battery when circulation is not desired such as in the winter or in extended storage.

The hot water flow goes through a heater (328) with a heating element (321) and thermostat temperature-control switch (319). When the hot water switch (303) is turned "on", the heater is turned "on", the LED indicator display (307) comes "on" showing the heater is "on". The hot water safety interlock (305) is also energized. Switch (318) also prevents heater (328) from coming "on" if there is no water in the heater. When the water reaches the appropriate temperature (about 80° C.), it turns "on" the LED indicator display (320). Hot water for beverage service can then be dispensed by operating the controllable delivery valve (326) provided the arming switch, (350), on the driver console (353) is "on". The interlock (306) ensures that no hot water can be dispensed by children or others unless the driver energizes both the main on-off switch (311) and the hot-water safety interlock switch (305). Once both these switches are "on", water will be maintained at about 80° C. by the thermostatic control (319). A check valve (327) in the line between the recirculation chamber and the heater (328) prevents hot water from leaking back into the cold water portion (347).

The cold water flow line (347) is flexible, medical-grade tubing; this line passes through a portion of the cover (337) of the vehicle AC evaporator chamber and is thermally connected to. the vehicle's air conditioner cooling section (338). To increase the heat-exchange area, this line is formed with several loops and exits through the cold water safety interlock (306) and connects thence to the controllable delivery valve (325). Similarly, this delivery outlet may be branched or direct-connected to an external drinking-water supply tank, such as provided in atypical recreational vehicle. In case of low environmental temperature or humidity, it is also possible to introduce impure water into this system at port (334); alternatively, the unit may be primed with impure water to provide potable water in a minimal time interval after start-up. No water can be obtained unless: (a) the cold-water arming switch, (351), on the driver console (315) is "on" and (b) the safety interlock switch (304) is "on" at the driver's console. When these conditions are satisfied, the LED indicator display (308) is lighted. Also, no water can be dispensed if the vehicle ignition is "off" (309). If the ignition is "on", no water can be dispensed if the safety interlock switch (304) is "off" at the driver console. The controllable delivery valves are installed far enough apart in the vehicle that children playing could not reach both.

When installed as a retrofit kit (353) a manual (352) guides the installer so that safety interlocks are installed correctly. The retrofit kit contains all of the parts listed above.

Example M19

An alternative-embodiment generator fitted with timing-sequencing control circuits and additional operational features (external water inputs/outputs).

In order to maintain its purity after condensation, the water produced by the present invention is recirculated periodically through the bacteriostat loop; the timing and flow path for recirculation is predetermined by control circuits (280A) which activate a series of solenoids in the several connected flow channels. In the following discussion. the term control circuits denotes circuits implemented as: (a) discrete components, (b) integrated circuit chips, or (c) microprocessors. These control circuits also actuate indicator lights and distinctive audible signals to indicate particular operational modes, inlet/outlet port status and functions being applied at that moment. The control circuits also provide sensing and control for the various features of the apparatus. This example embodiment also illustrates some additional features including provision for fluidly connecting, either by quick-disconnect fittings or standard threaded plumbing connections, the apparatus to municipal water so that the apparatus will automatically admit and process municipal water whenever conditions are unfavorable or impossible for production of condensate to refill its storage reservoir. Quick-disconnect or threaded couplings may be provided for: (a) city/external-pressurized water inputs into the water generator or (b) for treated water delivery from the water generator to an external appliance such as refrigerator or ice maker. The control circuits are also adapted to admit municipal water automatically to external appliance(s), such as a refrigerator or icemaker, which is connected to the water generator, if its water-generation rate is not sufficient to meet the demand from the connected appliance(s). To accomplish these functions efficiently and safely, the control circuit includes electronic logic components which examine operational status and sensed input parameters and, according to the predetermined logic, determine the need for and timing of switchover to municipal water. The logic devices evaluate the water level in the reservoir and the control circuits automatically operate appropriate electric solenoid valves in an appropriate sequence. The control circuit, using similar electronic logic devices, automatically determines timing of switchover to delivering water output to an external system or diverting water to an external container. The control circuit also provides timing control for recirculation within the apparatus to remove dissolved substances and to inactivate bacteria.

Figure 17C:
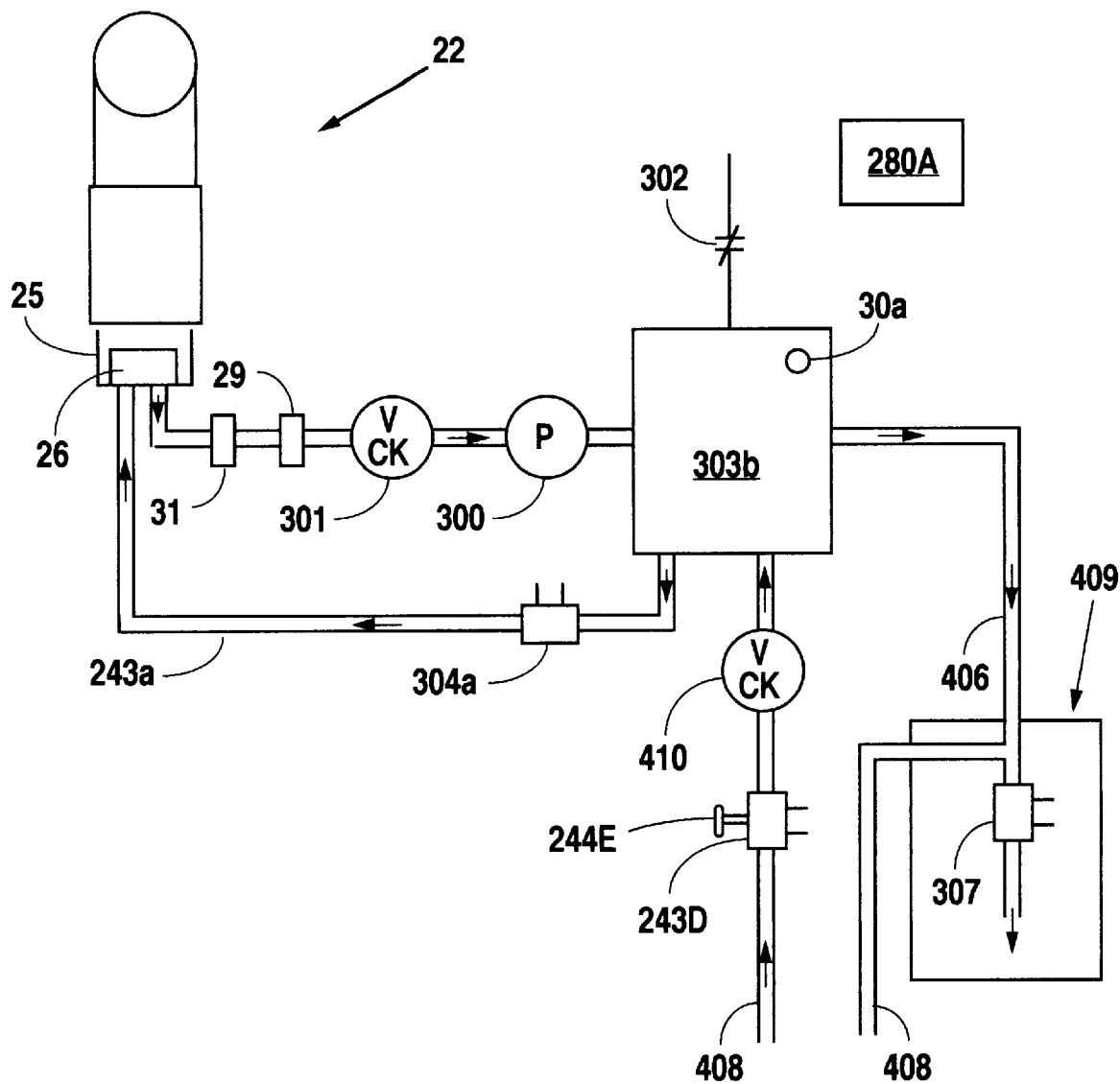
FIG. 17*c* is schematic flow diagram of an embodiment adapted to provide pressurized. potable water to the water-inlet connection of a typical refrigerator for preparation of chilled water or ice cubes. As explained later in Example M19, this embodiment enables the water generator to supply water to the refrigerator whenever it can and automatically to switch over to municipal water when it can't, due to atmospheric conditions.

As shown in FIG. 17c, another embodiment of the recirculation system includes the recirculation line (243a), a pressurized reservoir (303b) and a booster pump (300) for feeding fresh condensate into the reservoir and either to an external container or to an external system. The status of the external system or reservoir, i.e., "ready" or "off", is sensed by the pressure sensor (302) in the discharge line and a corresponding status signal (302A) is generated and sent to the control circuit (280A). This embodiment is also connected by pressurized water line (406) to an external appliance such as refrigerator or an icemaker (409) which requires input of high-quality water. A pressure sensor incorporated with the electric solenoid valving device (407) detects whether excess water from the generator reservoir is available or whether drinking water from the household supply line, e.g., well, municipal or other, will be supplied to the appliance. The benefit of this approach and subsystem is to assure that purified water from the generator will be used whenever it is available; in times when generation is slow or impossible, the regular supply will be supplied through the control circuits. Another feature which is incorporated into this embodiment is the provision to add water from any external source, e.g., well, municipal or other, under the control of a manual or electric solenoid valve (244E). The integrity of the water in the recirculating system is protected by the check valve (410). This embodiment can also be adapted to accept a container of external water is from a low-purity source and input from a bucket or pail. By means of the booster pump. such external, low-purity water can be5recirculated through the purification filters and the bacteriostat system of the generator prior to delivery for use.

Example M20

Embodiment with thermoelectric, TE, cooler, thermally-isolated dispensing zone and in-line heater.

In this invention, heat absorber 2 allows dispensing of cooled water. For certain alternative embodiments, it may be desirable to implement heat absorber 2 as a Peltier device or thermoelectric cooling probe. FIG. 46F indicates the portion of the probe which extends approximately horizontally into the reservoir and is sealed relative to its lining. Its mounting base portion, (500), is fixed to an external surface of the wall of the water-generator housing. An external fan, (501), provides a flow of environmental air to remove the rejected heat energy from the base and hot-junction of the cooling probe by a convective flow of surrounding air.

As shown in FIG. 20d, a localized or thermally-isolated zone of cooled water is defined by one or more nested interior isolation cups , (44B) and (44C), which surround the cooling probe and include the entry port for the delivery line. In this illustration 2 cups are shown i.e., as two spaced-apart hemispheres; alternatively, one thick-walled cup formed from material with low thermal conductivity could be used. The non-circulating layer of water between the 2 cups shown also forms a useful degree of thermal isolation. To avoid generally-vertical free convection within this layer, its thickness should be kept in the range 3–15 mm. Alternatively, the outer and inner cup surfaces can be formed be found with generally—horizontal oriented flanges or fins which prevent free convection of the trapped water layer in a direction perpendicular to the fin surface. The cups must be formed of, or coated with, materials which are acceptable for long-term contact with drinking water such as metals, alloys, polymers, ceramics. The thickness of the cups can be in the range of 0.5–5 mm. depending on thermal conductivity. Laminated or composite materials with materials of low thermal conductivity can be used to the prepare inner, outer, or all the cups. One or more nested cups can be used to define the cooled zone. The rim of the inner cup is closely abutted to the reservoir wall to minimize capillary leakage inflow from the reservoir into the cooled zone; this fit-up gap can be in the range 0.5 to 5 mm depending upon rim thickness, planarity and surface texture. Alternately, a resilient elastomer seal can be used between the rim of the inner cup and the wall of the reservoir to prevent undesired intrusive inflow of uncooled water.

The isolation cups are prepared with multiple orifices, (44D), which permit a controlled flow of ambient- temperature water into the cooled zone. The orifice shape, the individual area(s), total cumulative area and area-placement pattern on the inner cup are adapted to provide the maximum volume of the coolest water in the zone for delivery to (36A). Since liquid water above 4° C. increases in density with decreasing temperature, the ideal location of the tapping point of the discharge line is below and adjacent to the lower surface of the cooling probe (46F). However, locating it at a comparable horizontal plane beside or even above the probe, as shown in FIG. 20d, will furnish an adequate flow rate and volume of cooled water if care is taken in design of the isolation cups and their orifices. If a typical requirement is to deliver 250–750 ml of cooled water from (36A) at each use, the cooled zone inside the inner cup should define approx. 1–5X this volume. Since water immediately surrounding the inner cup or between spaced-apart cups will be cooler than the ambient water in the tank, the pattern of orifices in the inner cup should be prepared to feed water first from its annular zone into its interior and ultimately into the tapping-point of the discharge line. Optimally, the total flow area of the orifices or holes of the inner cup must be balanced against the flow area of the delivery tube, in this way, flow to replenish the volume drawn will be directed: (a) in a demand-balanced flow rate and (b) to an area of the inner cup remote from the tapping point. The same logic is also applied for optimal sizing and particular placement of the orifice holes one or more outer cups encompassing the inner cup. Obviously, to prevent direct radial flow from the periphery of the outer cup into the inner cup, the cup-hole axes must be displaced angularly and/or axially with respect to the probe.

Although not expressly shown in FIG. 20d, other shapes such as cylinders, ellipsoids of revolution, etc. can also be used for the single or nested thermal-isolation cups. Depending upon cup size, shape, thickness of the annular zone, thermal conductivity-thickness of the individual cups and whether the axes are eccentric, the overall performance of the isolation zone can be improved. The diameter of individual circular orifices can be in the range 0.5 to about 10 mm.

In order to hold operational energy consumption to a minimum, it is desirable to partition the reservoir chamber of the water generator to include a zone which can supply small quantities of cooled water in the temperature range 5–18° C. to the external cooled-water delivery valve. For a typical unit, the volume of cooled water to be delivered is in the range of 250 ml to a liter. An alternative method of partitioning the reservoir to define thermally-isolated cooled zone is to provide a 2-layer, cup-like enclosure with its open rim adjacent to a vertical face of the reservoir chamber and prepared with non-aligned inflow holes to allow water inflow from the main, ambient-temperature portion to balance the volume delivered from the zone. The delivery line is positioned to draw from the lower portion of the cooled zone and not immediately adjacent to the inflow holes to minimize the aspiration of uncooled water into the delivered stream. There are numerous suppliers of known Peltier-junction devices which are capable of 5–500 watts of heating or cooling. By providing an appropriate-textured, drinking-water inert, cooling zone surface of sufficient area, such units in the form of a probe which extends in a direction generally parallel to the horizontal axis of the enclosure can be use to provide sufficient cooling. The actual cooling load of a unit capable of delivering I liter/hour of water cooled 10° C. is estimated to be about 11 watts; this estimate ignores the cooling energy which will be required to offset heat leaks into the cooled zone from the liquid water. Of course, with a Peltier probe, improved insulation materials and measures must be used to reduce heat leaks from the environment and structures into the water contained in the reservoir. Because Peltier units have relatively low efficiency in cooling, the actual electrical power demand for a typical known cooling-probe unit appropriate for this embodiment will be in the range 50 watts to 2 kW.

For minimal heating energy consumption of this embodiment of the water generator, it is desirable to provide an insulated, electric-resistance heater in the discharge line (46C); this avoids maintaining a volume of heated water at all times. With an in-line heater, the water contact surfaces must be of materials known to be safe for long-term contact with drinking water and having sufficient thermal conductivity to permit rapid heating of a stream with a flow rate of about 250 ml/min and increasing the temperature by an approx. 40° C. Known electrical resistance heaters, such as those employed in electric coffee makers, are available from a number of sources in appropriate sizes, e.g., 50–1000 watt. An additional feature provided in this water-generator embodiment is an integrated preheating delay timer control (46B) which allows the heating elements to heat the volume of water resident in the heater unit to the preset control temperature before the system is actuated to deliver ambient-temperature water through the heater. This feature avoids delivery of partially-heated water during the warm-up interval for the heater; the delay is a time period in the range of 5–500 seconds depending upon the size, power and construction of the heater. The duration of the preheating time is controlled either by heater-power/timing circuits or by the program of a microprocessor as shown and described below in Example 21. Ideally, the external surface of the heating portion is covered by an appropriate layer of thermal insulating material.

This embodiment also provides for control circuits indicated by the notation (280A) which signifies any type of control circuit including discrete components, integrated circuits or microprocessors. This embodiment also includes provision for input of municipal water (408) or emergency input of low-quality water (244B). Further, this embodiment includes provision for external delivery (32A) of water from the reservoir (30).

Example M21

Microprocessor controlled recirculation.

In addition to the embodiments described in previous examples, there is also a need for water generators fitted with microprocessor controls for the operation of the bacteriostat circuit and to facilitate emergency introduction of impure water from external sources, i.e., an array of sensors and a microprocessor which allow the unit to operate as a water-remediation/dispensing system whenever environmental conditions do not permit sufficient water to be generated. Such units may be prepared with sensors adjacent the input port to detect the external charging of impure water and an expert system which activates the unit to operate in one or more "clean-up" modes. The object of selectable and multiple remediation modes is to increase the efficiency to the apparatus in dealing with the probable contaminants to be removed from low-quality input water. For example, the system could be provided with alternative or additional depth/screen filters capable of separating particles and coarse colloids, which are automatically activated, upon receipt of input signal/data or sensor measurement signals, indicating that the impure input water includes suspended matter best handled by physical separation such as filtration. Other operational-mode possibilities are: (a) to provide alternative or additional activated-carbon filters and or (b) membrane filters capable of removing bacteria. The former, (a), might be selected to pre-treat water known or suspected to contain toxic industrial wastes while the latter, (b), could be selected to remediate water containing suspected bacterial contaminants such as *E. coli*. The required input to trigger the expert system could be obtained by any known means including: a sequence of pulses on one of the standard knobs/buttons/keys, an input key pad, selector switches, etc. Alternatively, the system might include optional sensors for water physical/ chemical properties including turbidity, conductivity-dissolved solids, pH, etc., which generate signals to activate the microprocessor-controls. In these embodiments, known sensors and detection methods are used.

The expert system embodied within the microprocessor may optionally be adapted to measure chemical or biological properties of the water, e.g., pH, p02, concentration of a selected cation or anion. etc., in the recirculation loop to determine if it contains acceptable or predetermined levels of specific anticipated contaminants. This feature would be of significant value for low-quality, emergency water input into the system. In these embodiments, known sensors and detection methods are used.

The expert system embodied within the microprocessor may optionally be adapted to include a learning mode to optimize its operation based upon recent operational history. By storing and analyzing bacterial activity trend data, the unit could optimize the duration and frequency of recirculation necessary to achieve a selected quality of water to be dispensed or delivered. In these embodiments, known sensors and detection methods are used.

Figure 21:
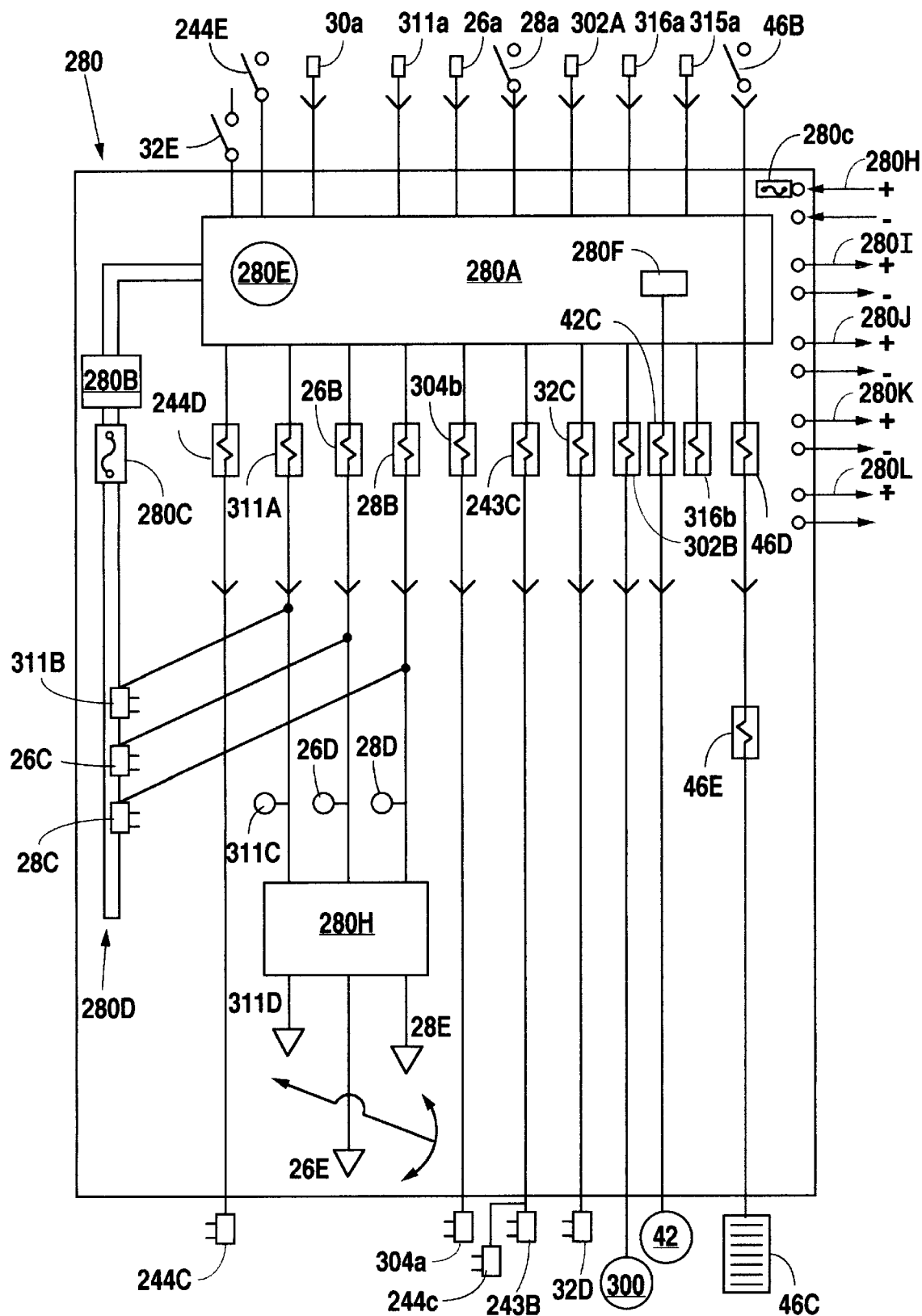
FIG. 21 shows a schematic diagram of a flow-controller, flow-routing manifold, solenoid valves and microprocessor as explained in Example M21. Basically, this system controls flows in an electronically-automated embodiment of the generator of the present invention; signals from the microprocessor drive operation of the unit, the status/alarm displays and warnings, including solenoid valves, pumps and all the safety interlocks.

FIG. 21 shows an embodiment of the present invention which includes a microprocessor and flow-routing manifold. Its operation is described in the following. The controller (280) includes a microprocessor (280A). FIG. 21 is a schematic of the controller (280) with incoming power switch (280G), a fuse (280C), a transformer (280B) and a microprocessor (280A) containing its own internal clock (280E), a frequency—changing subsystem, (280F), for continuously warbling and or stepwise incrementing the frequency of the known ultrasonic pest-control device, (42), and a provision for a series of input signals and relays to sense and/or control various functions and safety interlocks. The low-voltage circuit is marked (280D). These are explained in detail below.

Various incoming signals, which are explained below, are processed and output signals generated; in this manner the functions of the apparatus can be controlled by the microprocessor. These output signals are sent either: (a) directly to a control component or (b) to operate relays which in turn drive solenoids to control various functions of the apparatus as well as related fail-safe features. The various input signals are as follows: an electrical switch (32E) determines whether or not water is being pumped through the electrically-controlled diverter valve (32D) to an additional container when the reservoir (30) is filled as sensed by sensor (30A) located in the storage reservoir. The spilled water sensor, (311a), detects the presence of liquid spilled or leaking water at the bottom of the enclosure and shuts down the unit to prevent flooding. The nomenclature LED used here denotes either "light emitting diode" or other "light-emitting device such as a plasma, filament or tube. This sensor controls relay (311A) which drives solenoid (311B) to disconnect electrical power. It also activates the LED status-indicator light, (311C), and causes the piezoelectric device, (280H), to activate a first distinctive audible alarm, (311D), to indicate spilled water inside the enclosure. Fail safe switch (28a) includes either a UV source current sensor or a UV intensity sensor, such as a photoelectric cell, and drives relay (28B) which in turn activates solenoid (28C) to disconnect electrical power. Further, it activates LED light (28D), piezoelectric device (280H) and another second distinctive audible alarm (28E) indicating bacteriostat failure. Should pump (26) fail during recirculation, there would be an immediate flood of water, 0.5–2 liters volume within a time interval of approx. 45 seconds, due to overflow of the condensate collector. While this flow would eventually be detected by the spill sensor, the pump interlock provides immediate protection against undesirable spilled operation sensor (26a) includes devices to sense pump function and. if faulty operation is sensed, controls relay (26B) which drives solenoid recirculation valve (304a) "closed" and shuts off electrical power. Because this fast-acting interlock is redundant with the spilled-water sensor, the system is doubly protected against spills. When this interlock is triggered, it activates the LED pump failure light (26D), the piezoelectric device (280H) and another third distinctive audible alarm (26E) for pump failure.

FIG. 21 shows outgoing power-terminal connections from the controller as follows: (a) (280I), power to heat absorber-1, (22); (b) (280J), power to condensate pump, 26; (c) (280K), power to UV source, (29) and (d) 280L, power to heat-absorber-2, the water-cooling unit, (44). The main system-input power to the controller is by terminals (280K, 280L.); embodiments of the system can be adapted to operate on one or more types of power including AC or DC.

A microprocessor control as applied to other embodiments such as those shown in FIG. 17c or FIG. 20d operates as follows. As shown in FIGS. 17c and 20d, which depicts a wall or attic unit, a booster pump (300), draws water from one connected source to pressurize tank (303). Check valves (301) and (410) are to prevent back flow and pressure loss. FIG. 21 shows the low pressure sensor (302A) which detects a drop in pressure when, ice-maker solenoid, (307), of the conventional refrigerator, (309), opens to refill the ice trays. FIG. 21 also shows the low pressure sensor (302) which sends a signal to the microprocessor which in turn drives relay (302) to turn on booster pump (300) if it is not already running.

Water to refill ice trays of a refrigerator, (409), passes through line (406), see FIG. 17c. When there is not a sufficient volume of treated-generated water in tank (303b), this low-water condition is sensed by (30A) which signals the microprocessor which in turn drives relay (243C) which signals solenoid (243B) to open and admit house water from line (244).

As shown in FIG. 20d, hot water can be delivered by activating an in-line resistance heater on one of the discharge lines. When depressed, manual, in-line heater switch (46B) signals the microprocessor which in turn controls the preheat time interval, by timer relay (46D) the heater,(46C); when sufficient time has elapsed, the solenoid (46E) is signaled to open to allow dispensing of hot water through valve (36B). The delay timer may be set either to a fixed predetermined time value in the range 1–500 seconds based upon the specific heater, its power control and demand pattern or to a changeable value determined by algorithms in the expert system and sensing of certain variables including instantaneous hot-surface temperature, elapsed time since last operation and instantaneous temperature of the incoming ambient-temp water.

As shown in FIGS. 20d and 21, in an emergency, water can be added to the system. If one desires to add emergency water to the system, the following sequence of steps is preferably followed: (a)remove seal cover (244B) of the emergency-input funnel, (b) depress switch button (244E) which actuates relay (243)C) which in turn drives solenoid valves (243B) and (244C) open, (c) a volume of water in the range 1–20 liters per incident can then be poured into the funnel. This process might have to be repeated several times in the course of a day. Check valve (410) prevents emergency-input water from contaminating the connected household water line.

As shown in FIG. 21, the water condition sensor (315a) controls the predetermined between-cycle time interval and operational time cycle duration for water automated water-quality maintenance recirculation. Sensor connection (316a) is left open for future addition of modes/functions. The microprocessor also includes frequency-changing circuit (280F) which periodically signals the ultrasonic pest control (42) to emit on a different pest-deterrent frequency so that insects would get accustomed to the sound and invade the apparatus.

Another added feature of the microprocessor control circuits is to change, i.e., increment by a selected, fixed difference value upward or downward, the frequency of the ultrasonic pest deterrent device; this repeated, periodic stepwise changing or alternatively, continuously warbling of the emitted output over a predefined frequency range, precludes "learning" by insects which would compromise the purpose of the deterrent vibrations.

The microprocessor control of this embodiment may optionally be used to provide freeze protection for the unit. By means of the temperature sensors positioned in various zones of the water reservoir, one or more known heating devices mounted within the unit housing or adjacent to the water reservoir, including the Peltier probe itself can be activated in reverse, to provide a sufficient amount of heating to prevent freezing of the lines, valves, and reservoir when the ambient or housing panel temperature falls into the range −5 to 5° C. for a period of time in the range of 2–4 hours. As with the other "error sensor/alarm systems" described above the unit would be put into an special frost-protection mode with related visual displays and distinctive audible signals.

By the addition of an optional telemetry interface, the control circuits of this embodiment can receive commands from a remote location and can, if desired automatically, at predetermined intervals, transmit signals relative to its operation, specific data or alarms/warnings. The communications interface may be of any known type including ordinary phone circuits, cellular-phone circuits or a receiver for electromagnetic signals of a selected frequency such as radio, short wave, FM, microwave, etc. The reception interface may be adapted to receive commands and transfer them to the control circuits. For example, a command to initiate external delivery of water could be sent from a remote location to the generator; the command code would include optional arguments to override machine-program defaults if desired. A properly-coded and received command would then be executed by the control system; the command might also include one or more optional arguments to trigger transmission of a confirm signal or resulting system data or resulting status changes produced by the command. Alternatively, the interface could be adapted to transmit alarms or dangerous status indications to a remote location as an automatic default procedure. Similarly, the interface could be used to query the data memory and to report recent moving-average operational trends/related data or the instantaneous temperature within the reservoir, as might be useful to indicate the danger of freezing.

Example M22

Use of Municipal Water.

This embodiment allows utilization of municipal water during conditions of insufficient condensate. The apparatus may have municipal water connected by quick disconnect fittings so it may be purified, filtered and dispensed. Referring to FIG. 22, an embodiment of the present invention is shown allowing condensate from municipal water (564) to be automatically dispensed. If there is low water in the combined condensate collector and storage reservoir (522), an electrical signal is sent to inlet water solenoid (562) which opens, letting municipal water (564) pressurize the system. A check valve (566) is installed in the combined collector condensate and storage reservoir discharge line (536) to prevent municipal water pressure from filling combined condensate collector and storage reservoir (522). When a dispenser is opened, municipal water (564) flows through the deactivated pump, the water filter, and the bacteria killing zone in the bacteriostat (534) to the open dispenser. When condensate has built up in the combined condensate collector and storage reservoir (522) covering the low water switch (560), a signal is sent to recirculation solenoid (548) shutting off municipal water enabling activation of the pump (530) when a dispenser is opened.

In FIG. 22, the flexible discharge line (568) is shown connected to a refrigerator's ice maker (558) with quick disconnect fitting (538). When the municipal water line is cut to allow fitting of the apparatus with quick disconnect fittings (592, 592A), a cut-off valve (571) is installed to allow easy variance of the length of flexible tubing water line (590). When the ice maker's timer (574) opens the internal ice maker valve, water is discharged into the ice tray (576). The drop in water pressure is sensed by pressure switch (552) in the apparatus, turning on the pump (530). Treated municipal water fills the ice trays.

What is claimed is:

1. A portable, potable-water recovery system for producing and dispensing water comprising:

a portable enclosure provided with an inlet port, an outlet port and air-circulation means for circulating ambient air from said inlet port to said outlet port and water-condensing means within said enclosure, characterized in that a. at least one air filtration means adapted to remove and trap particulates of diameter larger than 1–100 micrometers dispersed in ambient air is sealingly connected upstream of said air circulation means, b. said air-circulation means comprising an internal, ducted, electric, rotary air-circulation means of controllable, variable flow volume of ambient air sealingly connected downstream of said at least one filtration means, c. water condensing means comprising an enclosed cooler having dew-forming surfaces sealingly connected downstream to said filtration means and upstream to said air-circulation means, said dew-forming surfaces adapted to cool the boundary-layer air adjacent to said dew-forming surfaces to a temperature at least 1–10 deg. C below the equilibrium dew point of the inlet air stream, thereby forming liquid-water on said dew-forming surfaces, said surfaces being formed and positioned for gravity flow of said liquid water into a combined condensate collector and storage reservoir, d. said combined condensate collector and storage reservoir of material appropriate for storage of high-purity drinking water and fitted with an outlet connection whereby most of the water held therein can be withdrawn, e. a discharge line connected to said combined condensate collector and storage reservoir whereby water in said combined condensate collector and storage reservoir is pumped at a predetermined flow rate through a water filter meeting NSF 53 standards for removing volatile organic compounds, said water filter connected in series with a bacteriostat where the water is exposed to radiation of sufficient energy and appropriate wavelength to kill adventitious bacteria and viruses, f. said discharge line sealingly connected to said combined condensate collector and storage reservoir extending through said housing for external dispensing of purified water from said combined condensate collector and storage reservoir, g. means within said enclosure for sequencing control operations and monitoring and/or visually displaying integrity of system components therein.

2. The system of claim 1 further characterized in that said means for automatically sequencing control operations, comprising at least one of: discrete components, integrated circuits or microprocessors, adapted to receive sensor signals and activate operational functions, including safety-interlock functions, and related system components, all operations being activated according to a predetermined, logical control sequence, said means for monitoring and/or visually displaying integrity, comprising at least one sensor of one or more different types including: on/off operation, ambient air humidity, fluid flow rate, fluid level, fluid pressure, head pressure, current flow, radiation intensity, operational frequency, temperature, elapsed time, cumulative flow volume, presence of small quantities of spilled liquid water, open or closed solenoid valve status, open or closed status of external water input ports, open or closed status of external water-delivery ports, status of emergency water-input ports, and status of safety locks.

3. The system of claim 2 further comprising an inlet water line, operational controls and related safety check valves for admission of municipal water in the event that water cannot be generated from environmental air, said municipal water flowing via said discharge line through temporarily deactivated said pump, said water filter, and said bacteriostat upon the opening of a dispenser.

4. The system of claim 3 further characterized in that said inlet water line is fitted with quick disconnects to quickly and efficiently accomplish connection and disconnection, and valves to accomplish all needed safety and interlock protections.

5. The system of claim 4 further characterized in that said discharge line is provided with an additional fluidly-connected, external-delivery channel terminating into a connection with an external appliance or dispenser, said external channel fitted with quick disconnects to quickly and efficiently accomplish connection and disconnection, and valves to accomplish all needed safety and interlock protections.

6. The system of claim 5 further comprising a recirculation loop in fluid connection with said discharge line for automatically recirculating water from said combination condensate collector and storage reservoir through said pump, said water filter, and said bacteriostat according to a predetermined command to initiate recirculation.

7. The system of claim 5 further characterized in that said external delivery channel and said inlet water line are encircled by an aesthetically pleasing sleeve of material appropriate for protection of said external delivery channel and said inlet water line such that said external delivery channel and said inlet water line can be neatly and unobtrusively attached to a wall.

8. The system of claim 5 further comprising a means for testing said portable, potable water recovery system in a controlled environment to produce a set of results, said set of results enabling creation of a computer controlled sequence for controlling said portable, potable water recovery system for maximizing condensate for all conditions, and said set of results enabling creation of a graph to display water production levels at various conditions for assurance of maximum production.

9. The system of claim 3 further comprising a. an evaporator, and b. a means for alternately freezing and thawing said evaporator to produce condensate in low humidity and low temperature conditions.

10. The system of claim 9 further characterized in that said means for freezing and thawing said evaporator is activated according to a predetermined computer controlled sequence.

11. The system of claim 10 further characterized in that said evaporator is formed and positioned to create a vortex for efficient flow of said liquid water into said combined condensate collector and storage reservoir.

12. The system of claim 2 further characterized in that said means for monitoring and/or visually displaying integrity comprises control interlocks to terminate system operation upon positive detection of the spill sensor.

13. The system of claim 1 further comprising a recirculation loop in fluid connection with said discharge line for automatically recirculating water from said combination condensate collector and storage reservoir through said pump, said water filter, and said bacteriostat according to a predetermined command to initiate recirculation.

14. The system of claim 1 further comprising an ion generator mounted upstream of said at least one filtration means to further assist in removing particulate matter from the intake air.

15. The system of claim 1 further comprising a wall mounting means for mounting said potable-water recovery system to a wall or other vertical surface.

16. The system of claim 1 further characterized in that said air filtration means meets HEPA standards so as to remove and trap particulates of diameter larger that 0.3 microns dispersed in ambient air.

* * * * *